(12) United States Patent
Saffari et al.

(10) Patent No.: US 8,192,279 B2
(45) Date of Patent: *Jun. 5, 2012

(54) MULTI-PLAYER BINGO GAME WITH OPTIONAL PROGRESSIVE JACKPOT WAGER

(75) Inventors: Ali M. Saffari, Reno, NV (US); Bryan D. Wolf, Reno, NV (US); Richard E. Michaelson, Reno, NV (US)

(73) Assignee: IGT, Reno, NV (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/603,752

(22) Filed: Oct. 22, 2009

(65) Prior Publication Data
US 2010/0041459 A1    Feb. 18, 2010

Related U.S. Application Data

(63) Continuation of application No. 10/755,982, filed on Jan. 13, 2004, now Pat. No. 7,959,509.

(60) Provisional application No. 60/503,161, filed on Sep. 15, 2003.

(51) Int. Cl.
*A63F 13/00* (2006.01)
*A63F 13/10* (2006.01)

(52) U.S. Cl. ........... 463/27; 463/19; 463/20; 463/26; 273/138.1; 273/139

(58) Field of Classification Search .......... 463/1, 16–22, 463/24–29, 33, 42–43, 47; 273/138.1, 138.2, 273/139, 141 A, 269, 454–456, 460–461; A63F 13/00, 13/10

See application file for complete search history.

(56) References Cited

U.S. PATENT DOCUMENTS

| 4,213,616 A | 7/1980 | Dickey |
| 4,332,389 A | 6/1982 | Loyd, Jr. et al. |
| 4,365,810 A | 12/1982 | Richardson |

(Continued)

FOREIGN PATENT DOCUMENTS
EP    0769769 A1    4/1997

(Continued)

OTHER PUBLICATIONS

EP Office Action dated Jul. 3, 2006 from EP Appln. No. 04 783 935.2-2221, 3 pages.

(Continued)

*Primary Examiner* — Arthur O. Hall
(74) *Attorney, Agent, or Firm* — Weaver Austin Villeneuve & Sampson LLP

(57) ABSTRACT

The invention is directed to methods and gaming units for conducting a wagering game and an associated progressive jackpot. Players may win the wagering game, interim pattern awards and/or progressive jackpot awards by matching predetermined patterns with patterns formed on their unique game array with indicia matching selected indicia. The players may optionally participate and be eligible to win all or a portion of the progressive jackpot. In one embodiment, the player may be eligible for the progressive jackpot by wagering at least a minimum wager amount, and perhaps the maximum bet for the wagering game. In another embodiment, the player may affirmatively elect to be eligible for the progressive jackpot by placing a wager or fee in addition to a wager on the wagering game. Graphics corresponding to the progressive jackpot may be optionally displayed only to players eligible to win the progressive jackpot.

13 Claims, 53 Drawing Sheets

U.S. PATENT DOCUMENTS

| | | |
|---|---|---|
| 4,373,726 A | 2/1983 | Churchill et al. |
| 4,455,025 A | 6/1984 | Itkis |
| 4,624,462 A | 11/1986 | Itkis |
| 4,798,387 A | 1/1989 | Richardson |
| 4,842,278 A | 6/1989 | Markowicz |
| 4,848,771 A | 7/1989 | Richardson |
| 4,856,787 A | 8/1989 | Itkis |
| 5,007,649 A | 4/1991 | Richardson |
| 5,050,880 A | 9/1991 | Sloan |
| 5,145,182 A | 9/1992 | Swift et al. |
| 5,242,163 A | 9/1993 | Fulton |
| 5,275,400 A | 1/1994 | Weingardt et al. |
| 5,282,620 A | 2/1994 | Keesee |
| 5,297,802 A | 3/1994 | Pocock et al. |
| 5,351,970 A | 10/1994 | Fioretti |
| 5,393,057 A | 2/1995 | Marnell, II |
| 5,393,061 A | 2/1995 | Manship et al. |
| 5,407,199 A | 4/1995 | Gumina |
| 5,476,259 A | 12/1995 | Weingardt |
| 5,482,289 A | 1/1996 | Weingardt |
| 5,542,669 A | 8/1996 | Charron et al. |
| 5,564,700 A | 10/1996 | Celona |
| 5,580,309 A | 12/1996 | Piechowiak et al. |
| 5,639,088 A | 6/1997 | Schneider et al. |
| 5,645,486 A * | 7/1997 | Nagao et al. .................. 463/27 |
| 5,647,798 A | 7/1997 | Falciglia |
| 5,697,843 A | 12/1997 | Manship et al. |
| 5,720,483 A | 2/1998 | Trinh |
| 5,755,619 A | 5/1998 | Matsumoto et al. |
| 5,762,552 A | 6/1998 | Vuong et al. |
| 5,775,692 A | 7/1998 | Watts et al. |
| 5,779,547 A | 7/1998 | SoRelle et al. |
| 5,788,573 A | 8/1998 | Baerlocher |
| 5,833,537 A | 11/1998 | Barrie |
| 5,833,540 A | 11/1998 | Miodunski et al. |
| 5,848,932 A | 12/1998 | Adams |
| 5,851,149 A | 12/1998 | Xidos et al. |
| 5,855,515 A | 1/1999 | Pease et al. |
| 5,876,283 A | 3/1999 | Parra et al. |
| 5,944,606 A | 8/1999 | Gerow |
| 5,951,011 A | 9/1999 | Potter et al. |
| 5,951,396 A | 9/1999 | Tawil |
| 5,984,779 A | 11/1999 | Bridgeman et al. |
| 6,012,984 A | 1/2000 | Roseman |
| 6,017,032 A | 1/2000 | Grippo et al. |
| 6,062,980 A | 5/2000 | Luciano |
| 6,062,981 A | 5/2000 | Luciano, Jr. |
| 6,079,711 A | 6/2000 | Wei et al. |
| 6,093,100 A | 7/2000 | Singer et al. |
| 6,110,043 A | 8/2000 | Olsen |
| 6,142,872 A | 11/2000 | Walker et al. |
| 6,146,272 A | 11/2000 | Walker et al. |
| 6,149,156 A | 11/2000 | Feola |
| 6,155,925 A | 12/2000 | Giobbi et al. |
| 6,159,095 A | 12/2000 | Frohm et al. |
| 6,168,521 B1 | 1/2001 | Luciano et al. |
| 6,183,361 B1 | 2/2001 | Cummings et al. |
| 6,206,782 B1 | 3/2001 | Walker et al. |
| 6,210,275 B1 | 4/2001 | Olsen |
| 6,210,276 B1 * | 4/2001 | Mullins .................... 463/27 |
| 6,213,877 B1 | 4/2001 | Walker et al. |
| 6,217,448 B1 | 4/2001 | Olsen |
| 6,224,483 B1 | 5/2001 | Mayeroff |
| 6,224,484 B1 * | 5/2001 | Okuda et al. ................ 463/27 |
| 6,231,445 B1 | 5/2001 | Acres |
| 6,238,288 B1 | 5/2001 | Walker et al. |
| 6,257,980 B1 | 7/2001 | Santini, Jr. |
| 6,270,412 B1 | 8/2001 | Crawford et al. |
| 6,280,325 B1 | 8/2001 | Fisk |
| 6,309,298 B1 | 10/2001 | Gerow |
| 6,312,332 B1 | 11/2001 | Walker et al. |
| 6,319,125 B1 | 11/2001 | Acres |
| 6,361,441 B1 | 3/2002 | Walker et al. |
| 6,375,567 B1 | 4/2002 | Acres |
| 6,375,569 B1 | 4/2002 | Acres |
| 6,386,977 B1 | 5/2002 | Hole |
| 6,398,218 B1 | 6/2002 | Vancura |
| 6,398,645 B1 | 6/2002 | Yoseloff |
| 6,419,583 B1 | 7/2002 | Crumby et al. |
| 6,454,648 B1 | 9/2002 | Kelly et al. |
| 6,471,591 B1 | 10/2002 | Crumby |
| 6,494,454 B2 | 12/2002 | Adams |
| 6,524,185 B2 | 2/2003 | Lind |
| 6,537,150 B1 | 3/2003 | Luciano et al. |
| 6,569,017 B2 | 5/2003 | Enziminger et al. |
| 6,582,307 B2 | 6/2003 | Webb |
| 6,585,590 B2 | 7/2003 | Malone |
| 6,599,187 B2 | 7/2003 | Gerow |
| 6,609,973 B1 | 8/2003 | Weiss |
| 6,612,927 B1 | 9/2003 | Slomiany |
| 6,634,946 B1 | 10/2003 | Bridgeman et al. |
| 6,652,378 B2 | 11/2003 | Cannon et al. |
| 6,656,044 B1 | 12/2003 | Lewis |
| 6,712,695 B2 | 3/2004 | Mothwurf et al. |
| 6,733,390 B2 | 5/2004 | Walker |
| 6,743,102 B1 | 6/2004 | Fiechter et al. |
| 6,758,757 B2 | 7/2004 | Luciano, Jr. et al. |
| 6,761,633 B2 | 7/2004 | Riendeau et al. |
| 6,780,108 B1 | 8/2004 | Luciano, Jr. et al. |
| 6,800,026 B2 | 10/2004 | Cannon |
| 6,802,776 B2 | 10/2004 | Lind et al. |
| 6,805,629 B1 | 10/2004 | Weiss |
| 6,832,956 B1 | 12/2004 | Boyd et al. |
| 6,840,858 B2 | 1/2005 | Adams |
| 6,887,154 B1 | 5/2005 | Luciano, Jr. et al. |
| 6,926,607 B2 | 8/2005 | Slomiany et al. |
| 6,932,707 B2 | 8/2005 | Duhamel |
| 6,966,834 B1 | 11/2005 | Johnson |
| 6,983,935 B2 | 1/2006 | Kaminkow |
| 7,008,324 B1 | 3/2006 | Johnson et al. |
| 7,029,395 B1 * | 4/2006 | Baerlocher .................... 463/20 |
| 7,059,966 B2 | 6/2006 | Luciano, Jr. et al. |
| 7,297,059 B2 | 11/2007 | Vancura et al. |
| 7,311,598 B2 | 12/2007 | Kaminkow et al. |
| 7,311,604 B2 | 12/2007 | Kaminkow et al. |
| 7,419,430 B1 | 9/2008 | Joshi et al. |
| 7,562,873 B1 * | 7/2009 | Luciano, Jr. .................. 273/139 |
| 7,578,739 B2 * | 8/2009 | Gauselmann .................... 463/27 |
| 7,614,948 B2 | 11/2009 | Saffari et al. |
| 7,662,040 B2 | 2/2010 | Englman et al. |
| 7,731,581 B2 | 6/2010 | Chamberlain et al. |
| 7,946,915 B2 | 5/2011 | Cannon |
| 7,951,004 B2 | 5/2011 | Saffari et al. |
| 7,959,507 B2 | 6/2011 | Cannon |
| 7,959,509 B2 | 6/2011 | Saffari et al. |
| 7,980,943 B2 | 7/2011 | Mcglone et al. |
| 2001/0004607 A1 | 6/2001 | Olsen |
| 2001/0018361 A1 | 8/2001 | Acres |
| 2001/0034262 A1 | 10/2001 | Banyai |
| 2001/0036855 A1 | 11/2001 | DeFrees-Parrott et al. |
| 2001/0036857 A1 | 11/2001 | Mothwurf et al. |
| 2001/0046892 A1 | 11/2001 | Santini, Jr. |
| 2002/0039923 A1 | 4/2002 | Cannon et al. |
| 2002/0045472 A1 | 4/2002 | Adams |
| 2002/0058546 A2 | 5/2002 | Acres |
| 2002/0082071 A1 | 6/2002 | Riendeau et al. |
| 2002/0094869 A1 | 7/2002 | Harkham |
| 2002/0111207 A1 | 8/2002 | Lind et al. |
| 2002/0113369 A1 | 8/2002 | Weingardt |
| 2002/0132661 A1 | 9/2002 | Lind et al. |
| 2002/0155877 A1 | 10/2002 | Enziminger et al. |
| 2002/0177483 A1 | 11/2002 | Cannon |
| 2002/0183105 A1 | 12/2002 | Cannon et al. |
| 2002/0198054 A1 | 12/2002 | Auxier |
| 2003/0003981 A1 | 1/2003 | Valenti |
| 2003/0100361 A1 | 5/2003 | Sharpless et al. |
| 2003/0119581 A1 | 6/2003 | Cannon et al. |
| 2003/0125101 A1 | 7/2003 | Campo |
| 2003/0144050 A1 | 7/2003 | Keaton et al. |
| 2003/0148804 A1 | 8/2003 | Ikeya et al. |
| 2003/0148808 A1 | 8/2003 | Price |
| 2003/0171145 A1 | 9/2003 | Rowe |
| 2003/0181231 A1 | 9/2003 | Vancura et al. |
| 2003/0207707 A1 | 11/2003 | Slomiany |
| 2003/0211884 A1 | 11/2003 | Gauselmann |
| 2003/0216165 A1 | 11/2003 | Singer et al. |
| 2003/0222402 A1 * | 12/2003 | Olive .......................... 273/292 |

| | | | | | | |
|---|---|---|---|---|---|---|
| 2003/0224852 | A1 | 12/2003 | Walker et al. | EP | 1 671 287 | 6/2006 |
| 2003/0228899 | A1 | 12/2003 | Evans | EP | 1 671 288 | 6/2006 |
| 2003/0236116 | A1 | 12/2003 | Marks et al. | EP | 1 671 289 | 6/2006 |
| 2004/0048669 | A1 | 3/2004 | Rowe | EP | 1 687 782 | 8/2006 |
| 2004/0072613 | A1 | 4/2004 | Visocnik | JP | 06-246068 | 9/1994 |
| 2004/0087368 | A1 | 5/2004 | Gauselmann | JP | 2007517535 | 7/2007 |
| 2004/0102243 | A1 | 5/2004 | Olsen | WO | WO 96/18174 | 6/1996 |
| 2004/0132523 | A1 | 7/2004 | Staw | WO | WO 01/99067 | 12/2001 |
| 2004/0142747 | A1 | 7/2004 | Pryzby | WO | WO03/063019 | 7/2003 |
| 2004/0152508 | A1 | 8/2004 | Lind et al. | WO | WO 2005/029422 | 3/2005 |
| 2004/0214628 | A1 | 10/2004 | Boyd et al. | WO | WO 2005/029423 | 3/2005 |
| 2004/0229683 | A1 | 11/2004 | Mothwurf et al. | WO | WO 2005/029424 | 3/2005 |
| 2004/0235542 | A1 | 11/2004 | Stronach et al. | WO | WO 2005/029425 | 3/2005 |
| 2004/0242297 | A1 | 12/2004 | Walker et al. | WO | WO 2005/029426 | 3/2005 |
| 2004/0259621 | A1 | 12/2004 | Pfeiffer et al. | WO | WO 2005/029427 | 3/2005 |
| 2004/0266517 | A1 | 12/2004 | Bleich et al. | WO | WO 2005/029428 | 3/2005 |
| 2005/0026670 | A1* | 2/2005 | Lardie .............. 463/16 | WO | WO 2005/029429 | 3/2005 |
| 2005/0032563 | A1* | 2/2005 | Sines ............... 463/13 | WO | WO 2005/029430 | 3/2005 |
| 2005/0032569 | A1 | 2/2005 | Turk | | | |
| 2005/0037832 | A1 | 2/2005 | Cannon | | | |
| 2005/0043079 | A1 | 2/2005 | Huang | | | |
| 2005/0043094 | A1 | 2/2005 | Nguyen et al. | | | |
| 2005/0054419 | A1 | 3/2005 | Souza et al. | | | |
| 2005/0059449 | A1 | 3/2005 | Yarbrough | | | |
| 2005/0059467 | A1 | 3/2005 | Saffari et al. | | | |
| 2005/0059468 | A1 | 3/2005 | Cannon | | | |
| 2005/0059470 | A1 | 3/2005 | Cannon | | | |
| 2005/0059471 | A1 | 3/2005 | Cannon | | | |
| 2005/0064932 | A1 | 3/2005 | Cannon | | | |
| 2005/0075161 | A1 | 4/2005 | McGlone et al. | | | |
| 2005/0079911 | A1 | 4/2005 | Nakatsu | | | |
| 2005/0119042 | A1 | 6/2005 | Chamberlain et al. | | | |
| 2005/0119044 | A1 | 6/2005 | Lim et al. | | | |
| 2005/0143168 | A1 | 6/2005 | Torango | | | |
| 2005/0167916 | A1 | 8/2005 | Banyai | | | |
| 2005/0187014 | A1 | 8/2005 | Saffari et al. | | | |
| 2005/0233798 | A1 | 10/2005 | Van Asdale | | | |
| 2006/0009285 | A1 | 1/2006 | Pryzby et al. | | | |
| 2006/0025210 | A1 | 2/2006 | Johnson | | | |
| 2006/0040723 | A1 | 2/2006 | Baerlocher et al. | | | |
| 2006/0040732 | A1 | 2/2006 | Baerlocher et al. | | | |
| 2006/0040733 | A1 | 2/2006 | Baerlocher et al. | | | |
| 2006/0040734 | A1 | 2/2006 | Baerlocher et al. | | | |
| 2006/0040736 | A1 | 2/2006 | Baerlocher et al. | | | |
| 2006/0046821 | A1 | 3/2006 | Kaminkow et al. | | | |
| 2006/0046822 | A1 | 3/2006 | Kaminkow et al. | | | |
| 2006/0046823 | A1 | 3/2006 | Kaminkow et al. | | | |
| 2006/0052158 | A1 | 3/2006 | Raniere | | | |
| 2006/0052160 | A1 | 3/2006 | Saffari et al. | | | |
| 2006/0135245 | A1 | 6/2006 | Hedrick et al. | | | |
| 2006/0211493 | A1 | 9/2006 | Walker et al. | | | |
| 2006/0217176 | A1 | 9/2006 | Walker | | | |
| 2007/0015585 | A1 | 1/2007 | Sartini et al. | | | |
| 2007/0060316 | A1 | 3/2007 | O'Halloran | | | |
| 2007/0093286 | A1 | 4/2007 | Marshall | | | |
| 2007/0105619 | A1 | 5/2007 | Kniesteadt et al. | | | |
| 2007/0135211 | A1 | 6/2007 | Block et al. | | | |
| 2007/0142113 | A1 | 6/2007 | Walker et al. | | | |
| 2007/0149292 | A1 | 6/2007 | Kaminkow et al. | | | |
| 2007/0202943 | A1 | 8/2007 | Thomas | | | |
| 2007/0207850 | A1 | 9/2007 | Darrah et al. | | | |
| 2008/0020817 | A1 | 1/2008 | Kaminkow et al. | | | |
| 2008/0020842 | A1 | 1/2008 | Kaminkow et al. | | | |
| 2008/0176627 | A1 | 7/2008 | Lardie | | | |
| 2010/0210339 | A1 | 8/2010 | Chamberlain et al. | | | |
| 2011/0201417 | A1 | 8/2011 | Saffari et al. | | | |

FOREIGN PATENT DOCUMENTS

| | | |
|---|---|---|
| EP | 1 199 690 | 4/2002 |
| EP | 1302914 A2 | 4/2003 |
| EP | 1341135 | 9/2003 |
| EP | 1343125 A2 | 9/2003 |
| EP | 1302914 A3 | 9/2004 |
| EP | 1343125 A3 | 12/2004 |
| EP | 1 665 182 | 6/2006 |
| EP | 1 668 608 | 6/2006 |
| EP | 1 668 609 | 6/2006 |
| EP | 1 671 285 | 6/2006 |
| EP | 1 671 286 | 6/2006 |

OTHER PUBLICATIONS

MX Office Action dated Apr. 15, 2009 from MX Appln. No. 06/02903, 4 pages.
Examination Report dated Oct. 22, 2007 from EP Appln. No. 04 788 725.2, 9 pages.
Summons to Oral Proceedings dated Sep. 17, 2008 from EP Appln. No. 04 788 725.2, 12 pages.
MX Office Action dated Apr. 15, 2009 from MX Appln. No. 06/02900, 3 pages.
EP Examiner's Communication dated Oct. 25, 2006 from EP Appln. No. 04784069.9, 3 pages.
EP Oral Proceedings dated Jan. 28, 2009 from EP Appln. No. 04784069.9, 7 pages.
MX Office Action dated Apr. 29, 2009 from MX Appln. No. 06/02906, 3 pages.
EP Office Action dated Jan. 20, 2009 from EP Appln. No. 04784221. 6, 5 pages.
MX Office Action dated Apr. 15, 2009 from MX Appln. No. 06/02899, 4 pages.
EP Examiner's Communication dated Jul. 3, 2006 from EP Appln. No. 04784071.5, 1 page.
MX Office Action dated Apr. 15, 2009 from MX Appln. No. 06/02901, 3 pages.
EP Office Action dated May 18, 2009 from EP Appln. No. 04 783 891.7, 3 pages.
MX Office Action dated May 8, 2009 from MX Appln. No. 06/02907, 4 pages.
EP Communication dated Jul. 26, 2006 from EP Appln. No. 04783938.6, 15 pages.
MX Office Action dated Apr. 15, 2009 from MX Appln. No. 06/02908, 4 pages.
EP Office Action dated May 18, 2009 from EP Appln. No. 04 783 937.8-2221, 3 pages.
MX Office Action dated Apr. 21, 2009 from MX Appln. No. 06/02905, 4 pages.
EP Office Action dated Jan. 20, 2009 from EP Appln. No. 04783992. 3, 4 pages.
MX Office Action dated Apr. 30, 2009 from MX Appln. No. 06/02902, 3 pages.
US Office Action dated Mar. 28, 2008 from U.S. Appl. No. 10/940,293, 38 pages.
US Office Action dated Jan. 8, 2010 from U.S. Appl. No. 10/940,293, 17 pages.
US Restriction Requirement dated Jun. 8, 2007 from U.S. Appl. No. 10/931,673, 7 pages.
US Office Action dated Aug. 20, 2007 from U.S. Appl. No. 10/931,673, 13 pages.
US Final Office Action dated Feb. 4, 2008 from U.S. Appl. No. 10/931,673, 14 pages.
US Office Action dated Aug. 11, 2008 from U.S. Appl. No. 10/931,673, 15 pages.
US Office Action dated May 14, 2009 from U.S. Appl. No. 10/931,673, 15 pages.
US Notice of Allowance dated Oct. 16, 2009 from U.S. Appl. No. 10/931,673, 7 pages.

US Notice of Allowance dated Feb. 18, 2010 from U.S. Appl. No. 10/931,673, 9 pages.
US Office Action dated Sep. 13, 2007, from U.S. Appl. No. 10/941,606, 19 pages.
US Final Office Action dated Oct. 21, 2008 from U.S. Appl. No. 10/941,606, 34 pages.
US Office Action dated Mar. 19, 2008, from U.S. Appl. No. 10/941,606, 37 pages.
US Office Action dated Apr. 14, 2009 from U.S. Appl. No. 10/941,606, 30 pages.
US Notice of Allowance dated Dec. 21, 2009 from U.S. Appl. No. 10/941,606, 10 pages.
US Office Action dated Mar. 22, 2010 from U.S. Appl. No. 10/941,388, 29 pages.
US Final Office Action dated Dec. 31, 2007 from U.S. Appl. No. 10/755,982, 10 pages.
US Office Action dated Jul. 3, 2007, from U.S. Appl. No. 10/755,982, 20 pages.
US Notice of Allowance dated Apr. 23, 2008 from U.S. Appl. No. 10/755,982, 6 pages.
US Notice of Allowance dated Jul. 23, 2008 from U.S. Appl. No. 10/755,982, 24 pages.
US Notice of Allowance dated Dec. 4, 2009 from U.S. Appl. No. 10/755,982, 8 pages.
US Notice of Allowance dated Mar. 25, 2010 from U.S. Appl. No. 10/755,982, 6 pages.
US Office Action dated Jul. 9, 2008 from U.S. Appl. No. 10/940,247, 51 pages.
US Office Action dated Jan. 6, 2009 from U.S. Appl. No. 10/940,247, 13 pages.
US Office Action dated Oct. 2, 2009 from U.S. Appl. No. 10/940,247, 13 pages.
US Office Action dated Feb. 19, 2010, from U.S. Appl. No. 10/940,247, 15 pages.
US Office Action dated Sep. 21, 2007, from U.S. Appl. No. 10/756,429, 24 pages.
US Office Action dated Mar. 28, 2008 from U.S. Appl. No. 10/756,429, 19 pages.
US Advisory Action dated Jun. 26, 2008 from U.S. Appl. No. 10/756,429, 3 pages.
US Office Action dated Sep. 17, 2008 from U.S. Appl. No. 10/756,429, 11 pages.
US Notice of Allowance dated Feb. 25, 2009 from U.S. Appl. No. 10/756,429, 7 pages.
US Notice of Allowance dated Jun. 16, 2009 from U.S. Appl. No. 10/756,429, 10 pages.
US Restriction Requirement dated Jun. 26, 2008 from U.S. Appl. No. 10/940,272, 9 pages.
US Office Action dated May 20, 2009 from U.S. Appl. No. 10/940,272, 20 pages.
US Notice of Allowance dated Jan. 21, 2010 from U.S. Appl. No. 10/940,272, 10 pages.
International Search Report & Written Opinion of the International Searching Authority dated Jan. 24, 2005 from PCT Appln. No. PCT/US2004/029906, 13 pages.
Notification Concerning Transmittal of International Preliminary Report on Patentability dated Mar. 23, 2006 from PCT Appln. No. PCT/US2004/029906, 8 pages.
Notification of Transmittal of the International Search Report & Written Opinion of the International Searching Authority dated Jan. 25, 2005, from PCT Appln. No. PCT/US2004/029913, 13 pages.
Notification Concerning Transmittal of International Preliminary Report on Patentability dated Mar. 23, 2006 from PCT Appln. No. PCT/US2004/029913, 8 pages.
International Search Report & Written Opinion of the International Searching Authority dated Feb. 21, 2005 from PCT Appln. No. PCT/US2004/030089, 13 pages.
Notification Concerning Transmittal of International Preliminary Report on Patentability dated Mar. 23, 2006 from PCT Appln. No. PCT/US2004/030089, 8 pages.

Notification of Transmittal of the International Search Report & Written Opinion of the International Searching Authority dated Feb. 3, 2005 from PCT Appln. No. App No. PCT/US2004/030285, 7 pages.
Notification Concerning Transmittal of International Preliminary Report on Patentability dated Mar. 23, 2006 from PCT Appln. No. PCT/US2004/030285, 6 pages.
International Search Report & Written Opinion of the International Searching Authority dated Jan. 24, 2005 from PCT Appln. No. PCT/US2004/030093, 12 pages.
Notification Concerning Transmittal of International Preliminary Report on Patentability dated Mar. 23, 2006 from PCT Appln. No. PCT/US2004/030093, 8 pages.
Notification of Transmittal of the International Search Report & Written Opinion of the International Searching Authority dated Feb. 3, 2005 from PCT Appln. No. PCT/US2004/029839, 14pages.
Notification Concerning Transmittal of International Preliminary Report on Patentability dated Mar. 23, 2006 from PCT Appln. No. PCT/US2004/029839, 9 pages.
Notification of Transmittal of the International Search Report & Written Opinion of the International Searching Authority dated Nov. 1, 2005 from PCT Appln. No. PCT/US2004/029912, 19 pages.
Notification Concerning Transmittal of International Preliminary Report on Patentability dated Mar. 23, 2006 from PCT Appln. No. PCT/US2004/029912, 15 pages.
International Search Report and Written Opinion of the ISA dated Feb. 21, 2005 from PCT Appln. No. PCT/US2004/029911, 13 pages.
Notification Concerning Transmittal of International Preliminary Report on Patentability dated Mar. 23, 2006 from PCT Appln. No. PCT/US2004/029911, 8 pages.
International Search Report and Written Opinion of the International Searching Authority of the International Searching Authority dated Feb. 3, 2005 from PCT Appln. No. PCT/US2004/029983, 13 pages.
Notification of Transmittal of International Preliminary Report on Patentability dated Mar. 23, 2006 from PCT Appln. No. PCT/US2004/029983, 9 pages.
US Office Action dated Mar. 30, 2010 from U.S. Appl. No. 10/887,111, 14 pages.
US Notice of Allowance dated Apr. 15, 2010 from U.S. Appl. No. 10/941,606.
US Supplemental Notice of Allowance dated Apr. 13, 2010 from U.S. Appl. No. 10/755,982.
U.S. Appl. No. 13/092,005, filed Apr. 21, 2011, Saffari et al.
US Final Office Action dated Oct. 14, 2010 issued in U.S. Appl. No. 10/887,111.
US Office Action dated Jun. 24, 2011 issued in U.S. Appl. No. 10/887,111.
US Office Action dated Jul. 7, 2010 issued in U.S. Appl. No. 10/940,293.
US Office Action dated Dec. 9, 2010 issued in U.S. Appl. No. 10/940,293.
US Notice of Allowance and Examiner Amendment dated Apr. 13, 2011 issued in U.S. Appl. No. 10/940,293.
US Advisory Action dated Apr. 28, 2008 issued in U.S. Appl. No. 10/931,673.
US Notice of Allowance dated Oct. 29, 2010 issued in U.S. Appl. No. 10/931,673.
US Notice of Allowance and Examiner's Amendment dated Feb. 3, 2011 issued in U.S. Appl. No. 10/931,673.
US Supplemental Notice of Allowance and Interview Summary dated Jul. 6, 2010 issued in U.S. Appl. No. 10/941,606.
US Supplemental Notice of Allowance dated Sep. 9, 2010 issued in U.S. Appl. No. 10/941,606.
US Notice of Allowance and Examiner Amendment dated Dec. 1, 2010 issued in U.S. Appl. No. 10/941,606.
US Notice of Allowance dated Mar. 18, 2011 issued in U.S. Appl. No. 10/941,606.
US Final Office Action dated Oct. 8, 2010 issued in U.S. Appl. No. 10/941,388.
US Notice of Allowance dated Jun. 9, 2010 issued in U.S. Appl. No. 10/755,982.

US Notice of Allowance dated Aug. 12, 2010 issued in U.S. Appl. No. 10/755,982.

US Notice of Allowance and Examiner Amendment dated Nov. 15, 2010 issued in U.S. Appl. No. 10/755,982.

US Notice of Allowance with Examiner Amendment and Examiner Interview Summary dated Mar. 15, 2011 issued in U.S. Appl. No. 10/755,982.

US Final Office Action dated Aug. 2, 2010 issued in U.S. Appl. No. 10/940,247.

US Notice of Allowance and Examiner's Amendment dated Jan. 31, 2011 issued in U.S. Appl. No. 10/940,247.

US Supplemental Notice of Allowance and Examiner Amendment dated Oct. 8, 2009 issued in U.S. Appl. No. 10/756,429.

US Notice of Allowance dated Dec. 6, 2011 issued in U.S. Appl. No. 12/764,829.

US Allowed Claims dated Dec. 6, 2011 issued in U.S. Appl. No. 12/764,829.

* cited by examiner

PAY GROUPS

| 1 | 2 | 3 | 4 | 5 | 6 | 7 | 8 | 9 | 10 |
|---|---|---|---|---|---|---|---|---|---|
| 1 | 11 | 21 | 31 | 41 | 51 | 61 | 71 | 81 | 91 |
| 2 | 12 | 22 | 32 | 42 | 52 | 62 | 72 | 82 | 92 |
| 3 | 13 | 23 | 33 | 43 | 53 | 63 | 73 | 83 | 93 |
| 4 | 14 | 24 | 34 | 44 | 54 | 64 | 74 | 84 | 94 |
| 5 | 15 | 25 | 35 | 45 | 55 | 65 | 75 | 85 | 95 |
| 6 | 16 | 26 | 36 | 46 | 56 | 66 | 76 | 86 | 96 |
| 7 | 17 | 27 | 37 | 47 | 57 | 67 | 77 | 87 | 97 |
| 8 | 18 | 28 | 38 | 48 | 58 | 68 | 78 | 88 | 98 |
| 9 | 19 | 29 | 39 | 49 | 59 | 69 | 79 | 89 | 99 |
| 10 | 20 | 30 | 40 | 50 | 60 | 70 | 80 | 90 | 100 |

PAY GROUPS

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 900 | 540 | 360 | 300 | 225 | 150 | 130 | 120 | 100 | 80 | 50 | 40 | 30 | 20 | 10 | 2 |
| 902 | 550 | 362 | 302 | 226 | 151 | 132 | 121 | 102 | 81 | 51 | 42 | 31 | 21 | 12 | 4 |
| 906 | 585 | 366 | 306 | 227 | 152 | 134 | 122 | 104 | 82 | 52 | 44 | 32 | 22 | 14 | 5 |
| 1350 | 587 | 368 | 308 | 231 | 155 | 135 | 124 | 105 | 83 | 53 | 45 | 34 | 23 | 15 | 6 |
| 1500 | 600 | 375 | 310 | 233 | 175 | 136 | 125 | 106 | 85 | 55 | 46 | 35 | 25 | 17 | 7 |
| 1502 | 683 | 377 | 314 | 240 | 180 | 140 | 126 | 107 | 87 | 57 | 47 | 36 | 27 | 18 | 8 |
| 1800 | 720 | 380 | 315 | 242 | 182 | 142 | 127 | 110 | 89 | 60 | | 37 | 29 | | 9 |
| 2250 | 752 | 435 | 317 | 250 | 187 | 145 | 128 | 111 | 90 | 61 | | 38 | | | |
| 4727 | 810 | 450 | 325 | 256 | 190 | | | 112 | 92 | 62 | | | | | |
| | 850 | 525 | 340 | | 195 | | | 115 | 95 | 65 | | | | | |
| | | | 342 | | 197 | | | | 96 | 67 | | | | | |
| | | | 347 | | 200 | | | | | 70 | | | | | |
| | | | | | 201 | | | | | 75 | | | | | |
| | | | | | 220 | | | | | 77 | | | | | |

MULTI-PLAYER BINGO GAME WITH OPTIONAL PROGRESSIVE JACKPOT WAGER

REFERENCE TO RELATED APPLICATIONS

This application is a continuation of and claims the benefit of co-pending U.S. patent application Ser. No. 10/755,982, filed on Jan. 13, 2004, titled "Multi-Player Bingo Game With Optional Progressive Jackpot Wager", which claims priority from Provisional Application Ser. No. 60/503,161, filed on Sep. 15, 2003, titled "Gaming Network With Multi-Player Bingo Game", now expired, both of which are incorporated by reference herein in their entirety for all purposes.

BACKGROUND

The present disclosure relates to gaming networks and, more particularly, to a gaming network providing a multi-player Bingo game with an optional wager for a progressive jackpot.

Indian gaming in the United States is divided into Class I, Class II and Class III games. Class I gaming includes social games played for minimal prizes, or traditional ceremonial games. Class II gaming includes Bingo and Bingo-like games. Bingo is defined as games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Class II gaming may also include pull tab games if played in the same location as Bingo games, lotto, punch boards, tip jars, instant Bingo, and other games similar to Bingo. Class III gaming includes any game that is not a Class I or Class II game, such as games of chance (slots, video poker, video blackjack, video Keno, and the like) typically offered in non-Indian, state-regulated casinos.

Two basic forms of Bingo exist. In traditional Bingo, the players purchase cards after which a draw takes place. The first player to achieve a designated pattern wins. In one type of Bingo game known as Bonanza Bingo, the draw for the game takes place before the players know the arrangements on their Bingo cards. After the draw occurs, the players may either purchase cards or expose previously purchased cards and compare the arrangements on the cards to the drawn numbers to determine whether predetermined patterns are matched. Play continues in Bonanza Bingo until at least one of the players matches a designated game-winning pattern. Bonanza Bingo may also encompass Bingo variations wherein a partial draw is conducted for some numbers (generally fewer than the number of balls expected to be necessary to win the game) prior to selling and/or revealing the Bingo cards. After the Bingo cards are sold and/or revealed, additional numbers are drawn until there is a winner.

As indicated above, a Bingo game is played until at least one player covers a predetermined game-winning pattern on the player's Bingo card. The game may also include interim winners of prizes based on matching predetermined interim patterns on the Bingo card using the same ball draw. The interim pattern wins do not terminate the Bingo game. For interim pattern awards, players covering certain interim patterns may receive an additional award as the game continues. Some exceptional Bingo versions may allow Bingo draws beyond those needed to achieve the Bingo game win so as to payout interim pattern wins at a desired rate. The game-winning awards may be partially or fully pari-mutuel in nature. That is, the Bingo win award is based upon the total amount wagered on a given occurrence of the Bingo game. However, interim pattern awards typically are not pari-mutuel.

For a given game-winning pattern, the expected number of balls drawn for at least one Bingo card to match the game-winning pattern depends on the number of Bingo cards being played in the Bingo game. Bingo is typically played with a variable number of Bingo cards resulting from varying numbers of players and players playing varying numbers of Bingo cards. Consequently, if the interim patterns are evaluated based on the balls drawn until at least one Bingo card matches the game-winning pattern, the odds of awarding interim awards also varies with the number of Bingo cards being played in the Bingo game. If the interim awards are determined based on the ball draw to Bingo, the Bingo game may be restricted to a fixed number of Bingo cards in order to achieve a desired payout rate for the interim pattern awards. However, it may be difficult to use a fixed number of Bingo cards in every occurrence of the Bingo game in a real-time environment wherein the players' expectation may be to play the Bingo game on demand.

For example, to achieve a desired interim award payout rate, it may be desirable to play each occurrence of the Bingo game with a fixed number of Bingo cards, such as fifteen. If there are at least two players but less than fifteen Bingo cards are enrolled in the Bingo game within a short period of time, in order to serve the players, the casino may want to start the game for those players available to play. With the fewer number of Bingo cards, the average number of balls drawn for at least one of the Bingo cards to match the game-winning pattern may be expected to be greater than for fifteen Bingo cards. Correspondingly, the number of balls used by the players to match the interim patterns increases, thereby increasing the odds of players matching the interim patterns and increasing the interim award payout rate. Therefore, a need exists for a method for minimizing the impact of the players and/or Bingo cards upon the award structure for a multi-player Bingo game, including the impact on the odds of awarding interim pattern awards.

In general, players may find games such as slot machines, whether electro-mechanical or video, to be more appealing to Bingo games. Typically, slot machine outcomes are based upon the resultant patterns of symbols displayed on the reels. However, as mentioned above, slot machines and other similar type games of chance fall into the category of Class III games, which may be subject to stricter approval and regulation.

As such, there is a recognized need for providing a system wherein a Bingo outcome may be presented to the players with the display simulating the appearance of traditional Class III games, such as with electro-mechanical or video slot reels, but with the outcome of the Bingo game determining the outcome to be displayed instead of the game engine typically used for the selected Class III game. For example, a Bingo outcome may be used to determine the positioning of the reels of a display device having the look and feel of a slot machine. Thus, the positioning of the slot reels is based upon the Bingo pattern(s) matched by the player during the Bingo game. Further, the award amounts depicted by the display device may correspond to the award amounts, plus any scatter and bonus awards, represented by the Bingo patterns. The display device, therefore, serves as an alternative display of the results of the Bingo game. The Bingo card, which may also be displayed, is the ultimate outcome-determining entity, with that outcome determining the outcome that is displayed on the display device.

For slot machines and other games of chance having a single payline (i.e. a single sequence or grouping of game symbols that is evaluated to determine whether a winning combination occurs), mapping between the winning outcomes of the game of chance and patterns in a Bingo game may not be difficult to achieve. Such games of chance typically encompass a couple dozen possible winning combinations and associated payout amounts. Selecting Bingo patterns with odds of occurrence similar to those of each desired winning outcome of the game of chance may be readily achieved by one skilled in the art.

The current trend in slot machines, for example, is to provide multi-line spinning reel games (i.e., multiple sequences or groupings of game symbols that are evaluated to determine whether one or more winning combinations occur). The award resulting from the final positioning of the reels may be the sum of the awards for all the selected paylines, plus any scatter or bonus awards. Thus, the number of possible award amounts for a given play of the game is increased dramatically and can easily reach several hundred. In order to provide a display device for a Bingo game and offer the look and feel of a multi-line slot machine, a need exists for a method to map the Bingo patterns to each of a desired large number of award amounts. Attempting to define patterns for all or most such award amounts may be analytically challenging and potentially confusing to the Bingo player.

One example of a method of mapping Bingo game outcomes to slot machine awards is disclosed in U.S. Pat. No. 6,537,150 to Luciano. Luciano discloses a method wherein a limited number of Bingo outcome award amounts are provided while still using a majority of reel display outcomes. For each of the defined winning patterns in a reasonably sized set, a maximum award amount is defined. When such a winning pattern occurs, a display device outcome is chosen having an award amount near the maximum award amount. The difference between the maximum award amount and the chosen award amount is added to a separate prize pool that is awarded to players by some other means, such as a bonus. Consequently, the Luciano method does not pay the player the exact amount reflected by the player's Bingo outcome.

SUMMARY OF THE INVENTION

In one aspect, the invention is directed to a method for conducting a wagering game and an associated progressive jackpot, including receiving a deposit of an amount of a medium of currency by a player at a gaming unit, receiving input for a player's wager on an occurrence of the wagering game at an input device of the gaming unit, subtracting the amount of the player's wager on the occurrence of the wagering game from the player's available credit at the gaming unit in response to receiving the input for the player's wager, wherein the player's available credit corresponds to the amount of the medium of currency deposited at the gaming unit, and comparing the amount of the player's wager on the occurrence of the wagering game to a minimum wager amount. The method may also include subtracting a progressive jackpot wager amount from one of the player's available credit and the credits subtracted from the player's available credit if the player's wager is greater than or equal to a minimum wager amount, adding the progressive jackpot wager amount to a progressive jackpot pool for the progressive jackpot, determining an outcome for the player for the occurrence of the wagering game, and awarding at least a portion of the progressive jackpot pool to the player if the player's outcome for the occurrence of the wagering game is a predetermined progressive jackpot winning outcome and the player's wager is greater than or equal to the minimum wager amount.

In another aspect, the invention is directed to a method for conducting a wagering game and an associated progressive jackpot, including providing a currency-accepting mechanism at a gaming unit for receiving a deposit of an amount of a medium of currency at a gaming unit, providing an input device for receiving input for a player's wager on an occurrence of the wagering game at the gaming unit, and configuring the gaming unit to subtract the amount of the player's wager on the occurrence of the wagering game from the player's available credit at the gaming unit in response to receiving the input for the player's wager at the input device, wherein the player's available credit corresponds to the amount of the medium of currency deposited at the gaming unit. The method also includes configuring the gaming unit to compare the amount of the player's wager on the occurrence of the wagering game to a minimum wager amount, configuring the gaming unit to subtract a progressive jackpot wager amount from one of the player's available credit and the credits subtracted from the player's available credit if the player's wager is greater than or equal to a minimum wager amount, and configuring the gaming unit to add the progressive jackpot wager amount to a progressive jackpot pool for the progressive jackpot. Further, the method includes configuring the gaming unit to determine an outcome for the player for the occurrence of the wagering game, and configuring the gaming unit to award at least a portion of the progressive jackpot pool to the player if the player's outcome for the occurrence of the wagering game is a predetermined progressive jackpot winning outcome and the player's wager is greater than or equal to the minimum wager amount.

In a further aspect, the invention is directed to a method for conducting a wagering game and an associated progressive jackpot, including receiving a deposit of an amount of a medium of currency by a player at a gaming unit, receiving input for a player's wager on an occurrence of the wagering game at an input device of the gaming unit, and subtracting the amount of the player's wager on the occurrence of the wagering game from the player's available credit at the gaming unit in response to receiving the input for the player's wager, wherein the player's available credit corresponds to the amount of the medium of currency deposited at the gaming unit. The method may also include receiving input for a player's progressive jackpot wager for the occurrence of the wagering game at the input device of the gaming unit, subtracting the amount of the player's progressive jackpot wager for the occurrence of the wagering game from the player's available credit at the gaming unit in response to receiving the input for the player's progressive jackpot wager, and adding the progressive jackpot wager amount to a progressive jackpot pool for the progressive jackpot. In addition, the method may include determining an outcome for the player for the occurrence of the wagering game, and awarding at least a portion of the progressive jackpot pool to the player if the player's outcome for the occurrence of the wagering game is a predetermined progressive jackpot winning outcome and the player input a progressive jackpot wager.

In an additional aspect, the invention is directed to a method for conducting a wagering game and an associated progressive jackpot, including providing a currency-accepting mechanism at a gaming unit for receiving a deposit of an amount of a medium of currency at a gaming unit, providing an input device for receiving input for a player's wager on an occurrence of the wagering game at the gaming unit, and configuring the gaming unit to subtract the amount of the player's wager on the occurrence of the wagering game from the player's available credit at the gaming unit in response to receiving the input for the player's wager at the input device, wherein the player's available credit corresponds to the amount of the medium of currency deposited at the gaming unit. The method may also include configuring the input device for receiving input for a player's progressive jackpot wager for the occurrence of the wagering game at the gaming unit, configuring the gaming unit to subtract the amount of the player's progressive jackpot wager for the occurrence of the wagering game from the player's available credit at the gaming unit in response to receiving input for the player's progressive jackpot wager, and configuring the gaming unit to add the progressive jackpot wager amount to a progressive jackpot pool for the progressive jackpot. Moreover, the method may include configuring the gaming unit to determine an outcome for the player for the occurrence of the wagering game, and configuring the gaming unit to award at least a portion of the progressive jackpot pool to the player if the player's outcome for the occurrence of the wagering game is a predetermined progressive jackpot winning outcome and the player inputs a progressive jackpot wager.

In a still further aspect, the invention is directed to a gaming unit for conducting a wagering game and an associated progressive jackpot in a gaming network having a network computer and a plurality of gaming units. The gaming unit may include an input device for inputting a plurality of input selections, a gaming unit memory device, a currency-accepting mechanism that is capable of allowing a player to deposit a medium of currency, an output device, a value-dispensing mechanism that is capable of dispensing value to the player, and a gaming unit controller operatively coupled to the input device, the gaming unit memory device, the currency-accepting mechanism, the output device, and the value-dispensing mechanism. The gaming unit controller may be programmed to allow the currency-accepting mechanism to accept a deposit of an amount of a medium of currency by a player at the gaming unit, to allow the input device to receive input for a player's wager on an occurrence of the wagering game at the input device, and to subtract the amount of the player's wager on the occurrence of the wagering game from the player's available credit at the gaming unit in response to receiving the input for the player's wager, wherein the player's available credit corresponds to the amount of the medium of currency deposited at the gaming unit. The gaming unit controller may also be programmed to compare the amount of the player's wager on the occurrence of the wagering game to a minimum wager amount, to subtract a progressive jackpot wager amount from one of the player's available credit and the credits subtracted from the player's available credit in response to determining that the player's wager is greater than or equal to the minimum wager amount, and to cause the output device to transmit a message to the network computer to add the progressive jackpot wager amount to a progressive jackpot pool for the progressive jackpot. Further, the gaming unit controller may be programmed to determine an outcome for the player for the occurrence of the wagering game, and to determine whether the player's outcome for the occurrence of the wagering game is a progressive jackpot winning outcome in response to determining that the player's outcome for the occurrence of the wagering game is a predetermined progressive jackpot winning outcome and to determining that the player's wager is greater than or equal to the minimum wager amount.

In yet another aspect, the invention is directed to a gaming unit for conducting a wagering game and an associated progressive jackpot in a gaming network having a network computer and a plurality of gaming units. The gaming unit may include an input device for inputting a plurality of input selections, a gaming unit memory device, a currency-accepting mechanism that is capable of allowing a player to deposit a medium of currency, an output device, a value-dispensing mechanism that is capable of dispensing value to the player, and a gaming unit controller operatively coupled to the input device, the gaming unit memory device, the currency-accepting mechanism, the output device, and the value-dispensing mechanism. The gaming unit controller may be programmed to allow the currency-accepting mechanism to accept a deposit of an amount of a medium of currency by a player at the gaming unit, to allow the input device to receive input for a player's wager on an occurrence of the wagering game at the input device, and to subtract the amount of the player's wager on the occurrence of the wagering game from the player's available credit at the gaming unit in response to receiving the input for the player's wager, wherein the player's available credit corresponds to the amount of the medium of currency deposited at the gaming unit. The gaming unit controller may also be programmed to allow the input device to receive input for a player's progressive jackpot wager for the occurrence of the wagering game at the input device of the gaming unit, to subtract the amount of the player's progressive jackpot wager for the occurrence of the wagering game from the player's available credit at the gaming unit in response to receiving the input for the player's progressive jackpot wager, and to cause the output device to transmit a message to the network computer to add the progressive jackpot wager amount to a progressive jackpot pool for the progressive jackpot. Further, the gaming unit controller may be programmed to determine an outcome for the player for the occurrence of the wagering game, and to determine whether the player's outcome for the occurrence of the wagering game is a progressive jackpot winning outcome in response to determining that the player's outcome for the occurrence of the wagering game is a predetermined progressive jackpot winning outcome and to receiving the player's input for a progressive jackpot wager at the input device.

BRIEF DESCRIPTION OF THE DRAWINGS

FIG. 33 is a table of pay groups for a plurality of award amounts;

FIG. 40 is a table of pay groups for a plurality of award amounts;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
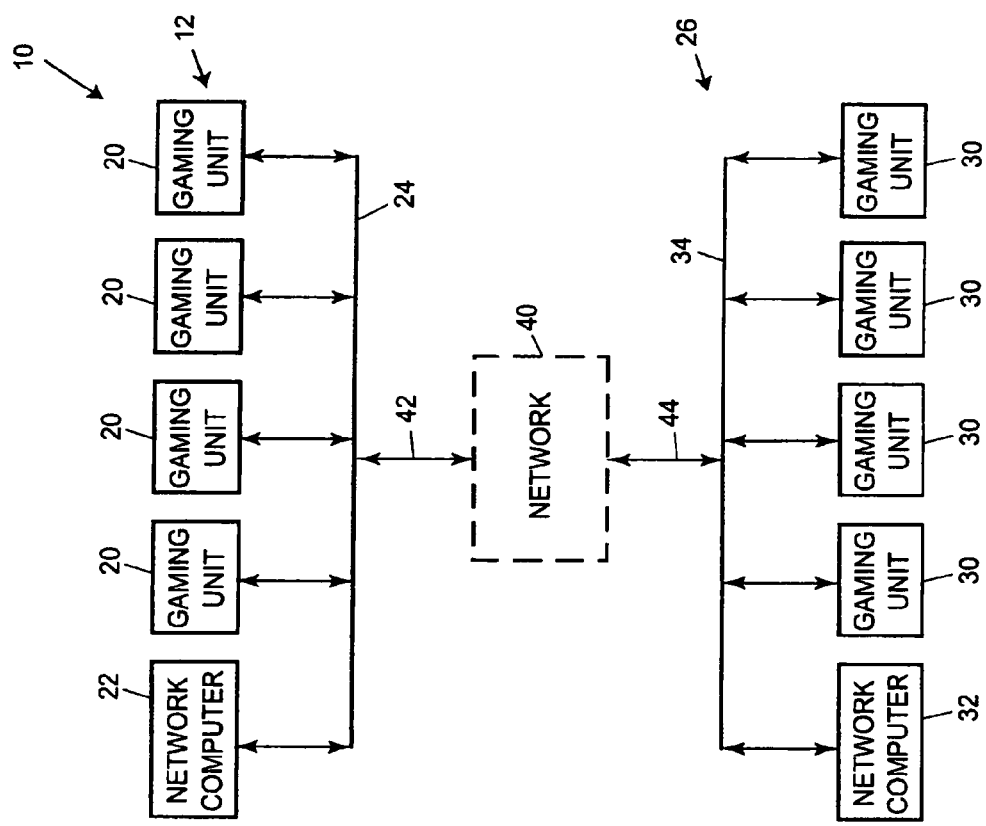
FIG. 1 is a block diagram of an embodiment of a gaming system in accordance with the invention.

FIG. 1 illustrates one possible embodiment of a Bingo gaming system 10 in accordance with the invention. Referring to FIG. 1, the Bingo gaming system 10 may include a first group or network 12 of casino gaming units 20 operatively coupled to a network computer 22 via a network data link or bus 24. The Bingo gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be configured to control the execution of a multi-player Bingo game played at a plurality of the gaming units 20, and to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
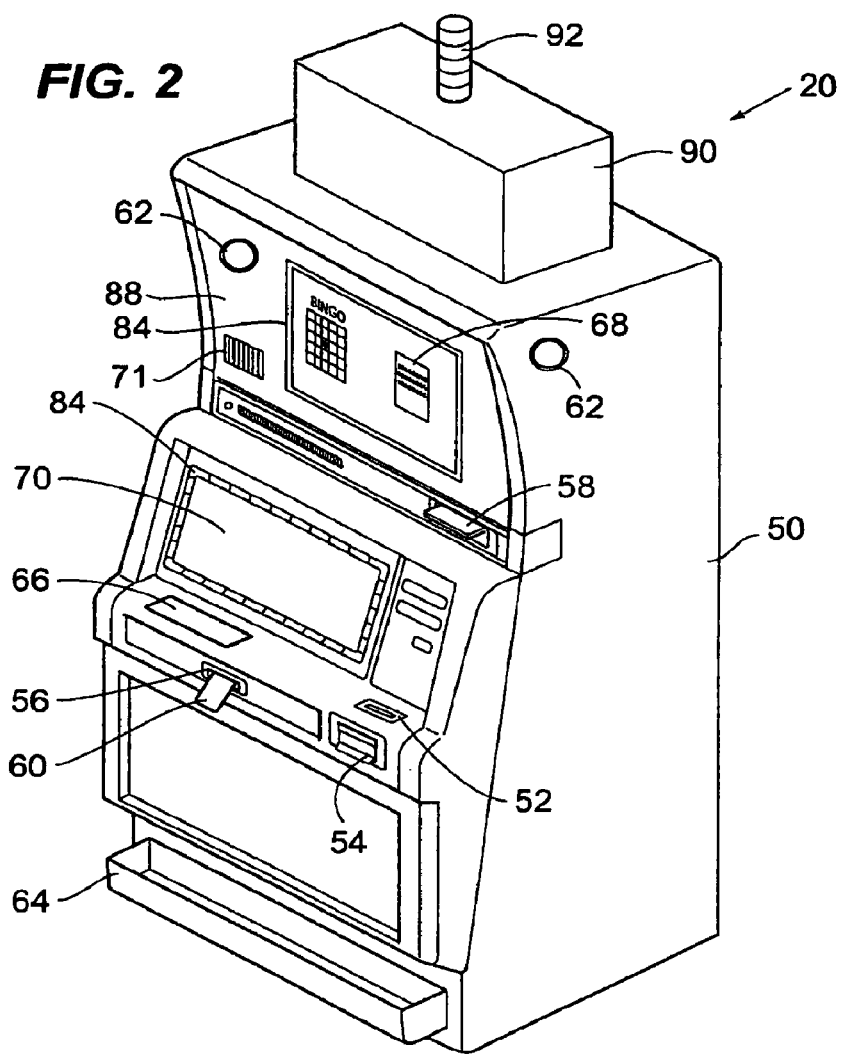
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin return tray 64, an input control panel 66, upper and lower color video display units 68, 70 for displaying images relating to the game or games provided by the gaming unit 20, a status display 71 for providing player information, such as number of credits remaining, and a light device, such as, for example, illuminated light bezels 84, a lighted topbox 88, a topper 90, and a lighted gaming candle 92, as are well known in the art. The display units 68, 70 may be video displays capable of displaying graphical images associated with the game or games offered at the gaming unit 20. For example, the display unit 68 may display images associated with the multi-player Bingo game, while the display unit 70 may display an alternate presentation of the outcome of the Bingo game in the form of another casino game, such as slots. Alternatively, one or both of the displays 68, 70 may be mechanical or electro-mechanical devices configured to display game outcomes or other graphics associated with the game(s), such as for slot reels or wheels controlled by stepper motors as is well known in the art, or any other desired mechanism. Moreover, the displays 68, 70 may be combined into a single video display device, such as a CRT or LCD.

The audio speakers 62 may generate audio representing sounds such as the noise of spinning slot machine reels, a dealer's voice, music, announcements or any other audio related to a casino game. The input control panel 66 may be provided with a plurality of pushbuttons as shown or as touch-sensitive areas in cabinet 50 or on displays 68, 70 where implemented as video displays with touch-sensitive screens or other input devices that may be pressed or otherwise actuated by a player to select games, make wagers, make gaming decisions, etc. The status display 71 may provide gaming information to the player, such as the number of credits remaining, the outcome of the current game, the payout schedule, or the like. The light bezel(s) 84 may be coupled to the front face of the cabinet 50 and may enclose a plurality of lights, and further may have an aperture, allowing the color video display unit 70 to be visible therethrough. The lighted topbox 88, the topper 90, and the lighted gaming candle 92 may be stylistic elements added to the gaming unit 20 to attract a player's attention, or to provide visual cues to gaming status.

Figure 2A:
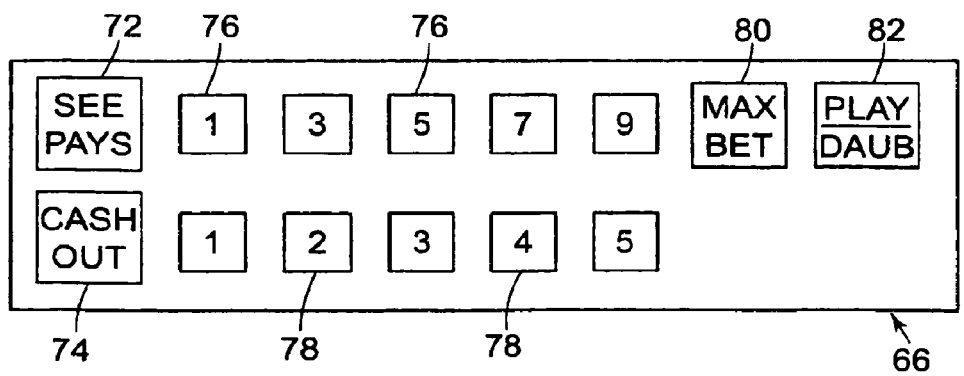
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the coin return tray 64.

For the multi-player Bingo game, the control panel of the gaming unit 20 may be provided with a plurality of selection buttons 76, each of which may allow the player to select a different number of Bingo cards to play prior to enrolling in the Bingo game. For example, five buttons 76 may be provided, each of which may allow a player to select one, three, five, seven or nine Bingo cards. Alternatively, where multiple sets of interim patterns are provided as described in more detail below, buttons 76 may allow a player to select one of the available interim pattern sets for use in the Bingo game, each of which may correspond to a different wager amount. The control panel 66 may further be provided with a plurality of selection buttons 78 each of which allows a player to specify a wager amount for each Bingo card selected, or for each interim pattern within a selected pattern set. For example, if the smallest wager accepted by the gaming unit 20 is a quarter ($0.25), the gaming unit 20 may be provided with five selection buttons 78, each of which may allow a player to select one, two, three, four or five quarters to wager for each Bingo card selected, or for each interim pattern in a selected pattern set. In that case, if a player were to activate the "5" button 76 (meaning that five Bingo cards were to be played in the Bingo game, or that a interim pattern set requiring a five credit wager was selected) and then activate the "3" button 78 (meaning that three coins per Bingo card or interim pattern were to be wagered), the total wager would be $3.75 (assuming the minimum bet was $0.25).

If the gaming unit 20 provides, for example, a slots display having a plurality of reels and a plurality of paylines which define winning combinations of reel symbols, the plurality of selection buttons 76 on the control panel 66 may allow the player to select a different number of paylines prior to spinning the reels. For example, five buttons 76 may be provided, each of which may allow a player to select one, three, five, seven or nine paylines. Further, the plurality of selection buttons 78 on the control panel 66 may further allow a player to specify a wager amount for each payline selected. The total wager amount calculation above may apply equally to the slot display where a player activates the "5" button 76 to wager on five paylines, and activates the "3" button 78 to wager three coins per payline. Ultimately, however, the selections made for the alternate display, such as the slots display, translate into a Bingo game wager.

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. Depending on the implementation, the gaming unit 20 may be configured such that a player entered in the next occurrence of the Bingo game when the "Max Bet" button is pressed by the player. The control panel 66 may include a "Play/Daub" button 82 to allow the player to enter or enroll in the next occurrence of the Bingo game and to initiate spinning of the reels of a slots game after a wager has been made, and to "daub" or mark the player's Bingo card during the Bingo game as described more fully below. Alternatively, the gaming unit 20 may be configured with separate "Play" and "Daub" buttons.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
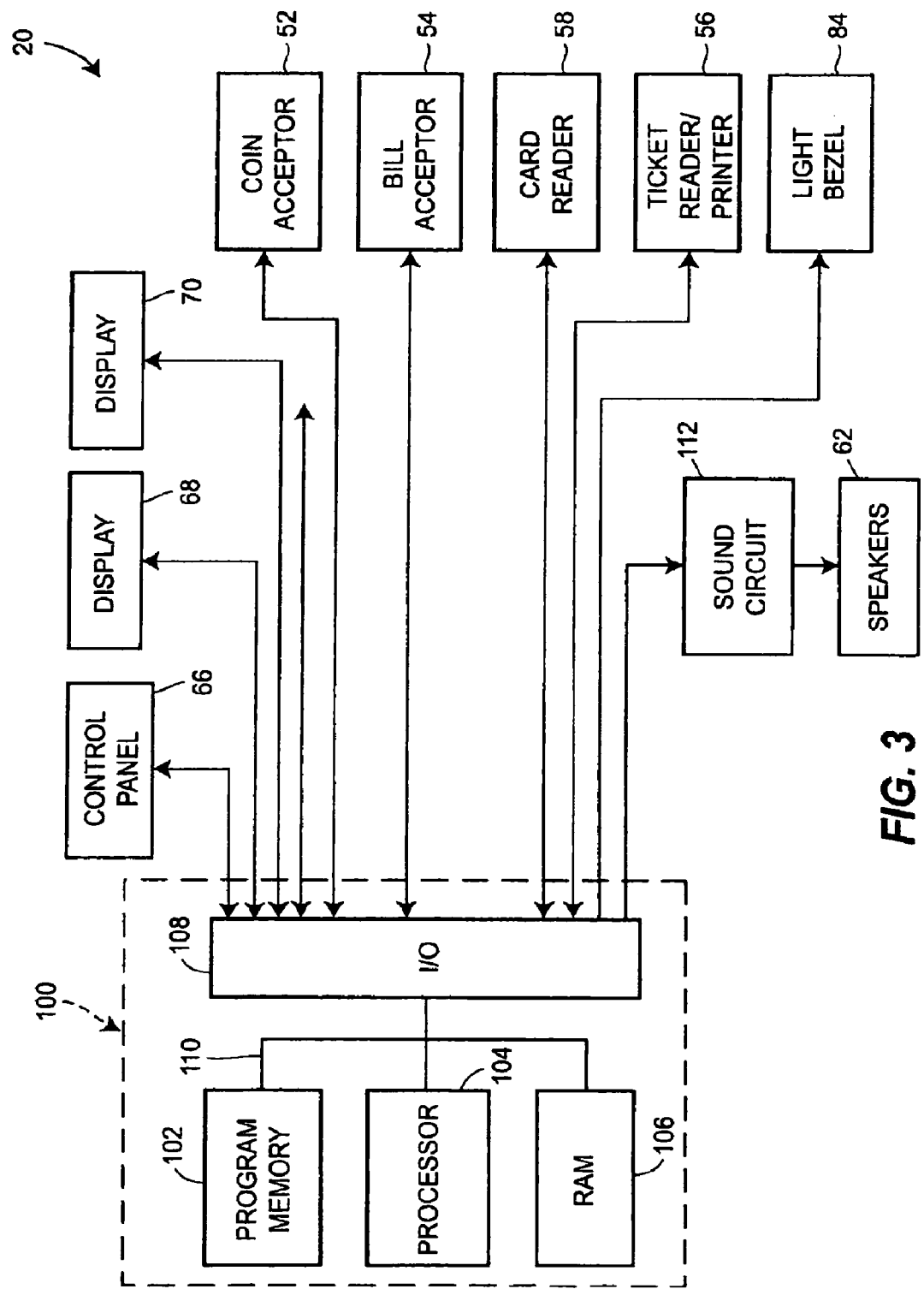
FIG. 3 is a block diagram of the electronic components of the gaming unit of FIG. 2.

FIG. 3 is a block diagram of a number of components that may be incorporated in the gaming unit 20 or alternatively, the network computer 22. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 68, 70, 84 and 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108. Moreover, while not illustrated in the figures, the components 71, 88, 90 and 92 may also be operatively coupled to the controller 100. For example, the components 71, 86, 88, 90 and 92 may be connected to the I/O circuit 108 via a respective direct line or other similar connection scheme.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Network Computer/Server Electronics

Figure 4:
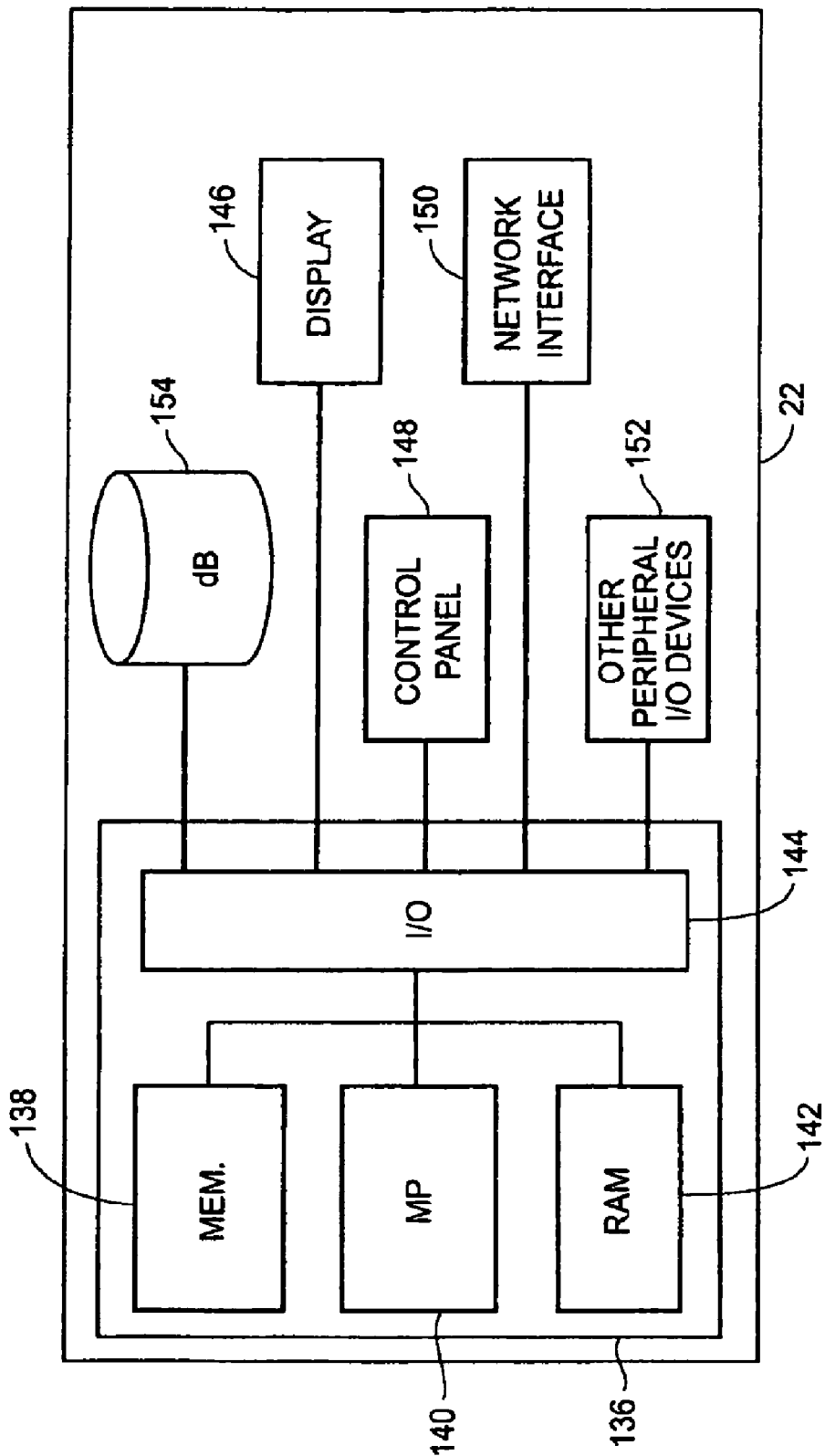
FIG. 4 is a block diagram of the electronic components of a network computer of FIG. 1.

The network 40, and hence the individual gaming units 20, 30, may be communicatively connected to network computers or servers 22, 32. Using network computer 22 as an example, the network computer 22 may be a single networked computer, or a series of interconnected computers having access to the network 10 via a gateway or other known networking system. Referring to FIG. 4, generally, the network computer 22 may include a central gaming controller 136 configured to manage, execute and control the individual gaming units 20, 30 and the routines used to play the multi-player Bingo games. The network computer 22 may include a memory 138 for storing programs and routines, a microprocessor 140 (MP) for executing the stored programs, a random access memory 142 (RAM) and an input/output bus 144 (I/O). The memory 138, microprocessor 140, RAM 142 and the I/O bus 144 may be multiplexed together via a common bus, as shown, or may each be directly connected via dedicated communications lines, depending on the needs of the network 10.

Further, the network computer 22 may be directly connected, hardwired, or indirectly connected through the I/O bus 144 to external components such as a display 146, a control panel 148, a network interface device 150 and other peripheral I/O devices 152. Examples of other peripherals device include, but are not limited to, storage devices, wireless adaptors, printers, and the like. In addition, a database 154 may be communicatively connected to the central gaming controller 136 and provide a data repository for the storage and correlation of information gathered from the individual gaming units 20, 30. The information stored within the database 154 may be information relating to individual gaming units 20, 30 such as gaming unit-specific information like a gaming unit identification code and/or location code. The database 154 may further include casino game specific information such as the total amounts wagered and paid out, game outcomes, player selection history information, and the like.

Multi-Player Bingo

Figure 5A:
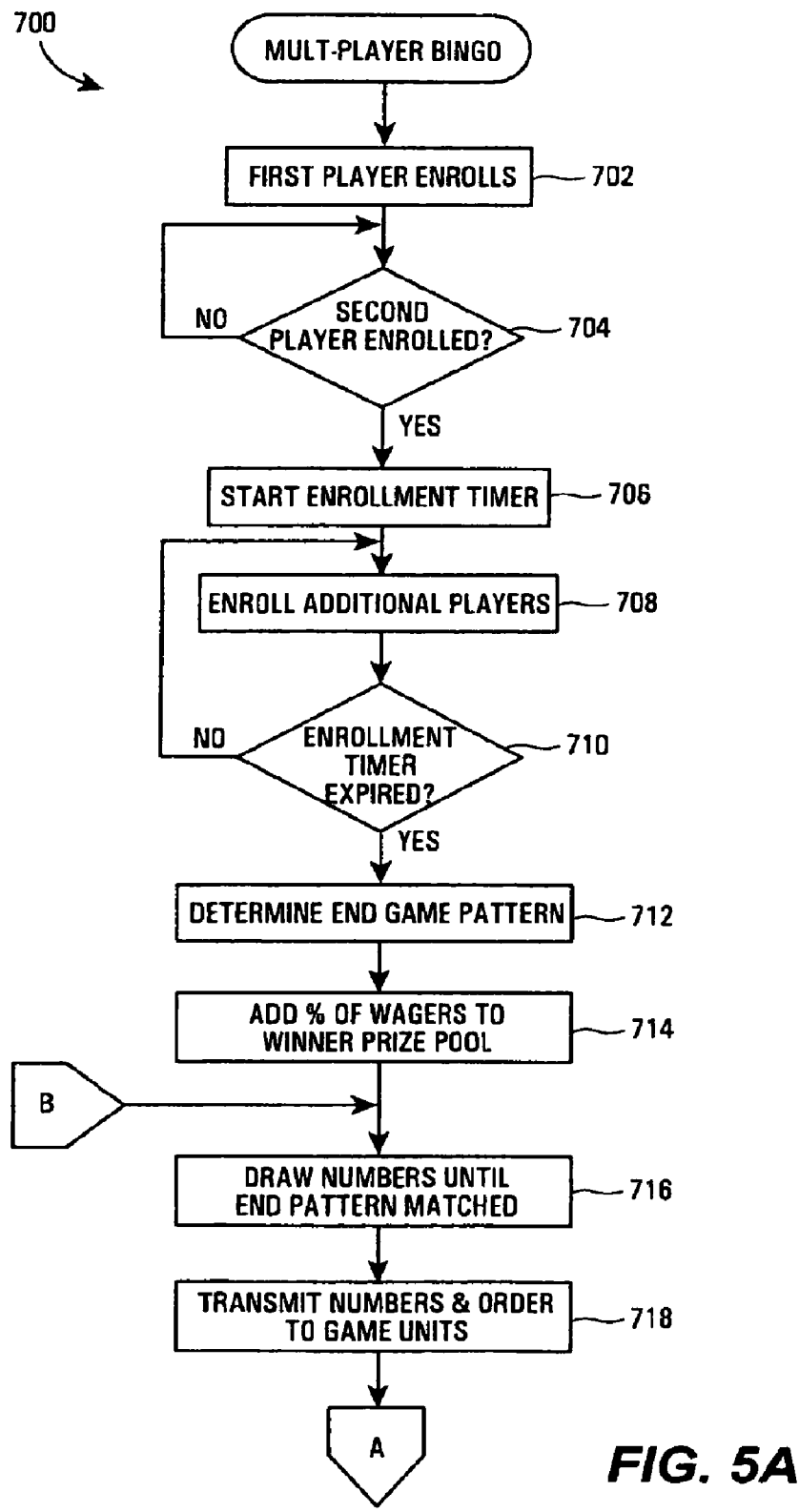
FIGS. 5A and B are a flowchart of a embodiment of a multi-player Bingo game routine that may be performed by the gaming network.
Figure 5B:
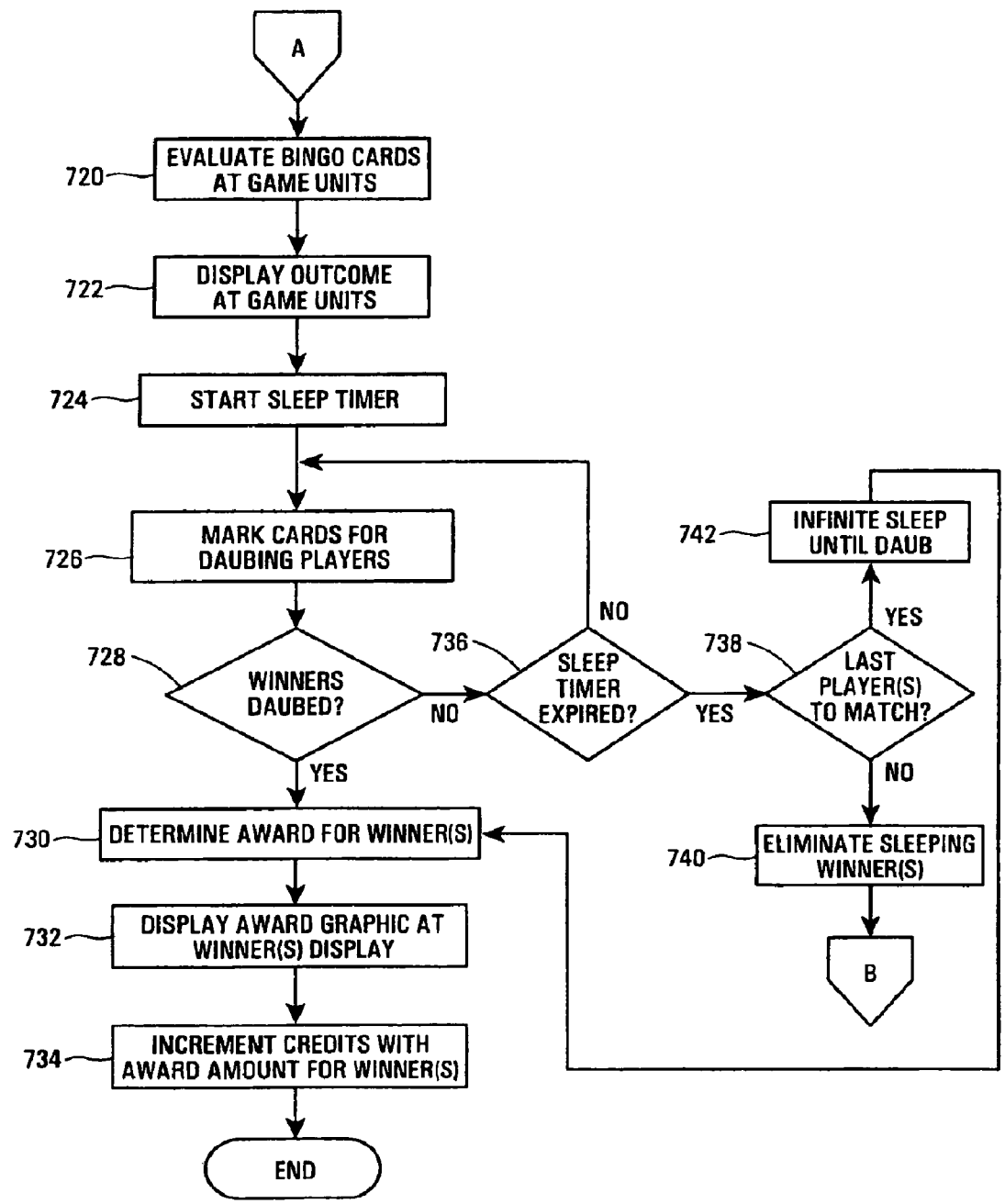

FIGS. 5A and 5B are a flowchart of a multi-player Bingo game operating routine 700 that may have portions stored in the memories of a plurality of gaming units 20 and the network computer 22 to allow a plurality of players to play a Bingo game against each other. Referring to FIG. 5A, the multi-player Bingo routine 700 may begin operation at block 702 at which a first player enrolls in the multi-player Bingo game at one of the gaming units 20. In order to enroll in the multi-player Bingo game, a player may initially deposit value in the gaming unit 20 via the coin slot 52, currency acceptor 54, ticket reader 56, card reader 58, or by any other means by which a player may obtain credits on the gaming unit 20. Once value is deposited and credits are registered on the gaming unit 20, a player may make game-specific selections for the occurrence of the Bingo game via one or more selection buttons at input control panel 66, or by touching designated portions of the video display units 68, 70.

Figure 6:
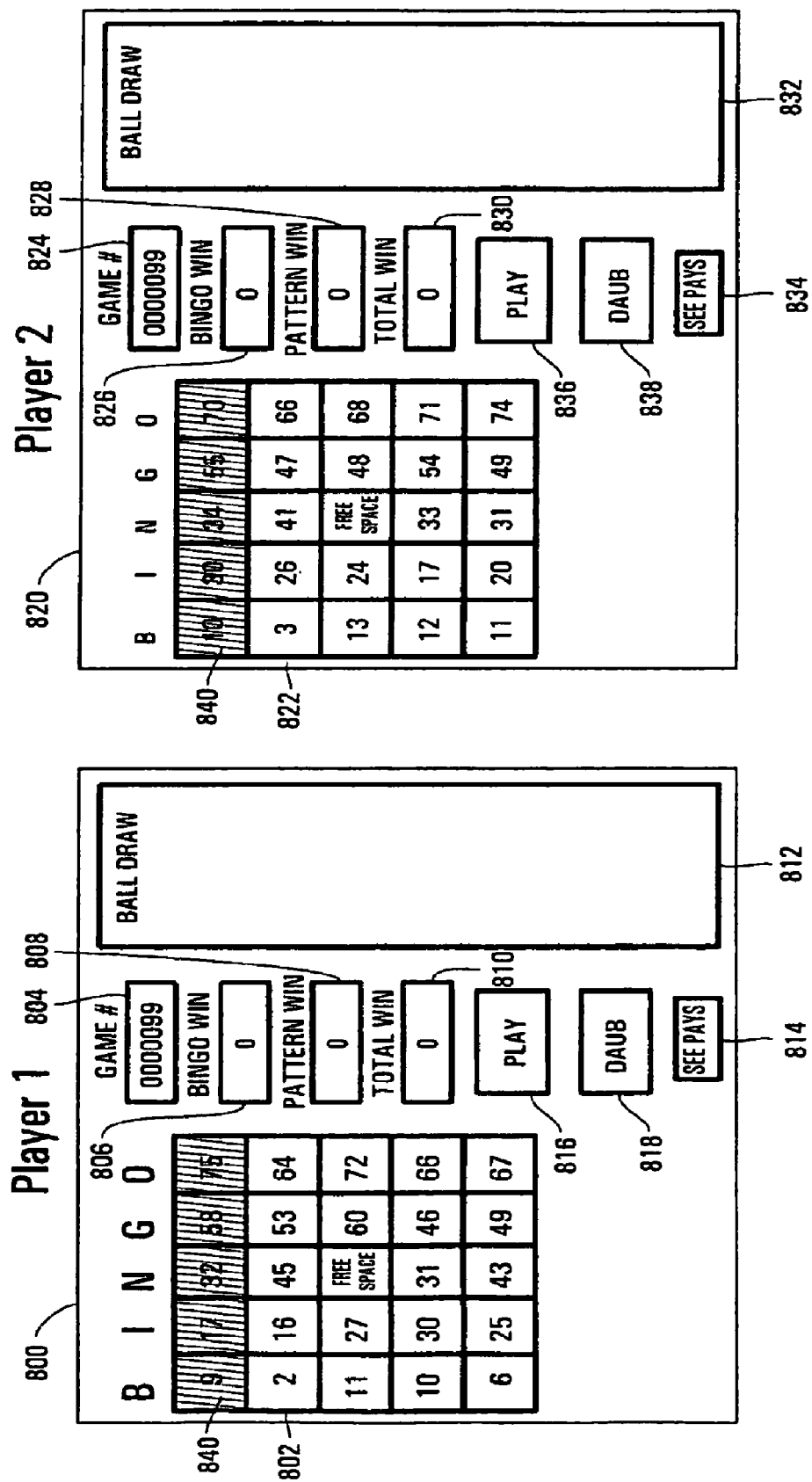
FIG. 6-15 are illustrations of visual displays that may be displayed during the performance of the multi-player Bingo game routine of FIGS. 5A and 5B.
Figure 7:
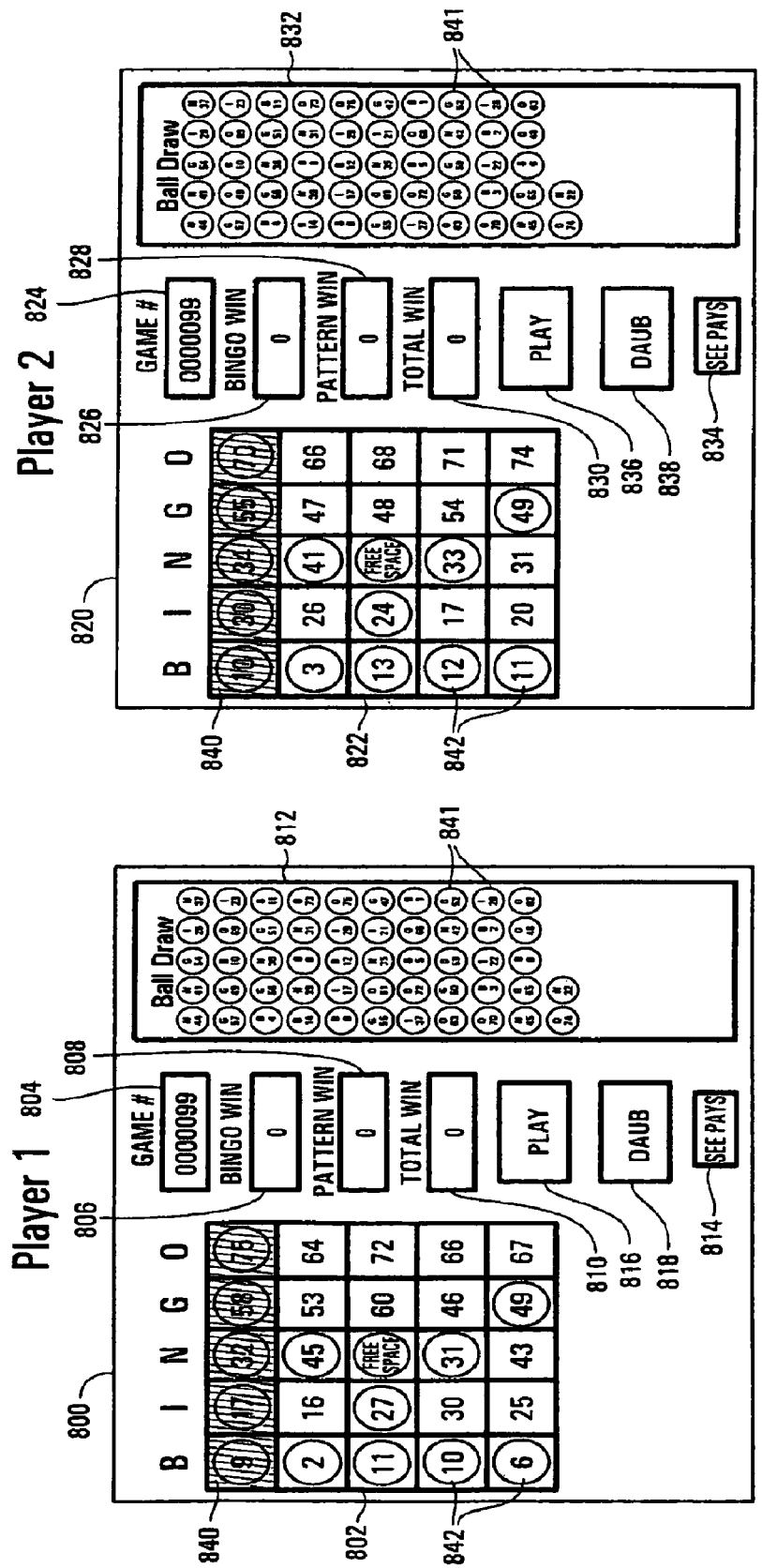

FIG. 6 illustrates an exemplary first player display 800 that may be shown on, for example, the display unit 68 during the performance of the multi-player Bingo routine 700 at a first gaming unit 20, and an exemplary second player display 802 that may be shown, for example, on the display unit 68 during the performance of the multi-player Bingo routine 700 at a second gaming unit 20. The first player display 800 may include video images 802 of a Bingo card that may represent the first player's entry in the multi-player Bingo game. In the illustrated embodiment, the Bingo card image 802 may be in the form of a traditional Bingo card as is known in the art and may consist of a 5×5 matrix of numbers, with the first column having five numbers selected from the range of 1 to 15 without repeating numbers, the second column having five numbers selected from the range of 16 to 30 without repeating numbers, the third column having four numbers selected from the range of 31 to 45 without repeating numbers and having a "Free Space" spot disposed in the middle position, the fourth column having five numbers selected from the range of 46 to 60 without repeating numbers, and the fifth column having five numbers selected from the range of 61 to 75 without repeating numbers.

The first player display 800 may include video images 804-810 corresponding to information relating to the game being executed by the network computer 22 and gaming unit 20. These images may include a game number image 804 for the Bingo game being played by the player at the gaming unit 20, a Bingo win amount image 806 displaying the amount awarded to the first player or players matching the game-winning pattern on the Bingo card 802, a pattern win amount image 808 displaying the amount awarded for matching predefined interim win patterns which will be discussed further hereinafter, and a total win amount image 810 displaying the total amount awarded to the player for the Bingo game indicated at game number 804, and an area 812 that may be used to display the numbers in the ball draw for the Bingo game in a manner illustrated more fully below. In addition, the first player display 800 may include images of buttons that, when touched by the player, may cause additional game-related information to be displayed, or may control execution of the multi-player Bingo routine 700.

For example, the first player display 800 may include a "See Pays" button 814 that, when activated, may cause the display unit 68 to generate one or more display screens showing the pattern or patterns to be matched, odds of matching the various patterns or winning the available awards, or other payout information for the Bingo game and the interim pattern wins. The first player display 800 may also display a "Play" button 816 that when touched may cause the gaming unit 20 to enroll the player in the next occurrence of the Bingo game, and a "Daub" button 818 that the player may touch to mark matched numbers on the Bingo card after the ball draw. The term "daub" in Bingo refers to marking or covering by the player, or possibly by an electronic Bingo handset, of the numbers or symbols on the Bingo card(s). With respect to the multi-player Bingo game, "daubing" refers to the player acting to mark or cover the numbers either individually or by initiating a process wherein the gaming unit 20 marks or covers the matched numbers on the Bingo card 802. While not shown, those skilled in the art will understand that a plurality of player-selectable buttons may also be displayed on the first player display 800 of the control panel 66 to allow the player to control the play of the Bingo game. The second player display 820 may be similar to the first player display 800 and display similar images, such as Bingo card 822, game number image 824, Bingo win amount image 826, pattern win amount image 828, total win amount image 830, ball draw area 832, "See Pays" button 834, "Play" button 836, "Daub" button 838, and other control buttons if necessary.

While the Bingo game illustrated herein uses a traditional 5×5 matrix of numbers with a free space in the center, those skilled in the art will understand that the Bingo game may be configured to use other configurations of numbers, characters or other game indicia arranged in any fashion wherein numbers, characters, or other indicia may be drawn and compared to the configuration, with the first player or players matching a predetermined pattern of numbers, characters or other indicia being declared the winner.

When the first player enrolls in the Bingo game, the Bingo card 802 may be selected at random by the controller 100 of the gaming unit 20. The player may be required to play the controller-generated Bingo card 802 or, alternatively, the player may be permitted to view other Bingo cards 802 and to select a Bingo card 802 for use in the Bingo game. For example, once the controller-selected Bingo card 802 is displayed to the player at video display 68, the player may be able to cycle through other Bingo cards 802 by touching the area of the video display 68 where the Bingo card 802 is displayed, or by touching other appropriate buttons either displayed on the video display 68 or located at the control panel 66. In addition to being assigned and/or selecting a Bingo card 802, the player may also enter a wager amount for the Bingo game by pressing the appropriate selection buttons on the first player display 800 or control panel 66. Selection of the wager amount is discussed further herein below. Once the Bingo card is selected for the first player, and the player enters a wager for the Bingo game, the player may enroll in a Bingo game by pressing the "Play" button 816. When the controller 100 detects that the first player has touched the "Play" button 816, the controller 100 may transmit a message to the network computer 22 indicating that the first player has enrolled in the Bingo game. In the illustrated embodiment, the gaming unit 20 may also transmit information to the network computer 22 regarding the content of the first player's Bingo card for use by the network computer 22 in a manner discussed more fully below.

Because each Bingo game is played by multiple players, the network computer 22 may be required to wait for the enrollment of additional players before drawing numbers for the occurrence of the Bingo game. Referring back to FIG. 5A, the network computer 22 may determine whether a second player has enrolled in the Bingo game and another gaming unit 20 at block 704. If the network computer 22 has not received a message from another gaming unit 20 indicating that a second player has enrolled in the Bingo game, the network computer 22 will continue to wait until receiving such a message. At the same time, the first gaming unit 20 may display a message on the first player display 800 informing the first player that the system is waiting for additional players to join the Bingo game before beginning the ball draw.

At some point, a second player at a second gaming unit 20 may select a Bingo card and desired wagering amount, and touch the play button 836 of the second player display 820 to enroll in the Bingo game. The second gaming unit 20 may detect the touching of the play button 836 by the second player and transmit the necessary enrollment message to the network computer 22 to enroll the second player. When the network computer 22 detects the enrollment message from the second gaming unit 20, control may pass to a block 706 wherein the network computer 22 may start an enrollment timer for a predetermined period of time within which additional players may enroll in the Bingo game. The enrollment period may be a fixed amount of time for all occurrences of the Bingo game, or may be capable of being changed to a desired time period by a casino employee at the network computer 22. Further, the network computer 22 may be programmed to adjust the time period dynamically as the Bingo game is being played in order to maintain a desired average number of players. For example, the network computer 22 may reduce the time period during heavy play periods to prevent too many players from enrolling, and increase the time period during light play periods to give more players the opportunity to enroll in an occurrence of the Bingo game.

During the enrollment time period, the network computer 22 and other gaming units 20 may enroll additional players in the Bingo game at block 708. The enrollment process for the additional players may be similar to the process for the first two players, with each additional player selecting a Bingo card, selecting a wager amount, and touching the play button of the gaming unit 20 and thereby causing an enrollment message to be transmitted from the gaming unit 20 to the network computer 22. If the gaming units 20 include alternative outcome displays for displaying the outcome of the Bingo game in an alternative format, such as a slots display as discussed below, animated graphics or other display, such as the spinning of video or electro-mechanical reels, may be initiated at the gaming units 20 once the second player enrolls in the Bingo game. At block 710, the network computer 22 evaluates the enrollment timer to determine whether the time for additional players to enroll in the Bingo game has expired. If the enrollment timer has not expired, the network computer 22 continues to wait for additional players to enroll in the Bingo game. Once the enrollment timer expires, the network computer 22 proceeds with conducting the Bingo game for the players that have enrolled in that occurrence of the Bingo game. Any players enrolling after the expiration of the enrollment timer may be enrolled in the subsequent occurrence of the Bingo game in the same manner. Consequently, the network computer 22 may conduct multiple occurrences of the Bingo game simultaneously.

A game-winning pattern or patterns may be predetermined and used for each occurrence of the Bingo game. Alternatively, at block 712 the network computer 22 may determine a game-winning pattern to be used for the occurrence of the Bingo game. The network computer 22 may store a plurality of predetermined game-winning patterns and randomly or serially select one or more of the stored game-winning patterns for each occurrence of the Bingo game. The predetermined game-winning patterns may include game-winning patterns used in traditional Bingo games, such as rows, columns or diagonals of numbers on the Bingo card 802, four corners matches, picture frames, coveralls, and the like. The predetermined patterns may also include nontraditional game-winning patterns such as patterns forming letters, numbers, or other symbols, or any other desired pattern that may be formed by one or more of the numbers, characters, or other game indicia used to form the Bingo card 802 for a player. Alternatively, the game-winning pattern for a given occurrence of the Bingo game may be determined at least in part on the number of players entered for the occurrence of the Bingo game in order to approach a desired distribution of the number of balls drawn for the first player to match the game-winning pattern in a manner described more fully below. Whether based on the number of players or Bingo cards enrolled for the occurrence of the Bingo game or other criteria, the game-winning patterns may be generated randomly but consistent with pre-designated parameters, such as number of spots in the game-winning pattern, number of shared spots between two or more game-winning patterns, and the like. Once the game-winning pattern is determined, the network computer 22 may transmit the game-winning pattern to the gaming units 20 which in turn may display the game-winning pattern to the players on the Bingo displays 800, 820, such as with a shaded area 840 on the Bingo cards 802, 822 corresponding to the game-winning pattern.

In some implementations of the multi-player Bingo game, the first player or players matching the game-winning pattern may be awarded a fixed prize amount, or a prize amount proportionate to the amount wagered by the player or players on the occurrence of the Bingo game. In this embodiment, a portion of each players wager on each occurrence of the Bingo game may be accumulated in a prize pool from which players may be awarded an additional prize amount for matching the game-winning pattern or other pattern in fewer than a predetermined number of balls are drawn for the occurrence of the Bingo game. For example, a player may be awarded an additional prize from the prize pool for matching a five number pattern when ten or fewer balls have been drawn, or by covering the entire Bingo card when fewer than 30 balls have been drawn. The amount of the additional prize from the prize pool may be determined in a manner described more fully below. In this embodiment, control may pass to a block 714, wherein a percentage or other predetermined portion or each player's wager on the occurrence of the Bingo game may be added to a prize pool. The portion of each players wager for the prize pool may be determined at each gaming unit 20 and transmitted to the network computer 22 or other device in the gaming network 10 where at the prize pool is accumulated and stored. Alternatively, the network computer 22 may deduct the portion for the prize pool from each of the players' wagers after the players enroll in the Bingo game. While block 714 is illustrated as occurring prior to the ball draw, the additions to the prize pool may occur at any appropriate or desired time during the Bingo game.

In this embodiment, control of the Bingo game routine 700 may pass to a block 716 wherein the network computer 22 draws numbers from the range of 1 to 75 until one or more Bingo card matches the game-winning pattern. The network computer 22 may be configured to randomly select numbers from the range of 1 to 75 without repeating numbers, and to compare the drawn number to the numbers on each players Bingo card to find matching numbers. As each number is selected and compared to the player's game cards, the network computer 22 may also compare the patterns formed by the matching numbers on each game card to the game-winning pattern for the occurrence of the Bingo game. Once the network computer 22 determines that one game card has a pattern of matched numbers matching the game-winning pattern, the network computer 22 may cease selecting numbers for the ball draw and transmit the numbers for the ball draw to the gaming units 20 corresponding to each player entered in the occurrence of the Bingo game at block 718.

The gaming units 20 receive the numbers for the ball draw from the network computer 22, and compare the drawn numbers to the corresponding players' Bingo cards at block 720 of FIG. 5B in a similar manner as the network computer 22 to identify matches between the numbers in the ball draw and the numbers on the players Bingo card. After comparing the numbers from the ball draw to the numbers on the player's card, the gaming unit 20 may further determine whether patterns formed on the player's Bingo card matches the game-winning pattern for the occurrence of the Bingo game. At block 722, each gaming unit 20 may display the outcome of the ball draw for the Bingo game at the display unit 68. In the illustrated embodiment, the numbers for the ball draw may be displayed on the Bingo displays 800, 820 in the ball draw areas 812, 832, respectively, with the numbers being displayed in the order the numbers were selected by the network computer 22. The ball draw display may further be enhanced to match the Bingo theme by encircling each number, or graphically displaying each number as being printed on the surface of a ball, and by further adding the associated letter from the word "Bingo" corresponding to the column of the Bingo card in which the number would appear. Further, where interim pattern awards may be available and interim patterns may be evaluated using a predetermined maximum number of the balls from the ball draw as discussed further below, the numbers used for the interim pattern awards may be displayed with distinctive markings, coloration or other distinguishing indicia for easy identification. Additionally, the numbers on the players' Bingo cards 802, 822 matching numbers selected by the network computer 22 in the ball draw may be highlighted on the Bingo cards 802, 822, such as by displaying phantom marks 842 to assist the players in identifying which numbers on the Bingo cards 802, 822 have been matched.

Figure 8:
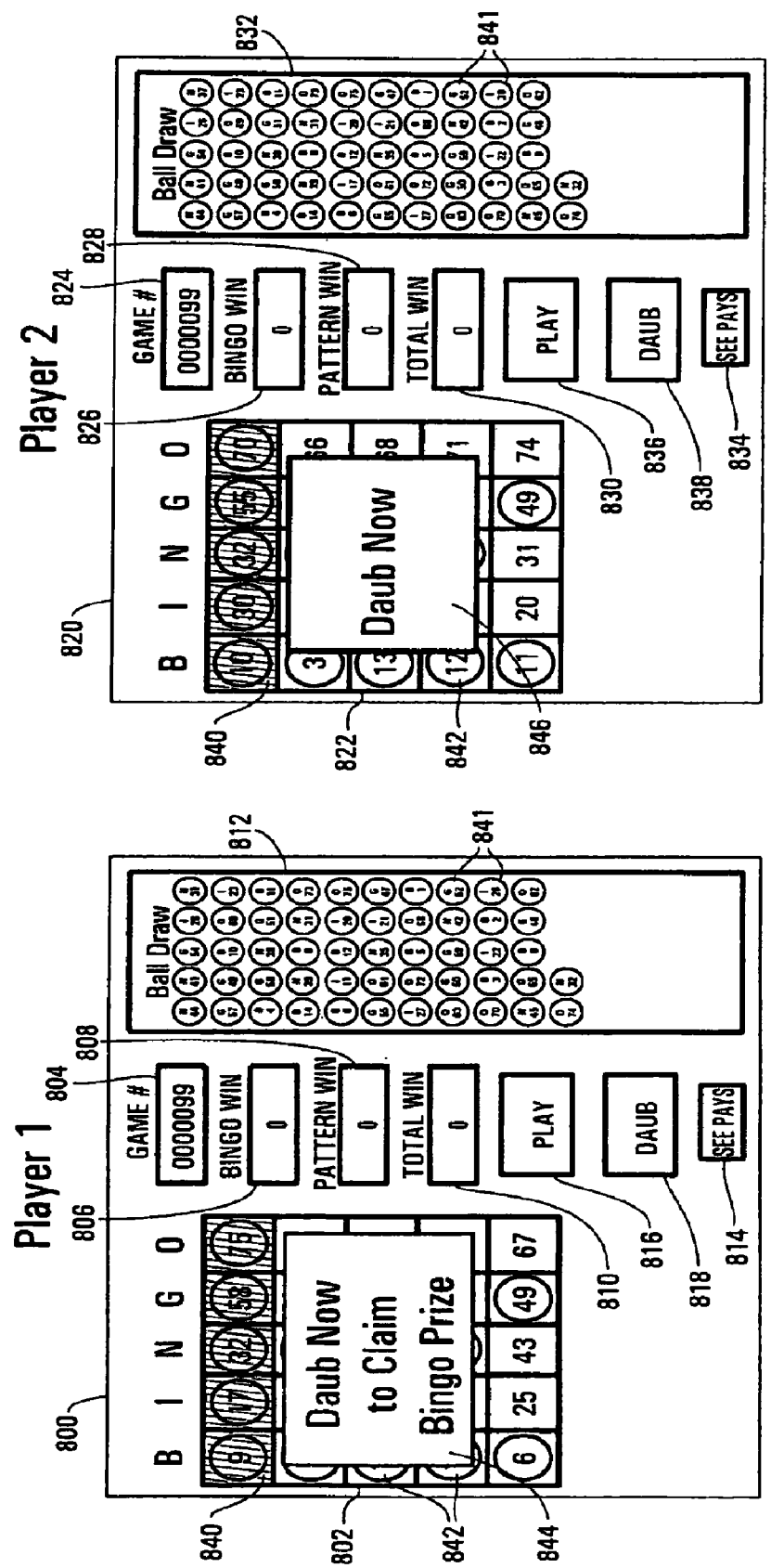

The multi-player Bingo game may be implemented such that once at least one player matches the game-winning pattern, the game is over and the player or players matching the game-winning pattern receive the corresponding Bingo win award. If the gaming units 20 include alternative outcome displays for displaying the outcome of the Bingo game in an alternative format, the alternative outcome display may also show the player's outcome for the Bingo game, such as by stopping the reels of slots display in positions corresponding to the outcome of the Bingo game. However, the multi-player Bingo game may be implemented such that the players may be required to perform a physical act to cause the matching numbers to be marked on the players' Bingo cards. In fact, such a physical act may be a regulatory requirement in the jurisdiction in which the multi-player Bingo game is implemented. In the embodiment of the Bingo game routine 700 illustrated in FIGS. 5A and 5B, players may be required to daub in order to have the matching numbers marked on their Bingo cards, and the winning players may be required to daub their Bingo cards in order to claim the award for the occurrence of the Bingo game. In this embodiment, at block 722, each gaming unit 20 may be configured to display prompts to the players, such as prompts 844, 846 on the Bingo displays 800, 820, respectively, of FIG. 8, instructing the players to daub in order to complete the Bingo game. The same prompt may be displayed for all players, or different prompts may be displayed to players who may have a winning Bingo card. For example, as illustrated in FIG. 8, the first player with Bingo card 802 may be one of the first players to match the game-winning pattern. In this case, the prompt 844 displayed to the first player may instruct the player to daub the Bingo card to claim the Bingo game prize. The Bingo game prize may be claimed by the winning player by touching the "Daub" button 818 to acknowledge the prompt. The remaining players, such as the second player, that have not matched the game-winning pattern may be shown a prompt 846 that may merely instruct the players to daub in order to complete the Bingo game, which may be accomplished by touching the "Daub" button 838.

Figure 9:
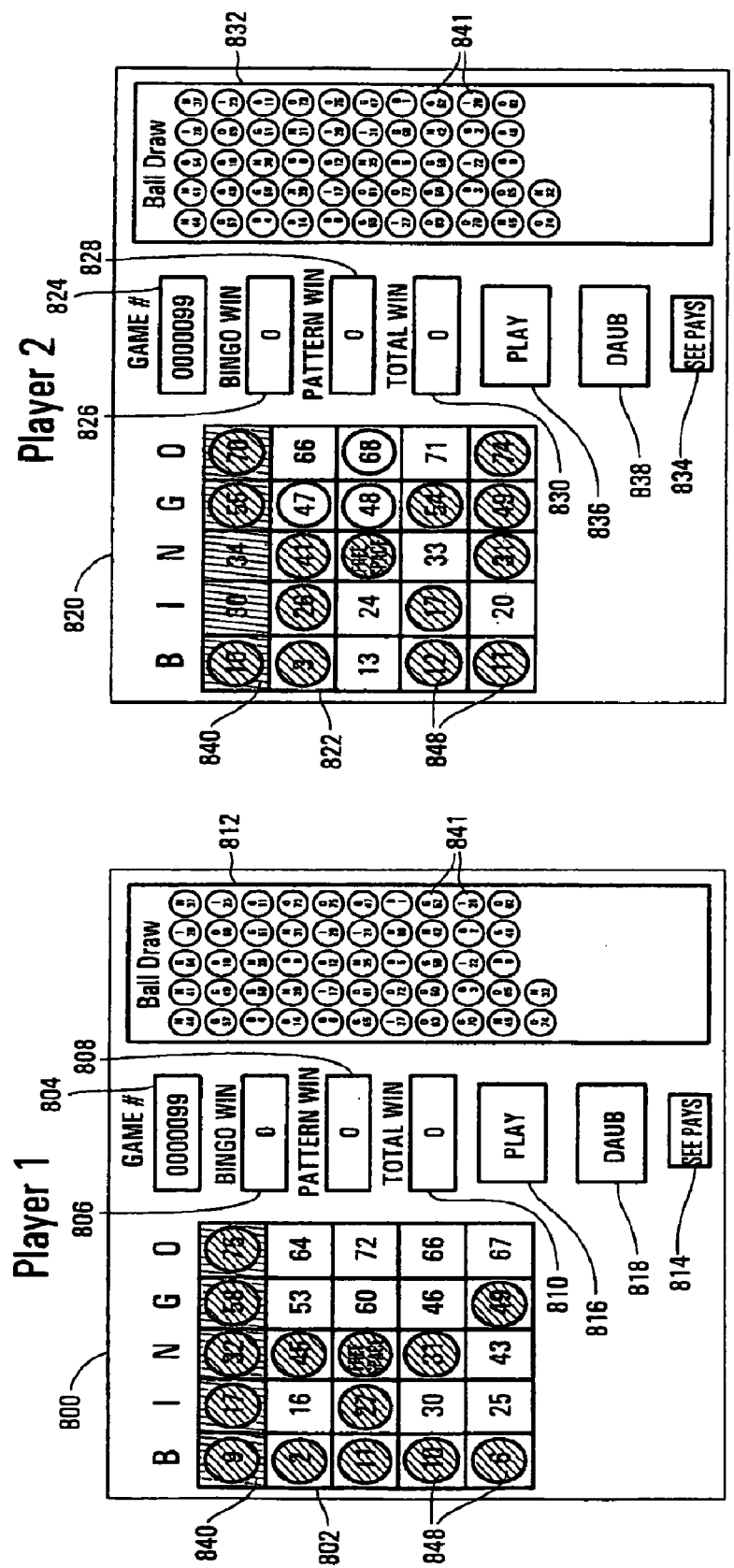

Once the initial ball draw is transmitted from the network computer 22 to the gaming units 20, and the ball draw and phantom marks 842, if any, are displayed to the players at their respective gaming units 20, control may pass to a block 724 wherein a sleep timer may be initiated with a predetermined amount of time within which the winning player or players must daub their Bingo cards in order to claim the Bingo game award. A sleep timer may be set at each gaming unit 20 at which the player matches the game-winning pattern, or a single timer may be set at the network computer 22. During the sleep timer period, the gaming units 20 may mark the matching numbers on the players Bingo cards as the players touch the corresponding "Daub" buttons 818, 838. Shown in FIG. 9, the phantom marks 842 on the Bingo cards 802, 822 may be changed into daub marks 848 by the gaming units 20 as the gaming units 20 detect the players touching the "Daub" buttons 818, 838. Also during the sleep timer period, the network computer 22 and/or gaming units 20 may evaluate whether one or more players matching the game-winning pattern has daubed the players Bingo card at block 728. If the winner or winners of the occurrence of the Bingo game have daubed their Bingo cards, control passes to a block 730 wherein the Bingo win award may be determined for the winning player or players at either the corresponding gaming units 20, or at the network computer 22. As previously discussed, the Bingo win award may be a fixed award amount, an amount proportionate to the players wager, a portion or all of an accumulated prize pool, or a combination of various award amounts.

Figure 10:
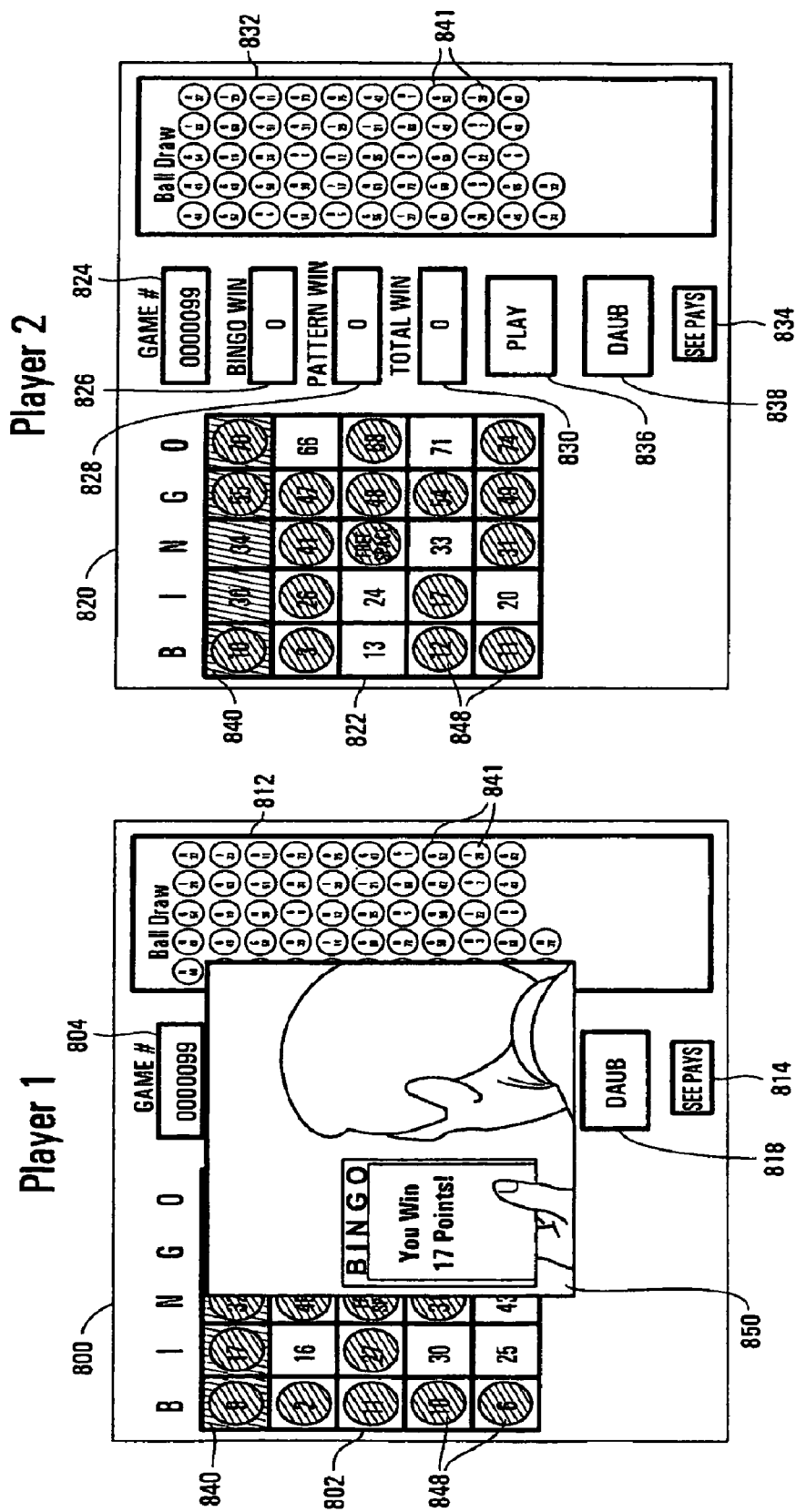
Figure 11:
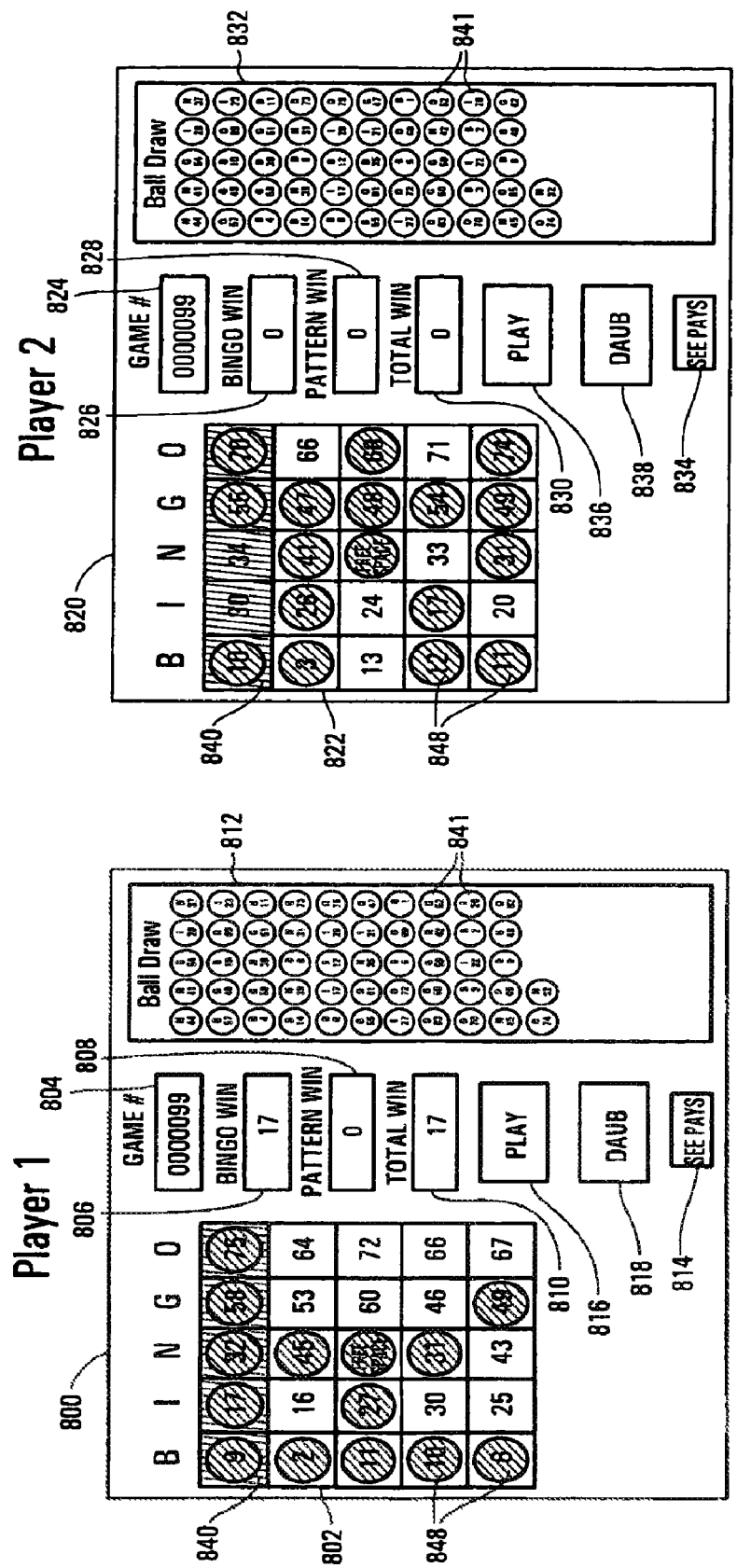

After the Bingo game award or awards are determined, control may pass to block 732 wherein an award image, such as the award image 850 illustrated in FIG. 10, may be displayed to the winning players at the corresponding gaming units 20. The award image 850 may include a summary of the award amount, a congratulatory message to the winning player or players, and other images that may enhance the winning experience of the player or players. The award image 850 may be displayed for a predetermined amount of time or until the player touches the display unit 68 to acknowledge the display of the game award. At this time, an alternative outcome display at the gaming unit 20 may also show the player's outcome for the Bingo game, such as by stopping the reels of slots display in positions corresponding to the outcome of the Bingo game. After the award graphic is displayed, control may pass to a block 734 wherein the credits at the gaming units 20 for the winning players are incremented by the award amount. As illustrated in FIG. 11, the Bingo game award may further be reflected at the Bingo display 800 by updating the Bingo win amount image 806 and the total win amount image 810 to reflect the amount won by the player for the corresponding Bingo game.

If the network computer 22 and game units 20 do not detect that the winner or winners of the Bingo game have daubed their Bingo cards at block 728, control passes to a block 736 that determines whether the sleep timer has expired. If the sleep timer has not expired, control passes back to block 726 wherein the gaming units 20 continue to mark the Bingo cards of the corresponding players as the players touch the "Daub" button 818, 838. If the sleep timer expires without any winner or winners of the Bingo game daubing their Bingo cards, control passes to a block 738 wherein the network computer 22 may determine whether all the players have slept through their opportunity to win the Bingo game. If players remain that have not slept through their opportunity to win the Bingo game, i.e., players whose Bingo cards have not yet matched the game-winning pattern, control passes to a block 740 wherein the winner or winners who have failed to daub their Bingo cards are eliminated from being able to claim the prize for the Bingo game. For example, after the potential winner sleeps through the player's opportunity to win the Bingo game, the network computer 22 may flag or otherwise indicate that the player has slept through the player's opportunity to win the occurrence of the Bingo game. Additionally, the players sleeping through the period for daubing the players' winning Bingo cards may be notified that the right to claim an award for the Bingo game has been relinquished by displaying an image on the video display 68 of the corresponding gaming unit 20, such as the image 852 on the Bingo display 800 shown in FIG. 12. However, where multiple game-winning patterns are used in the Bingo game, a player sleeping through a match of one of the game-winning pattern may be eliminated from claiming that Bingo win, but may be permitted to win the Bingo game if the player matches another game-winning pattern later in the ball draw and successfully daubs their Bingo card.

Figure 12:
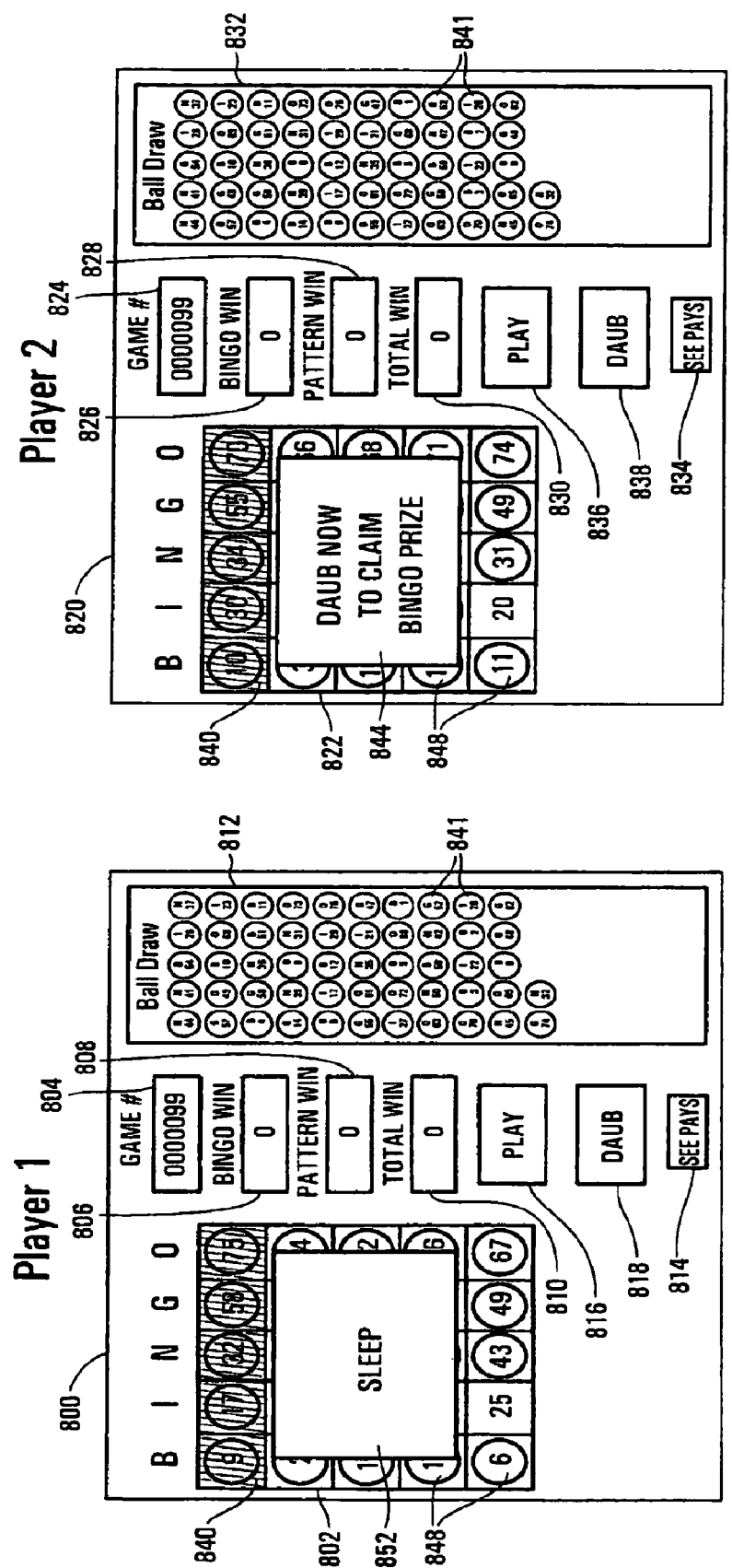
Figure 13:
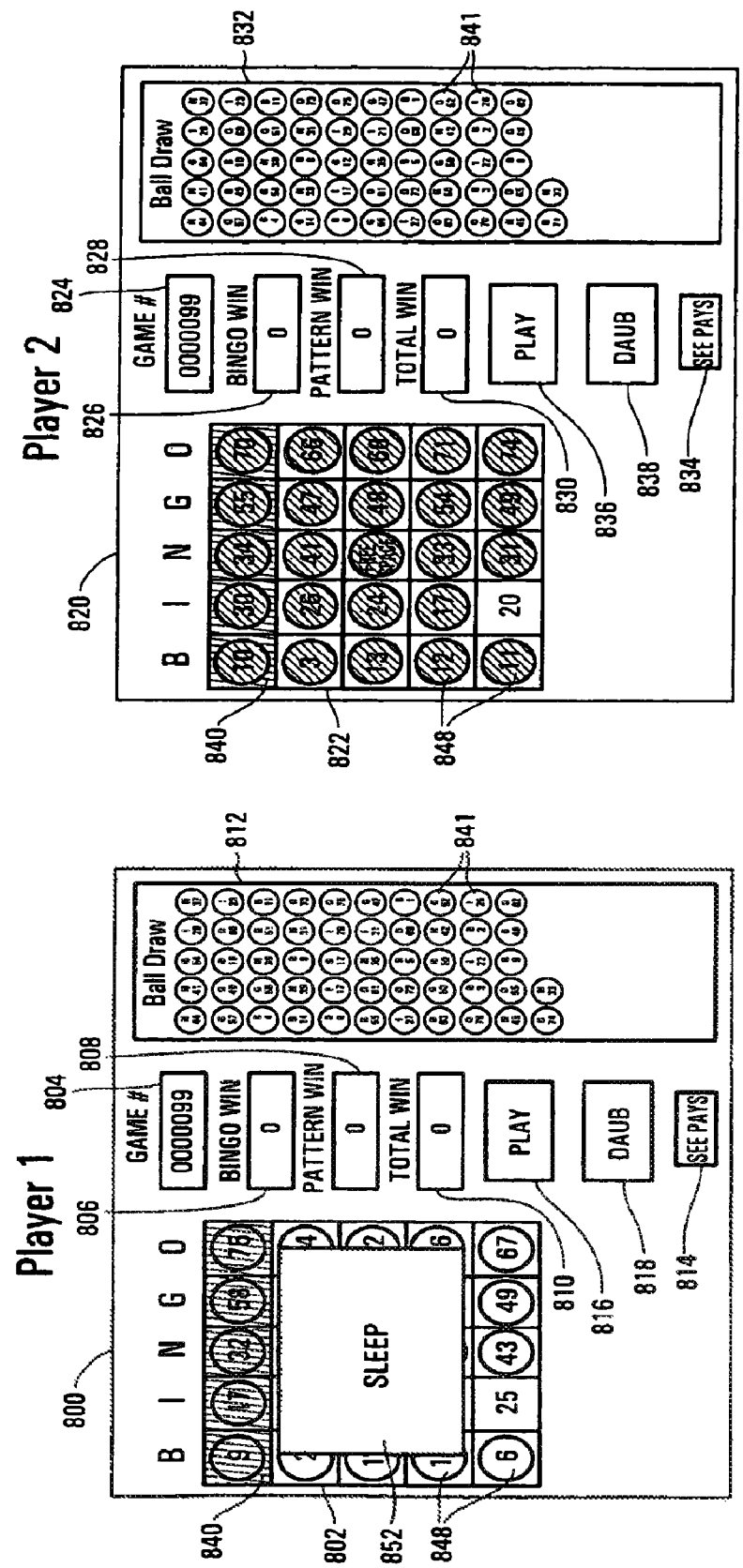
Figure 14:
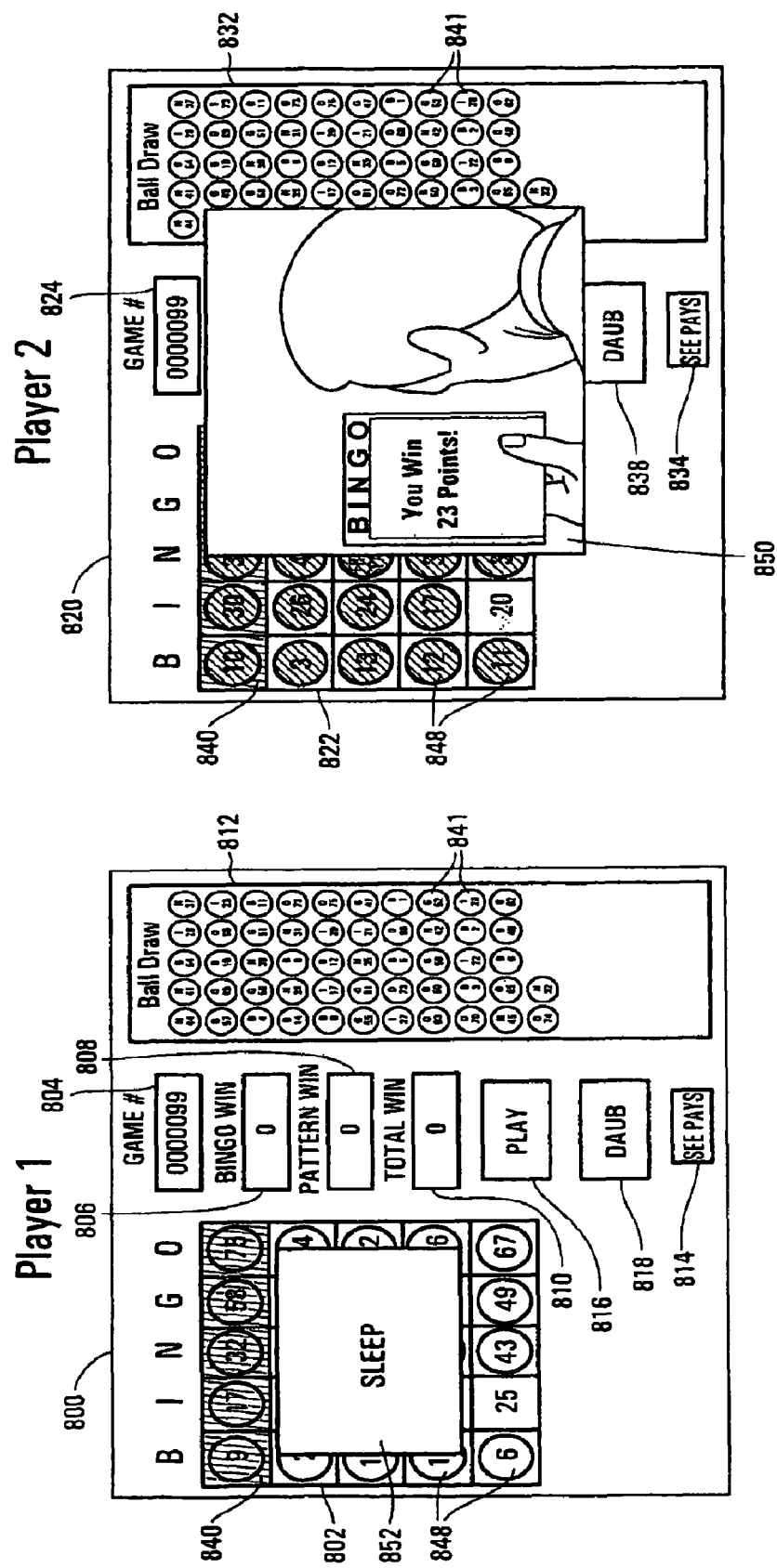
Figure 15:
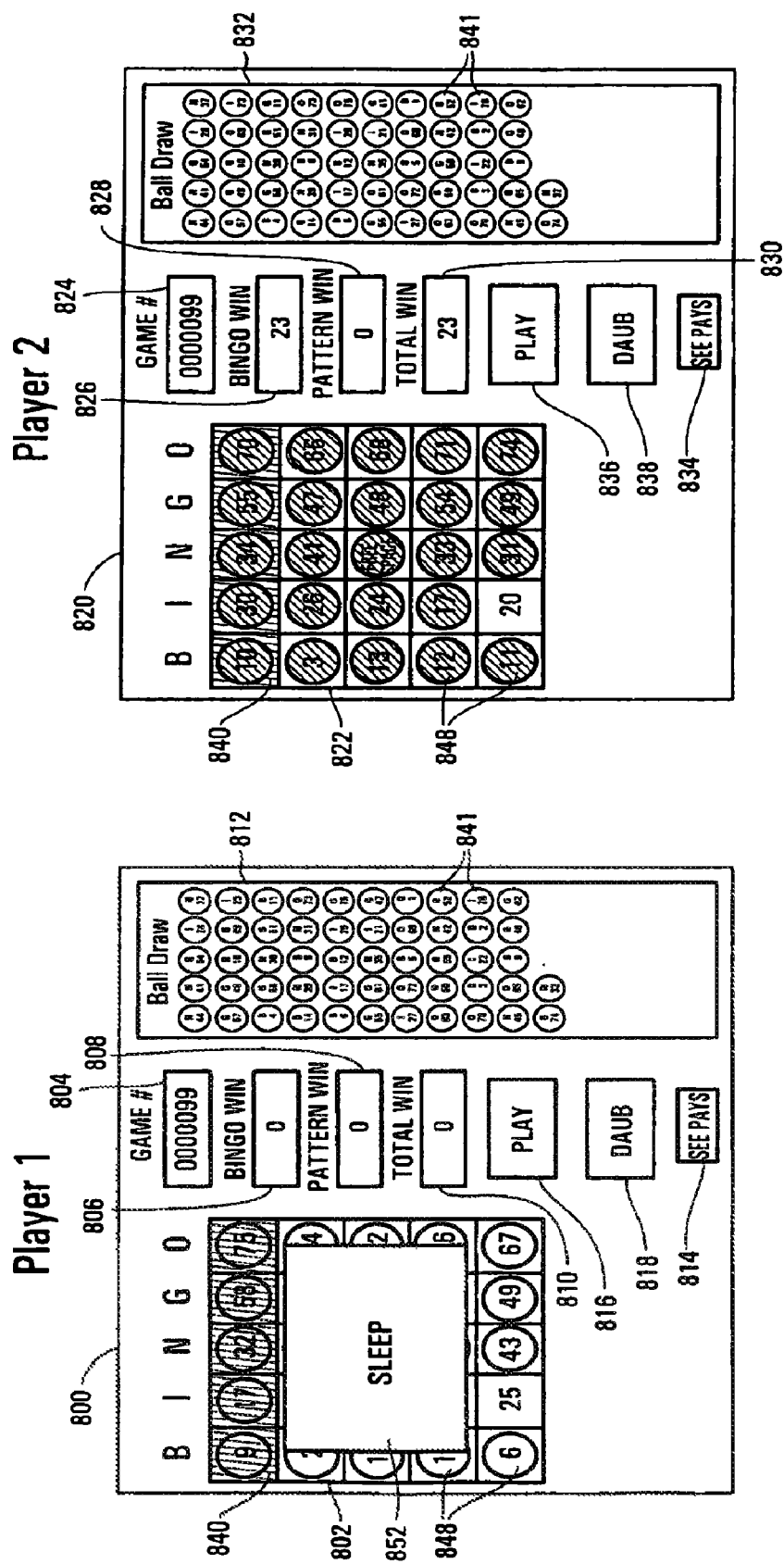

After eliminating the sleeping player or players, control may return to block 716 wherein the network computer 22 may draw additional numbers until at least one Bingo card of the remaining players matches the game-winning pattern. The Bingo game routine 700 continues in the manner previously described, with the game computer 22 transmitting the numbers to game units 200 at block 718, and the game units evaluating the players Bingo cards at block 720. At block 722, the display of the outcome of the Bingo game displayed at the video display 68 at the game units 20 may be updated to reflect the continuation of the ball draw. For example, as shown in FIG. 12, the Bingo display 820 may be updated to display the additional numbers in the ball draw area 832, display additional phantom marks 842 at the numbers on the Bingo card 822 matching the newly drawn Bingo numbers, and display the prompt 844 instructing the player to daub to claim the players Bingo prize. The sleep timer may be reinitiated at block 724, and the gaming units 20 may mark the players Bingo cards as the players touch the "Daub" button 818, 838 at block 726 (see additional daub marks 848 at FIG. 13) until either all the winners daub (block 728) or the sleep timer expires (block 736). If the remaining player or players matching the game-winning pattern have daubed their Bingo cards, Bingo win awards are determined at block 730 and the award image 850 may be displayed at the video display 86 of the gaming units 20 corresponding to the winning players at block 732 (see, e.g., award image 815 displayed at Bingo display 820 in FIG. 14) and the Bingo award amounts may be credited to the winning players at block 734 (see, e.g., Bingo win amount 826 and total win amount 830 on Bingo display 820 at FIG. 15).

Returning to block 738, if the network computer 22 determines that the last remaining player has slept through daubing the players Bingo card, several alternatives are possible for terminating the Bingo game. In the illustrated embodiment, control passes to a block 742 wherein the gaming units 20 involved in the occurrence of the Bingo game may sleep infinitely until one of the gaming units 20 detects a player daubing their Bingo card by touching the "Daub" button 838. Once the last remaining player daubs, control may pass to block 730 to conclude the occurrence of the Bingo game. During this time, casino personnel may be alerted to the suspended Bingo game by displaying messages at the gaming units 20, network computer 22, or any other component of the Bingo gaming system 10 used to monitor the activity occurring in the Bingo gaming system 10, by illuminating the candles 92 mounted on the gaming units 20, or by any other mechanism available within the system for alerting casino personnel to abnormal conditions within the Bingo gaming system 10. Alternatively, the occurrence of the Bingo game may be terminated after a predetermined period of time, with the wagers on the terminated game being retained by the Bingo gaming system 10. During the time that the last remaining player sleeps, players that earlier slept through their Bingo wins may be permitted to daub their Bingo cards, collect interim pattern awards if any, and continue playing subsequent Bingo games without waiting for the last remaining player to claim the Bingo win.

Figure 16A:
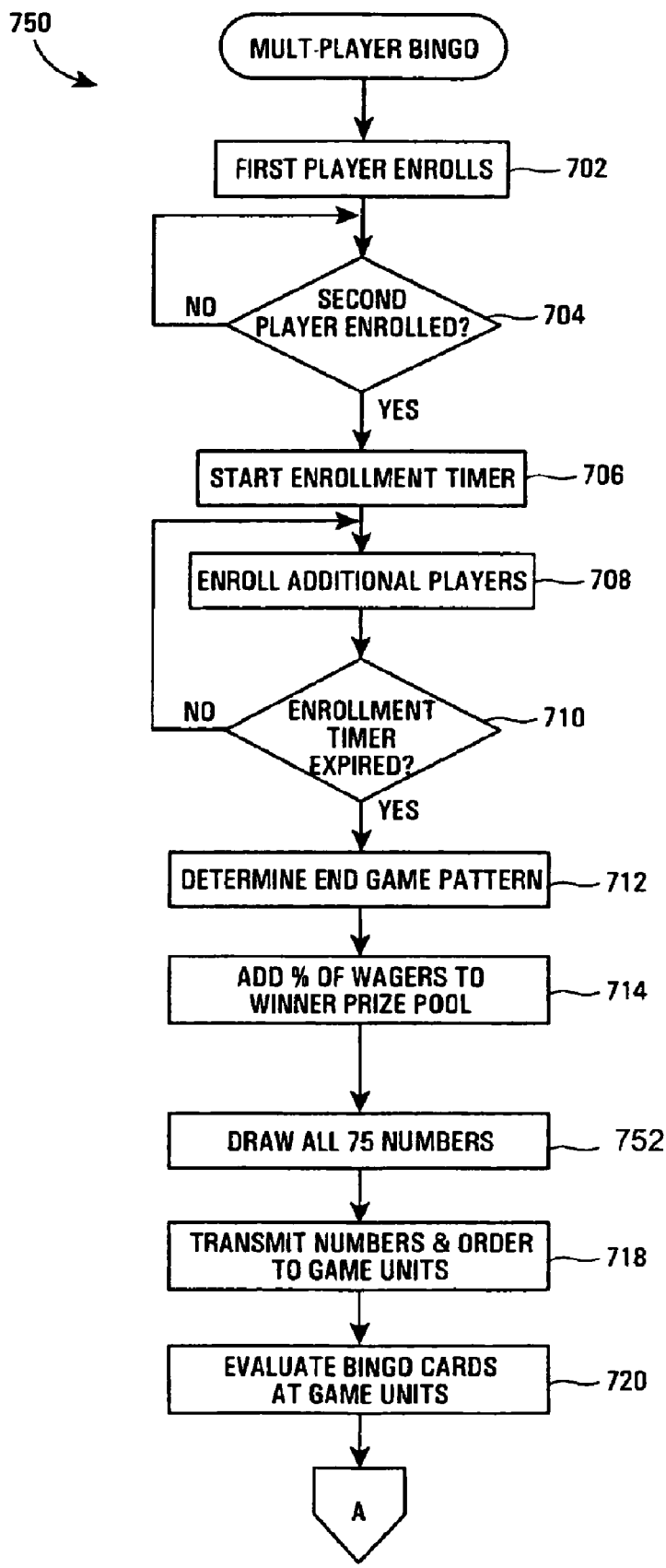
FIGS. 16A and 16B are a flowchart of another embodiment of a multi-player Bingo game routine that may be performed by the gaming network.
Figure 16B:
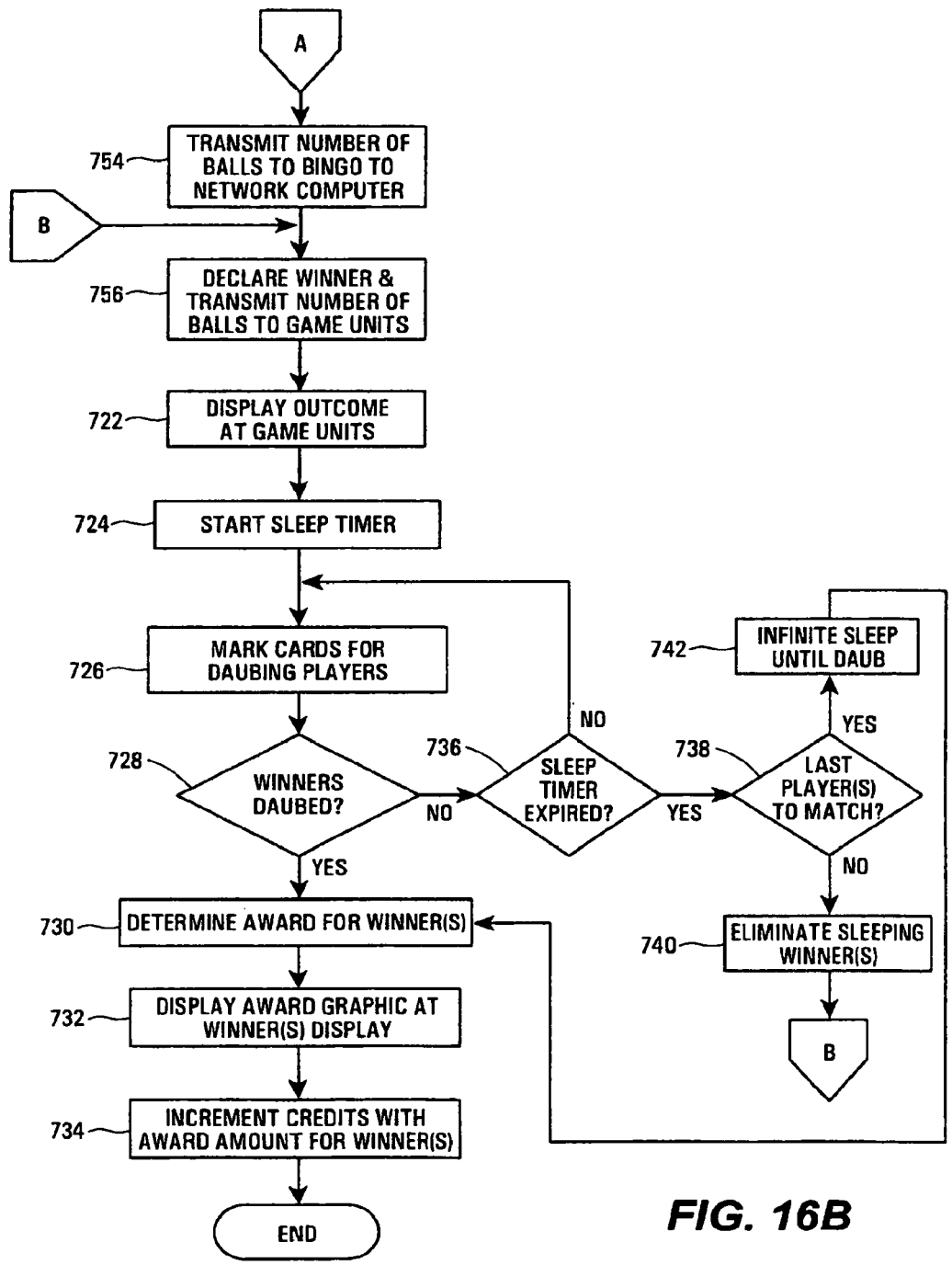

While the routine 700 illustrates the network computer 22 drawing numbers and comparing the drawn numbers to the Bingo cards until a player or players matches the game-winning pattern, other methods are contemplated for conducting the ball draw and comparison to the Bingo cards. FIGS. 16A and 16B illustrate an alternative multi-player Bingo game routine 750 wherein the network computer 22 may draw all seventy-five balls before any balls are compared to the Bingo cards. The routine 750 may have the same general flow as the routine 700 of FIGS. 5A and 5B, with similar process steps in the flowcharts being identified by the same reference numbers. The enrollment of the players in an occurrence of the Bingo game at blocks 702, 706 and 708 may proceed as previously discussed. However, the gaming units 20 may not be required to transmit information relating to the players' Bingo cards to the network computer 22 since the Bingo cards may be compared to the ball draw at the gaming units 20 only. The routine 750 may continue as previously discussed for routine 700 until control passes to a block 752 wherein the network computer 22 may randomly draw all seventy-five numbers to determine the order for the entire ball draw.

After drawing all seventy-five numbers, the network computer 22 may transmit the numbers to the gaming units 20 at block 718, and the gaming units 20 may evaluate the corresponding Bingo cards at block 720 to determine how many numbers from the ball draw are required for the Bingo cards to match the game-winning pattern. After the gaming units 20 evaluate the Bingo cards, control may pass to a block 754 wherein the gaming units 20 may transmit the number of balls required for the corresponding Bingo cards to match the game-winning pattern to the network computer 22. Upon receiving the numbers from the gaming units 20, at block 756, the network computer 22 may declare a winner or winners for the Bingo game by comparing the number of balls to Bingo transmitted by the gaming units 20.

After determining the winner or winners, the network computer 22 may transmit the number of balls to Bingo for the winner or winners to the gaming units 20, each of which may determine whether the corresponding player is a winner by comparing the number of balls to Bingo transmitted by the network computer to the number of balls to Bingo for the player. Control may then pass to block 722 and the routine 750 may conclude the occurrence of the Bingo game in a similar manner as previously described for routine 700. In the event a player sleeps through a win, once the sleeping player is eliminated at block 740, control pass may back to block 756 wherein the network computer 22 may declare the player or players requiring the next fewest balls to match the game-winning pattern the new winner of the Bingo game. By drawing all seventy-five balls at once and transmitting the entire ball draw to the gaming units 20 in a single network communication, the routine 750 may be able to reduce the amount of network traffic in the Bingo gaming system 10.

Figure 17A:
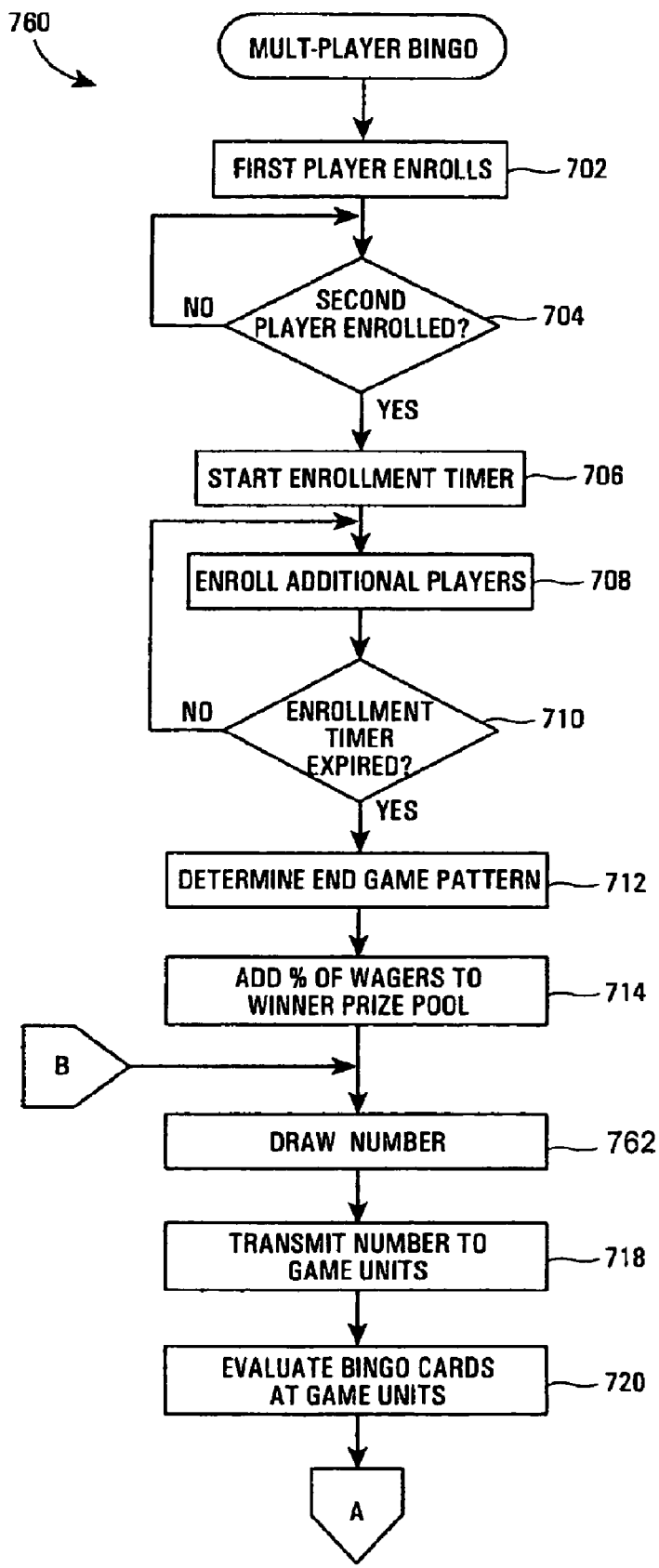
FIGS. 17A and 17B are a flowchart of a further embodiment of a multi-player Bingo game routine that may be performed by the gaming network.
Figure 17B:
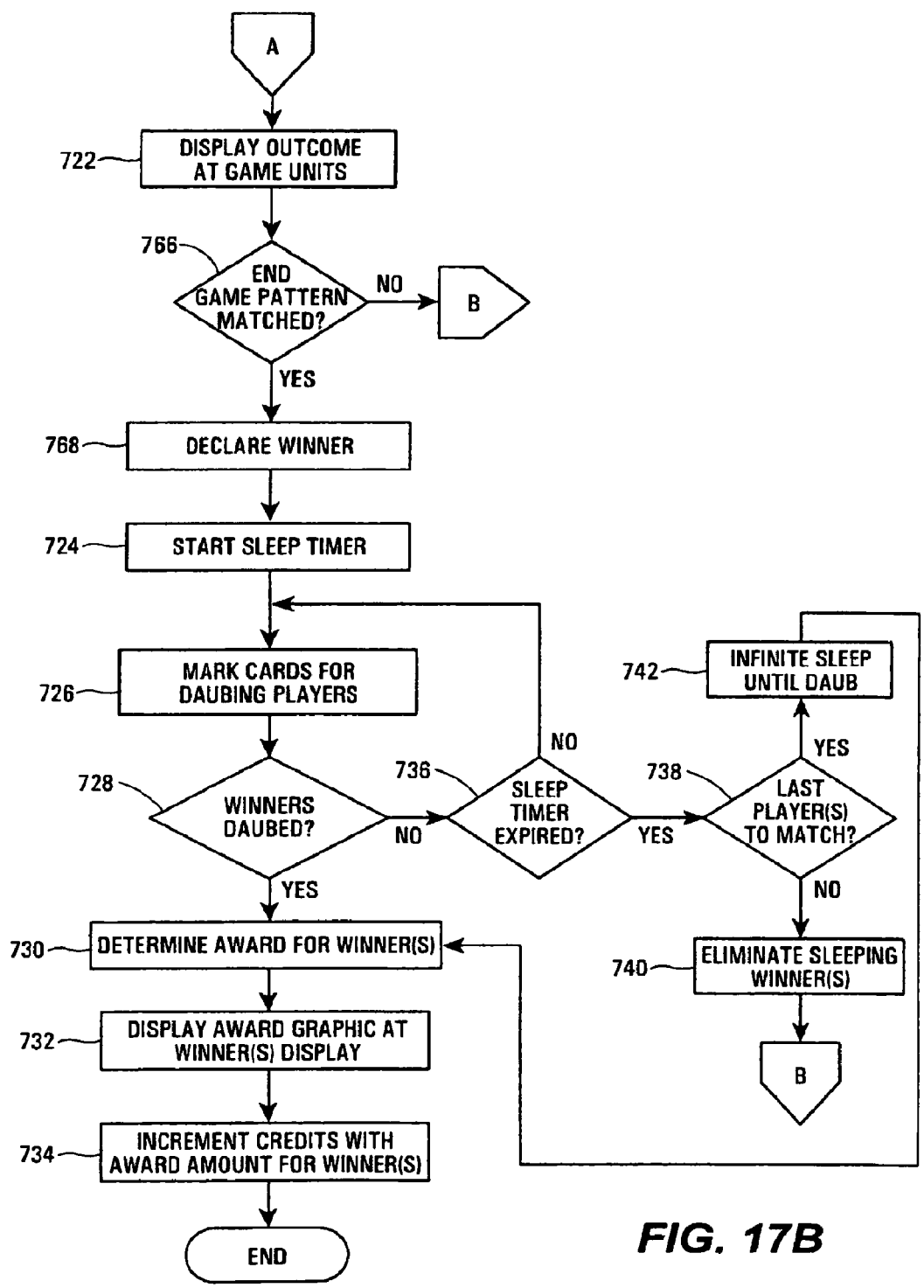

In a further alternative method for conducting the ball draw and comparison of the ball draw to the Bingo cards that may closely mirror the game flow of a traditional Bingo game, the network computer 22 may draw one number at a time and transmit each drawn number to the gaming units 20 for comparison the corresponding Bingo cards. FIGS. 17A and 17B illustrate an alternative multi-player Bingo game routine 760 wherein the network computer 22 may draw a single number and transmit the number to the gaming units 20 for comparison to the Bingo cards. The routine 760 may have the same general flow as the routine 700 of FIGS. 5A and 5B, with similar process steps in the flowcharts being identified by the same reference numbers. The enrollment of the players in an occurrence of the Bingo game at blocks 702, 706 and 708 may proceed as previously discussed. However, the gaming units 20 may not be required to transmit information relating to the players' Bingo cards to the network computer 22 since the Bingo cards may be compared to the ball draw at the gaming units 20 only. The routine 760 may continue as previously discussed for routine 700 until control passes to a block 762 wherein the network computer 22 may randomly draw one number from the range of 1 to 75.

After drawing the number, the network computer 22 may transmit the number to the gaming units 20 at a block 764, and the gaming units 20 may evaluate the corresponding Bingo cards at block 720 to determine whether the number matches a number on the Bingo card. After the gaming units 20 evaluate the Bingo cards, control may pass to block 722 to update the display at the gaming units with the drawn number and phantom marks at matching numbers on the Bingo cards. Control may then pass to a block 766 wherein each gaming unit 20 may determine whether the game-winning pattern is matched by a pattern on the corresponding Bingo card. If at least one Bingo card matches the game-winning pattern, control may pass to a block 768 wherein the gaming units 20 having Bingo cards matching the game-winning pattern may transmit a corresponding message to the network computer 22, and the network computer 22 may declare a winner or winners for the Bingo game based on the messages transmitted by the gaming units 20 and transmit a corresponding message to the gaming units 20. Control may then pass to block 724 and the routine 760 may conclude the occurrence of the Bingo game in a similar manner as previously described for routine 700. If none of the Bingo cards matches the game-winning pattern, control may pass back to block 762 wherein the network computer 22 may randomly draw another number, and may continue in this manner until one of the Bingo cards matches the game-winning pattern.

Figure 18A:
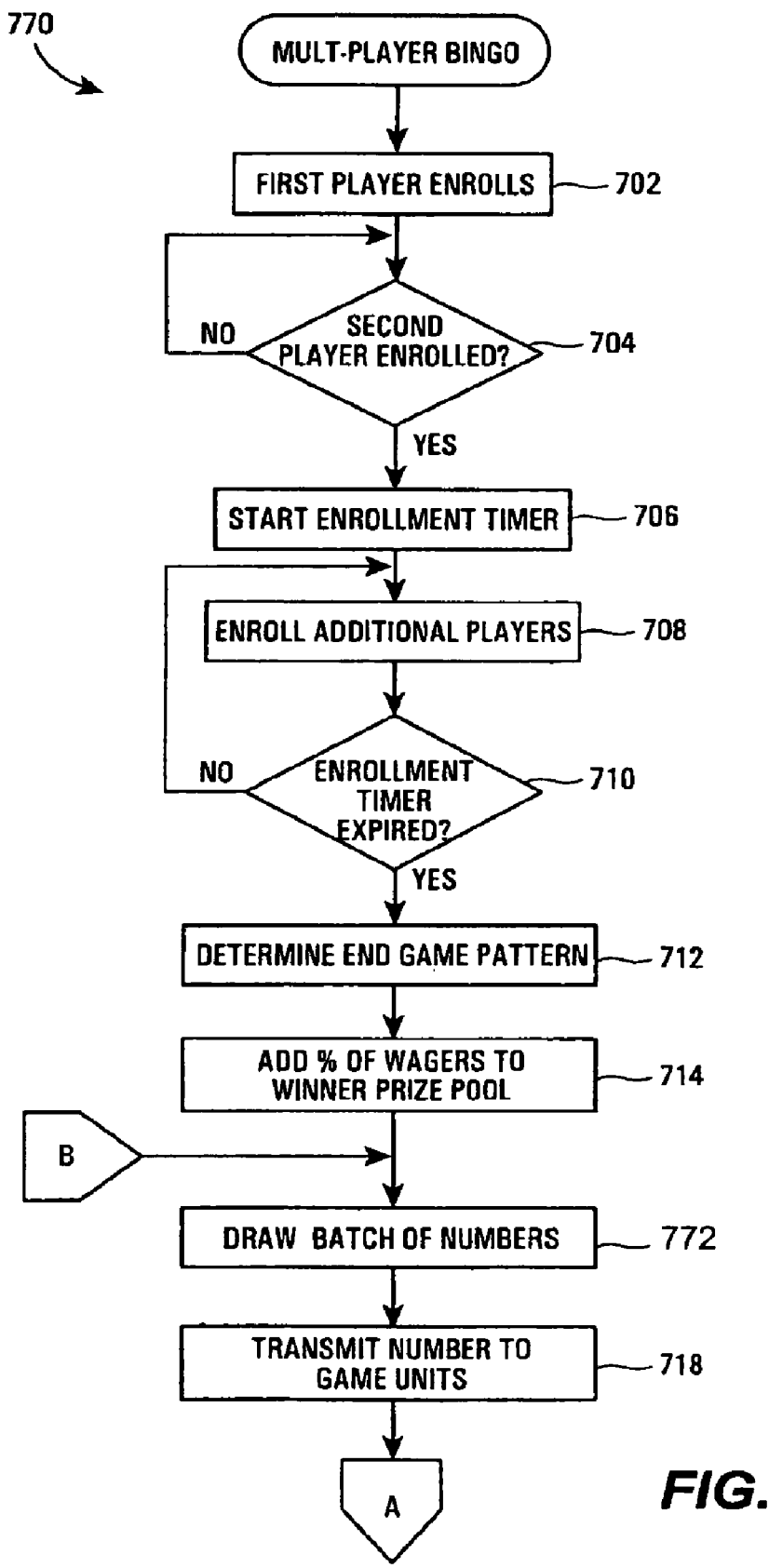
FIGS. 18A and 18B are a flowchart of a still further embodiment of a multi-player Bingo game routine that may be performed by the gaming network.
Figure 18B:
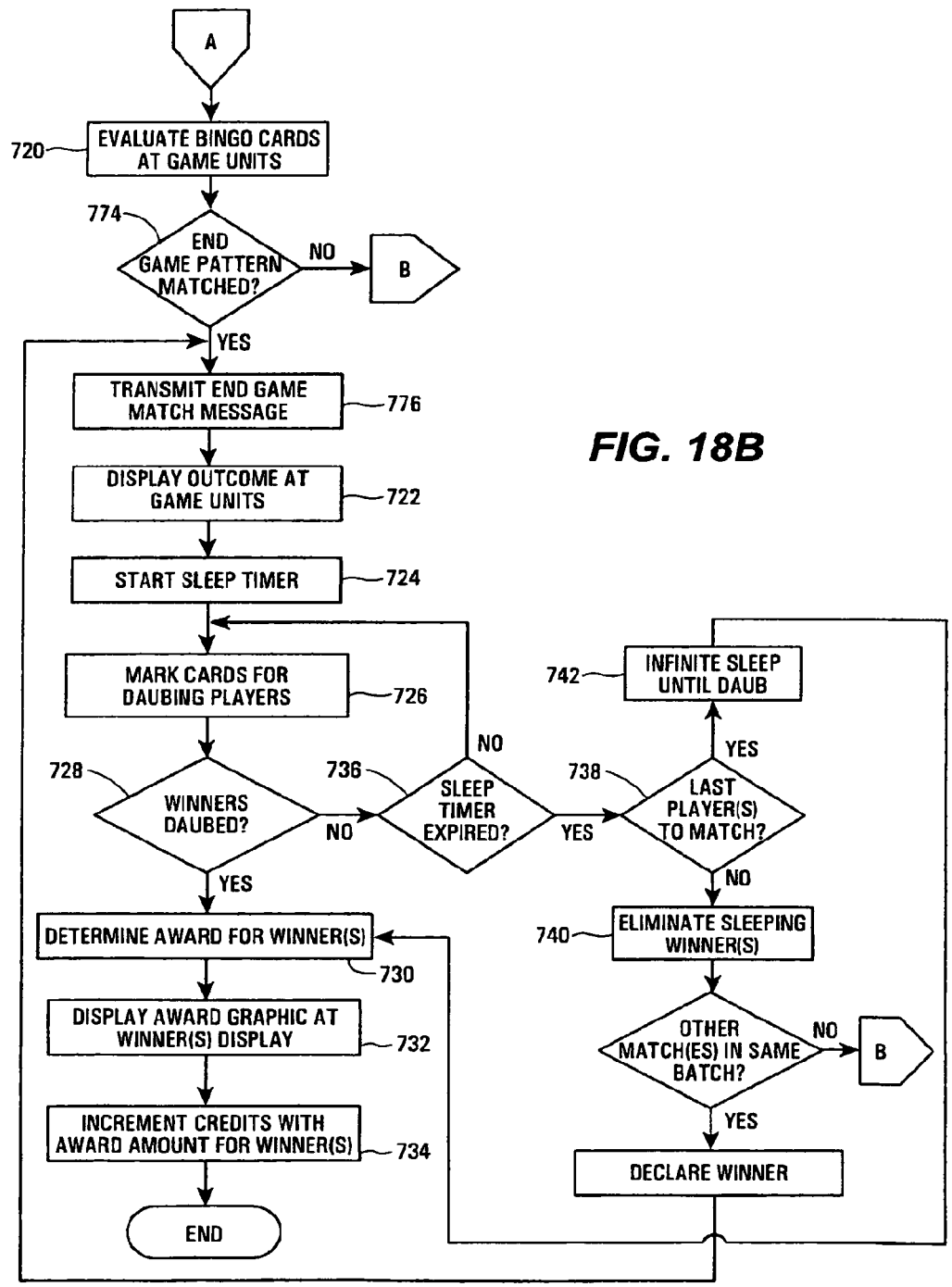

In a still further alternative method for conducting the ball draw and comparison of the ball draw to the Bingo cards, the network computer 22 may draw a batch of numbers, such as five, ten, fifteen or other desired size batch, and transmit the drawn batch of numbers to the gaming units 20 for comparison the corresponding Bingo cards. FIGS. 18A and 18B illustrate an alternative multi-player Bingo game routine 770 wherein the network computer 22 may draw a batch of numbers and transmit the batch of numbers to the gaming units 20 for comparison to the Bingo cards. The routine 770 may have the same general flow as the routine 700 of FIGS. 5A and 5B, with similar process steps in the flowcharts being identified by the same reference numbers. The enrollment of the players in an occurrence of the Bingo game at blocks 702, 706 and 708 may proceed as previously discussed. However, the gaming units 20 may not be required to transmit information relating to the players' Bingo cards to the network computer 22 since the Bingo cards may be compared to the ball draw at the gaming units 20 only. The routine 770 may continue as previously discussed for routine 700 until control passes to a block 772 wherein the network computer 22 may randomly draw a batch of numbers from the range of 1 to 75.

After drawing the batch of numbers, the network computer 22 may transmit the batch of numbers to the gaming units 20 at block 718, and the gaming units 20 may evaluate the corresponding Bingo cards at block 720 to determine whether the numbers in the batch of numbers match numbers on the Bingo card. Control may then pass to a block 774 wherein each gaming unit 20 may determine whether the game-winning pattern is matched by a pattern on the corresponding Bingo card, and on which number from the batch of numbers the game-winning pattern was matched. If at least one Bingo card matches the game-winning pattern, control may pass to a block 776 wherein the gaming units 20 having Bingo cards matching the game-winning pattern may transmit a corresponding message to the network computer 22, including the number on which the game-winning pattern was matched. The network computer 22 may declare a winner or winners for the Bingo game based on the messages transmitted by the gaming units 20 and the number on which the game-winning pattern was matched, and transmit a corresponding message to the gaming units 20. Control may then pass to block 722 wherein the outcome of the Bingo game may be displayed, and the routine 770 may conclude the occurrence of the Bingo game in a similar manner as previously described for routine 700. If none of the Bingo cards matches the game-winning pattern, control may pass back to block 772 wherein the network computer 22 may randomly draw another batch of numbers, and may continue in this manner until one of the Bingo cards matches the game-winning pattern.

When a player sleeps through a Bingo win, it may be possible that another player may match the game-winning pattern on a later-drawn number within the same batch of numbers. It this situation, the other player should be given the opportunity to win the Bingo win award before another batch of numbers is drawn by the network computer 22. After the sleeping winner or winners are eliminated at block 740, control may pass to a block 778 to determine whether other game-winning pattern matches occurred with numbers in the same batch of numbers. If another player will match the game-winning pattern, control may pass to a block 780 wherein the network computer 22 may declare the other player or players the new winner or winners of the Bingo game. After the new winner or winners is declared, control passes back to block 722 to update the displays of the Bingo game outcome at the gaming units 20. If no other players will match the game-winning pattern based on the current batch of numbers at block 778, control may pass back to block 772 where the network computer 22 may select the next batch of numbers.

In routines 760 and 770, the display of the outcome of the Bingo game at block 722 is illustrated as occurring either before (routine 760) or after (routine 770) determining whether the game-winning pattern is matched. In either routine 760 or 770, the display of the outcome may occur in either order based on the desired configuration of the system. If the multi-player Bingo game is configured such that the delay between drawing a number or batch of numbers is discernible by the players, the outcome display may occur before determining whether the game-winning pattern is matched so that the players may observe the numbers as they are drawn and the phantom marking of numbers on the Bingo cards as the ball draw proceeds. However, if the system is configured to conduct the ball draw rapidly such that the delay between drawn numbers may not be discernible by the players, it may be desired to update the outcome display after the game-winning pattern is matched by one of the players.

While the general flows for the various multi-player Bingo game routines are discussed herein, the game play for the multi-player Bingo game may be modified as necessary based on system design and/or regulatory requirements, design preferences and the like. For example, where two or more players may remain in an occurrence of the Bingo game, and wherein each of the remaining players may require the same number of balls to match the game-winning pattern, the Bingo win award may be awarded to the remaining players based whether some or all of the players daub their Bingo cards. If all remaining players daub their Bingo cards, the Bingo win award may be split between the remaining players. If less than all of the remaining players daub their Bingo cards before the expiration of the sleep timer, the routine may be configured either to split the Bingo win award between the remaining players that have daubed their Bingo cards, or to split the Bingo win award between all the remaining players if any of the remaining players daub their Bingo cards before the expiration of the sleep timer. Similarly, if all the remaining players sleep through their Bingos, the Bingo game may sleep infinitely until one of the remaining players daubs their Bingo card. Once one of the remaining players daubs their Bingo card, the routine may be configured either to pay the entire Bingo win award to the remaining player to first daub their Bingo card, or to split the Bingo win award between all the remaining players if any of the remaining players daub their Bingo cards before the expiration of the sleep timer.

The routines may also be modified in implementations where a player may not be required to daub their Bingo cards to receive the Bingo win award. In these implementations, the portions of the routines relating to the sleep timer and daubing, and to eliminating sleeping players and declaring additional winners may be omitted. Even in implementations where players may sleep through a Bingo win, the consequences of sleeping through the Bingo win may be varied as desired. For example, as illustrated, the player who sleeps through a Bingo win may be shut out of collecting the Bingo win even if the player daubs the Bingo card after the sleep timer expires and the player is eliminated. Alternatively, the player initially sleeping through a Bingo win may be provided with the opportunity to claim the Bingo win award if the player daubs the Bingo card before a subsequently declared winning player daubs their Bingo card.

Determining Game-Winning Pattern Bingo Win Amount

As illustrated above, once the winner or winners of the Bingo game is determined and, if necessary the winner or winners daub their Bingo cards, the Bingo win award amount may be determined at block 730. Many different and varying methods for determining the Bingo game award amount may be implemented for the multi-player Bingo game. In part, particular methods may be implemented to support allowing players wagering different amounts on the Bingo game to participate in the same occurrence of the Bingo game and/or to compete for the same progressive jackpots. In perhaps the simplest method, the Bingo win award may be a fixed amount, such as a predetermined number of credits, awarded to each of the winners, or a percentage of winning player's wager on the Bingo game. These methods may minimize the complexity and processing required to determine the Bingo win award.

In order to enhance the players' gaming experience, other methods for determining the Bingo win award may provide for the awarding of Bingo win award amounts that vary from game to game, and perhaps from winner to winner within a given occurrence of the Bingo game. In one embodiment, the Bingo game award may be determined based in part on the number of balls needed by the winning player to match the game-winning pattern. Players matching the game-winning pattern in fewer numbers may receive a larger Bingo game award than players matching the game-winning pattern in more numbers. For example, in one embodiment of Bingo win award determination, a player matching the game-winning pattern within a predetermined maximum number of balls, such as thirty-five balls, may be awarded a progressive jackpot or a portion of an accumulated prize pool. A player matching the game-winning pattern in more than the maximum number of balls may be awarded a smaller Bingo win award, such as a nominal fixed amount or percentage of the player's wager as described above, that may be deducted from the Bingo win prize pool.

The prize pool for the Bingo win award may be funded by players' wagers, with the prize pool being incremented with a predetermined percentage of each player's wager on each occurrence of the Bingo game. As previously mentioned, the winning player may be awarded the entire prize pool as a progressive jackpot, or a percentage of the prize pool. The Bingo win award amount may also be determined in part on the amount of the player's wager so that players making larger wagers on the Bingo game may receive a proportionately larger portion of the prize pool upon winning the Bingo game.

For example, a player matching the game-winning pattern for the Bingo game in fewer than thirty-five balls may be entitled to receive ninety percent of the prize pool. The amount of the prize pool that the winning player actually receives from the prize pool may be adjusted to the size of the winning player's wager compared to the maximum wager that may be made on the Bingo game. For a given occurrence of the Bingo game, the winning player may wager $5.00 on the Bingo game and the maximum permitted wager may be $90.00. The Bingo win award for the player may be determined by multiplying the amount in the prize pool by ninety percent, and then multiplying the result by the ratio of the player's wager ($5.00) to the maximum wager ($90.00). If the accumulated prize pool for the Bingo game is $1000 when the player wins the Bingo game, the player's Bingo win award= ($1000×0.9)×($5.00/$90.00)=$50.00. When the Bingo win award is dispensed to the winning player, the Bingo win award is deducted from the prize pool. Consequently, the accumulated prize pool may be reduced to $950 after the winning player receives the $50.00 Bingo win award.

Of course, other methods for awarding all or a portion of the prize pool are contemplated. Multiple levels of Bingo win awards providing differing percentages of the prize pool to winning players based on the number of balls required to match the game-winning pattern. For example, matching the game-winning pattern in fewer than 15 numbers may provide the opportunity to receive ninety percent of the prize pool, while matching the game-winning pattern in fewer than thirty numbers may provide the opportunity to receive seventy percent of the prize pool, and matching the game-winning pattern in fewer than forty-five balls may provide the opportunity to receive fifty percent of the prize pool. Moreover, the predetermined maximum number of balls for matching the game-winning pattern may be varied based on the complexity of the game-winning pattern. For more complex game-winning patterns, the maximum number of balls may be greater than the maximum number of balls for matching less complex patterns having greater probabilities of being matched in fewer numbers. Similarly, the percentage of the prize pool that may be awarded may be greater for more complex game-winning patterns than for less complex game-winning patterns for the same predetermined maximum number of balls for the same reason.

A progressive prize pool for the Bingo game winners may be funded directly from the players' wagers, such as in the manner described above, or, alternatively, may be funded based on the occurrence of certain interim pattern outcomes in the primary Bingo game. Specific interim win amounts based on predetermined interim patterns may be added to a progressive prize pool in lieu of, or in addition to, providing a direct award to the player. The progressive prize pool may be private to each player (i.e. gaming unit 20) or may be linked and available to be won by any of the players.

In a further aspect of the present invention, the expected return to a player for a Bingo win may be adjusted to be consistent with the amount wagered by the player on the Bingo game where the odds of the player matching the game-winning pattern are the same regardless of the amount wagered on the Bingo game. One method for adjusting the expected return may be to multiply any Bingo win award amount by the player's wager amount. Alternatively, the odds of winning a particular award amount may be varied based on the player's wager. For example, upon matching the Bingo game-winning pattern, the player may win the opportunity to win a progressive jackpot, with the player's odds of winning the jackpot being related to the player's wager amount. The progressive pool may be funded by a percentage of the wager amount for each player for each game. When a player matches the Bingo game-winning pattern, a feature event, such as a wheel spin, may take place. The player's odds of winning the feature event may be based on the player's wager (e.g., twice the wager may give the player twice the chance of winning the feature event). If the player wins the feature event, the player may receive the progressive jackpot. If the player loses the feature event, the progressive jackpot may carry over to subsequent occurrences of the Bingo game. The feature event may take place immediately following each occurrence of the Bingo game, or may occur at a predetermined scheduled time after a sufficient number of qualifying entries of Bingo game winners occur. The qualifying entries may be determined, for example, by the accrual of points by the players for the Bingo game.

The progressive jackpot may be a multi-tier progressive jackpot. For example, the progressive jackpot may have a smaller progressive awarded as frequently as a Bingo win award. In addition, the progressive jackpot may have a much larger progressive that may be awarded infrequently. The larger progressive may even be a wide area progressive wherein the gaming units 20 of the Bingo gaming system 10 may be distributed in a plurality of casino gaming locations. The large progressive may cover all of the casino gaming locations, while the small progressive may be fund by and awarded to players at one of the casino gaming locations.

The feature event in the above embodiments may be a secondary Bingo game. Players winning the primary Bingo game may be awarded chances to participate in the secondary Bingo game that may award the progressive jackpots. Each chance at the secondary Bingo game may consist of a Bingo card for the secondary Bingo game, and a player may receive multiple Bingo cards based on the wager amount. The secondary Bingo game may be played with a fixed number ball draw, or may be played until one or more players match a secondary Bingo game-winning pattern. Some outcomes of the secondary Bingo game may result in the awarding of the small progressive, while other more difficult outcomes (e.g., harder patterns or fewer balls to Bingo) may result in the awarding of the large progressive.

In another embodiment, a fixed award amount in lieu of or in addition to the large progressive may be awarded to the Bingo winners. The fixed awards may or may not impact the funding of the large progressive. The funding of the progressive jackpot may be based upon all game play for the Bingo game, regardless of when a player qualifies for a chance at the progressive jackpot, or may be funded in conjunction with players qualifying for chances at the progressive jackpot.

As an alternative to determining the Bingo win amount based on the matched game-winning pattern and the number of balls drawn, matching the game-winning pattern may provide the player with the opportunity to receive a Bingo win amount based at least in part on selections made by the player. The opportunity to make selections to determine the Bingo win amount may be provided at the conclusion of each occurrence of the Bingo game, or may be provided as a bonus to the winning player(s) for matching the game-winning pattern within a predetermined number of balls.

In one embodiment, the player may be able to select one or more of a plurality of potential award amounts presented to the player at the video display 68. The network computer 22 or gaming units 20 may store a pool of available awards for the Bingo game. When a player(s) match the game-winning pattern, the network computer 22, for example, may randomly or sequentially select a plurality of the available awards from the pool and forward the selected awards to the corresponding gaming unit(s) 20. The gaming unit(s) 20 may then display graphics to the player(s) for selecting one or more of the available awards to determine the Bingo win amount awarded to the player(s). After one or more of the available awards are awarded to the player(s), and if each available award in the pool is only to be awarded once, the pool of available awards may be updated to indicate that the awards have been awarded to the player(s) and, consequently, are unavailable to be awarded to subsequent winning players.

Figure 19:
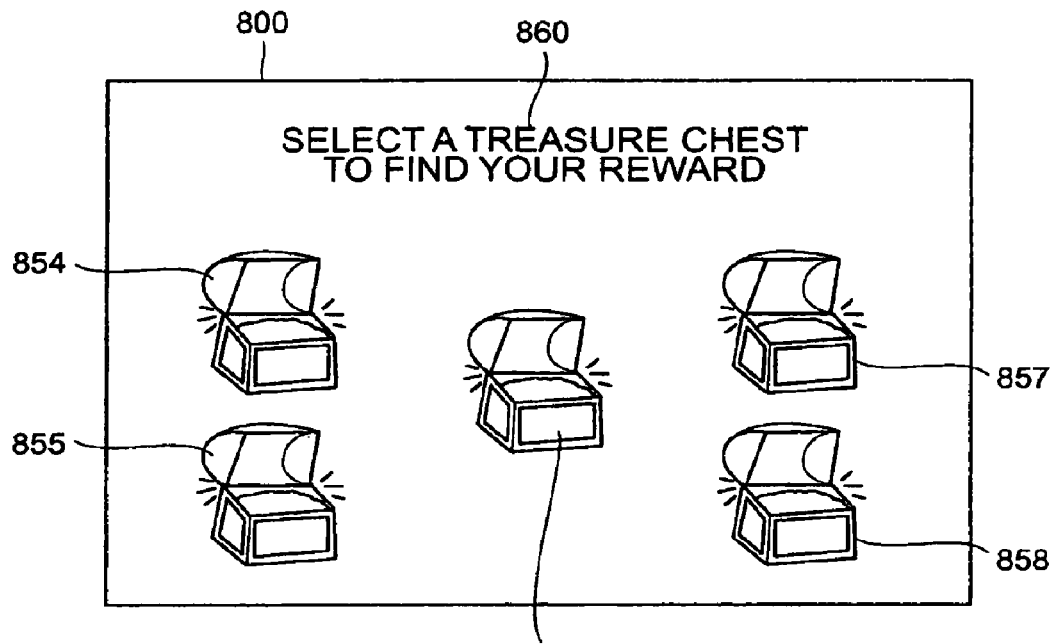
FIGS. 19-23 are illustrations of visual displays that may be displayed during a determination of a Bingo win award amount.
Figure 20:
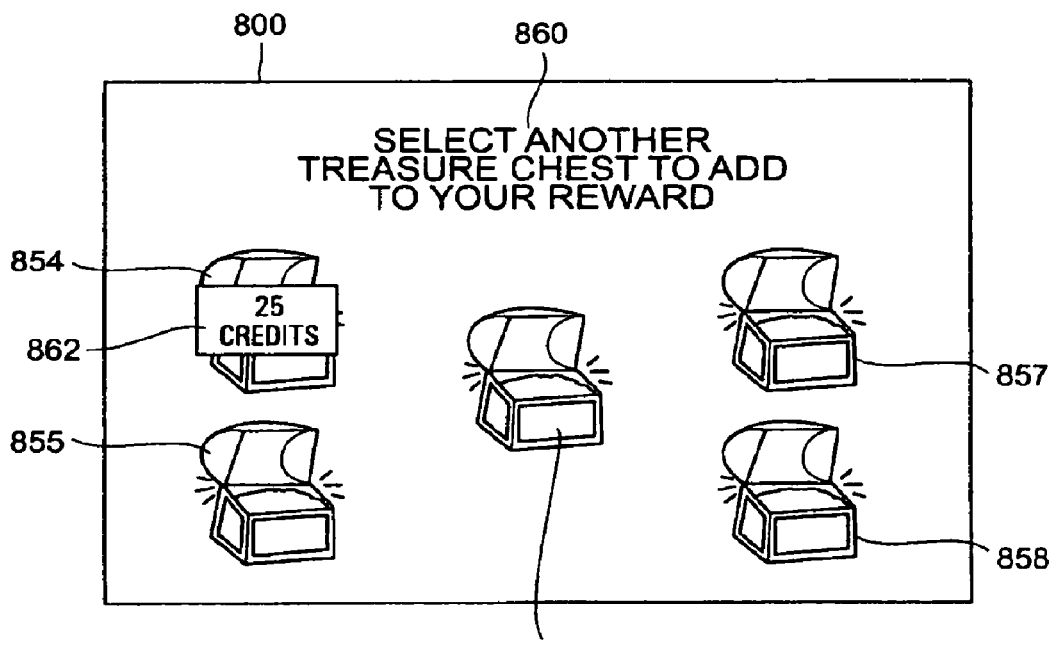
Figure 21:
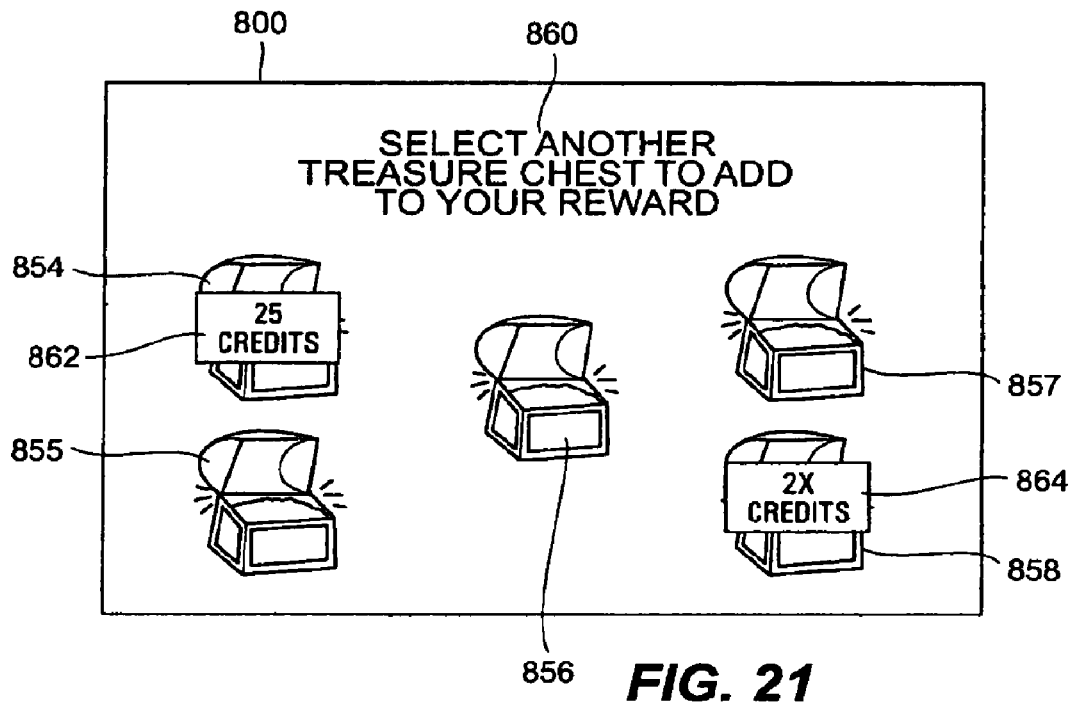
Figure 22:
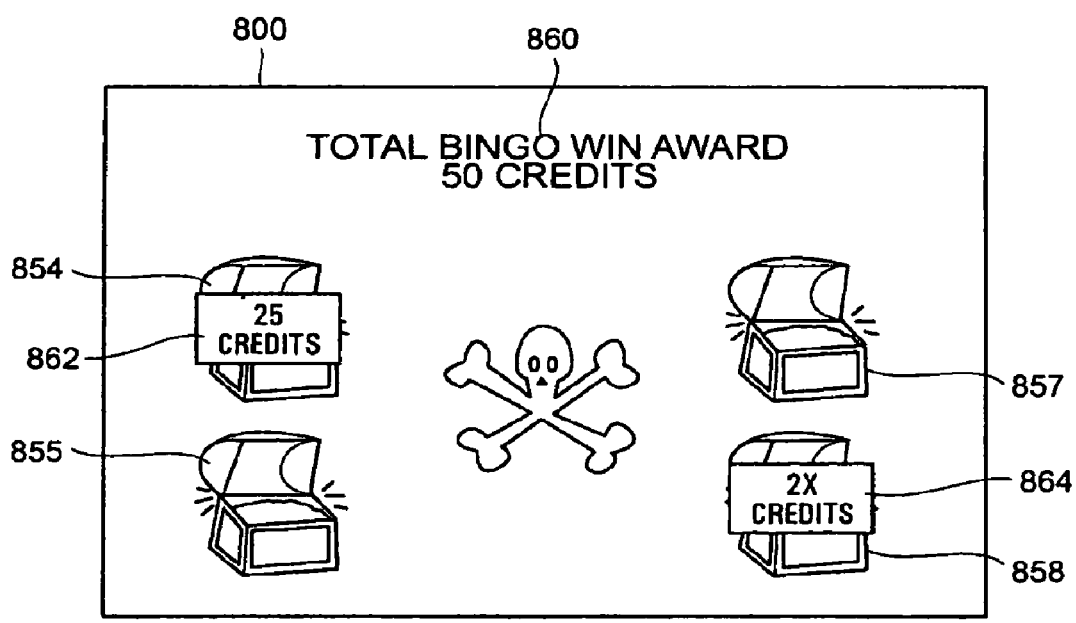

It is contemplated that the graphical displays allowing winning players to make selections may take many forms. In one embodiment shown in FIGS. 19-23, five available awards may be selected from the pool, and the graphical display 800 may include five symbols, such as money bags or treasure chests 854-858, each corresponding to one of the available awards as illustrated in FIG. 19. The player may be prompted by a prompt image 860 to select one of the awards by touching one of the symbols 854-858. When the player touches one of the symbols, such as treasure chest 854, an award amount image 862 corresponding to the selected treasure chest 854 may be displayed to the player in place or overlaying the treasure chest 854 as illustrated in FIG. 20.

Figure 23:
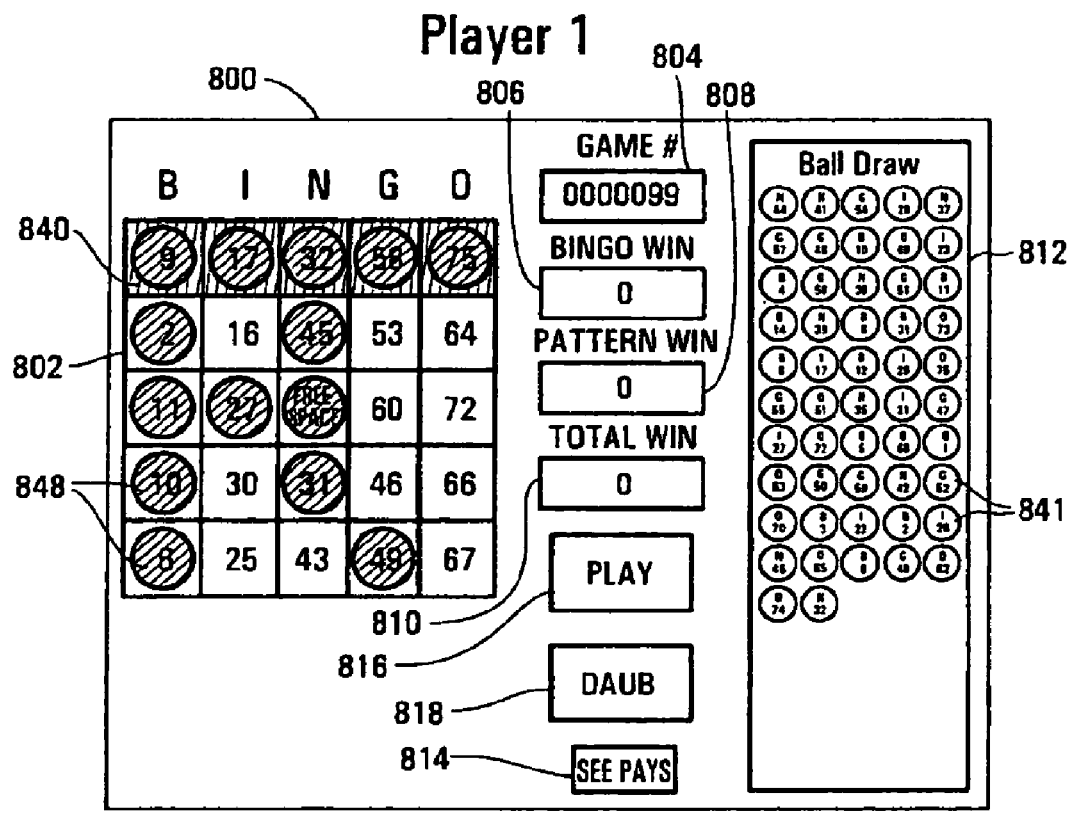
Figure 24:
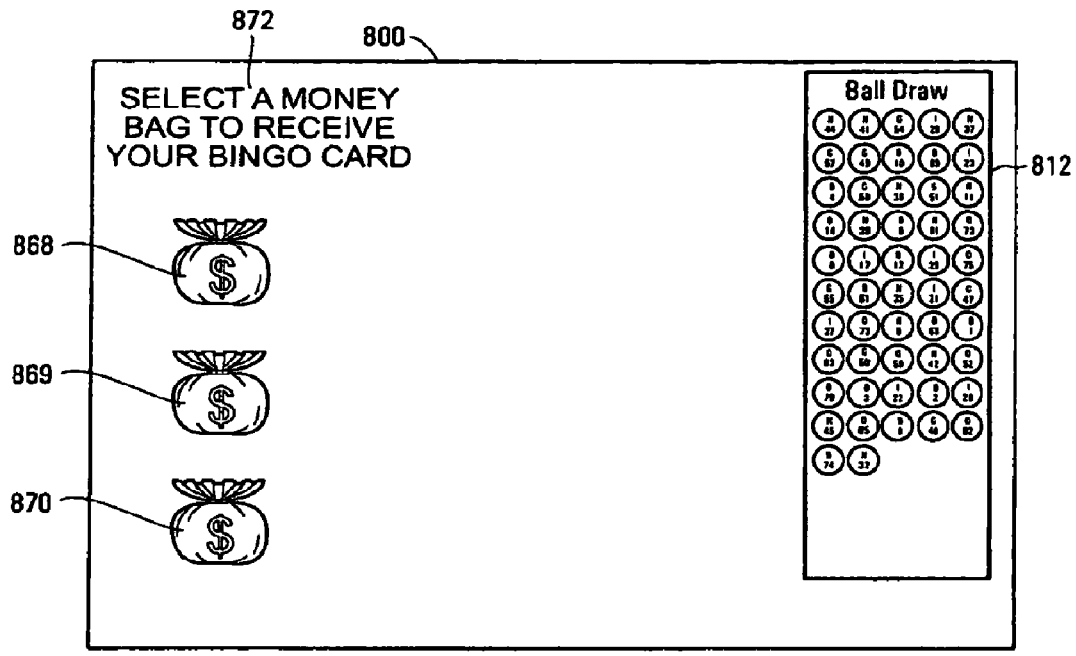
FIGS. 24-27 are illustrations of visual displays that may be displayed during an alternative determination of a Bingo win award amount.

The player may be permitted to select only one symbol 854-858 to determine the Bingo win award or, as indicated by the prompt image 860, the player may be permitted select additional symbols 854-858 to increase the player's Bingo win award. Each of the award amounts may be a predetermined number of credits, or may be in the form of a multiplier, as illustrated by the award image 864 in FIG. 21, or other operand that may change the amount of the accumulated Bingo win award. The Bingo win award accumulation may continue until the player has selected a predetermined number of the symbols 854-858. Alternatively, one of the symbols 854-858 may be associated with a terminating symbol, such as skull and crossbones 866 displayed in FIG. 22, that when selected by the player ends the Bingo win award selection process and returns the player to the Bingo game display 800. After the Bingo win award is determined, the Bingo win amount 806 and total win amount 810 may be updated to display the amount won by the player as shown in FIG. 23, and the credits for the player on the gaming unit may be incremented accordingly.

As a further alternative to selecting a plurality of available awards illustrated in FIGS. 24-27, the Bingo theme may be perpetuated by displaying a plurality of symbols, such as money bags 868-870, on the video display 800, each corresponding to a further Bingo card to be used in determining the player's award amount. The further Bingo cards may be related to the player's original Bingo card such that none of the numbers on the original Bingo card appear on the further Bingo cards, or the further Bingo cards may be generated independently of the original Bingo card. Moreover, the further Bingo cards may be determined at any time during the Bingo game, including at the time the player enrolls and selects the original Bingo card or after the winning player or players are declared. The further Bingo cards may vary from game to game, or may be a fixed set of predetermined further Bingo cards, or with specific characteristics relative to each other or the feature-triggering game-winning pattern, that may be shuffled with respect to the symbols 868-870 with which they are associated from game to game. Once the symbols 868-870 are displayed, a prompt image 872 may instruct the player to touch one of the symbols 868-870 to reveal the corresponding further Bingo card.

Figure 25:
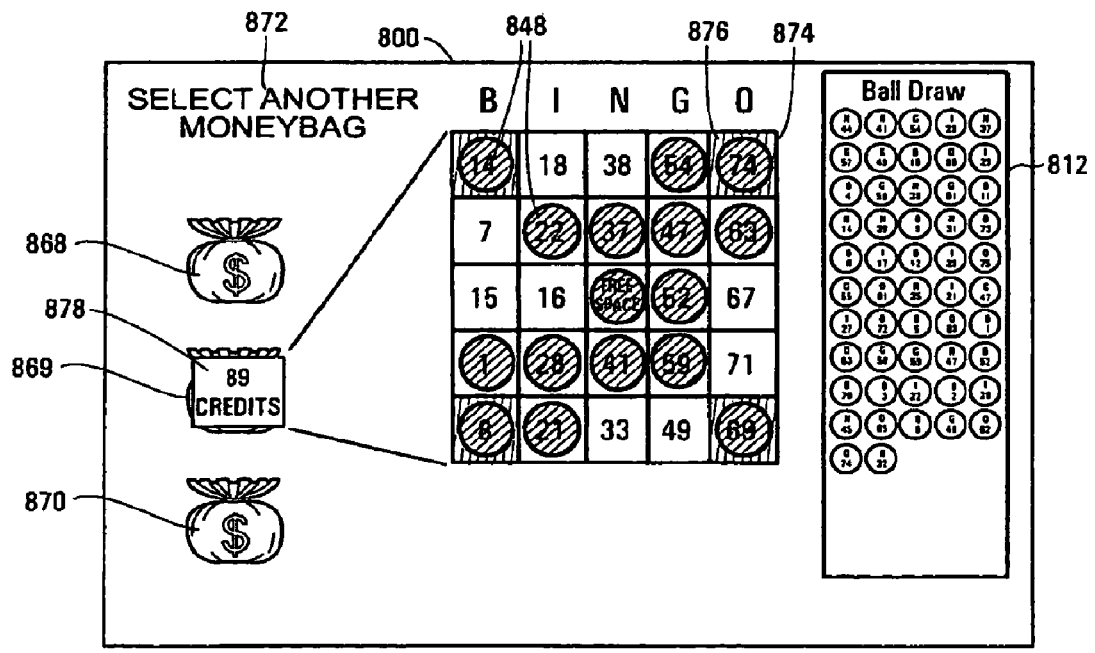

When the player touches one of the displayed symbols 868-870, the corresponding further Bingo card 874 may be displayed to the player, and the Bingo card 874 may be marked by the gaming unit 20 with daub marks 848 based on the numbers in the ball draw area 812 from the Bingo game as shown in FIG. 25. The further Bingo card 874 may be highlighted with a Bingo win award pattern 876 that may be matched to win a Bingo game award. The Bingo win award pattern 876 is illustrated as an "X," but may be any desired pattern or patterns defined using any number of spots. The player may be provided with multiple Bingo win award patterns to match, each of which may be highlighted on the further Bingo card 874 and may result in the same or a different Bingo game award amount when matched. Alternatively, the Bingo win award pattern or patterns may be displayed elsewhere on the display 800, or may be viewable by touching or pressing a "See Pays" button.

Figures 26, 27:
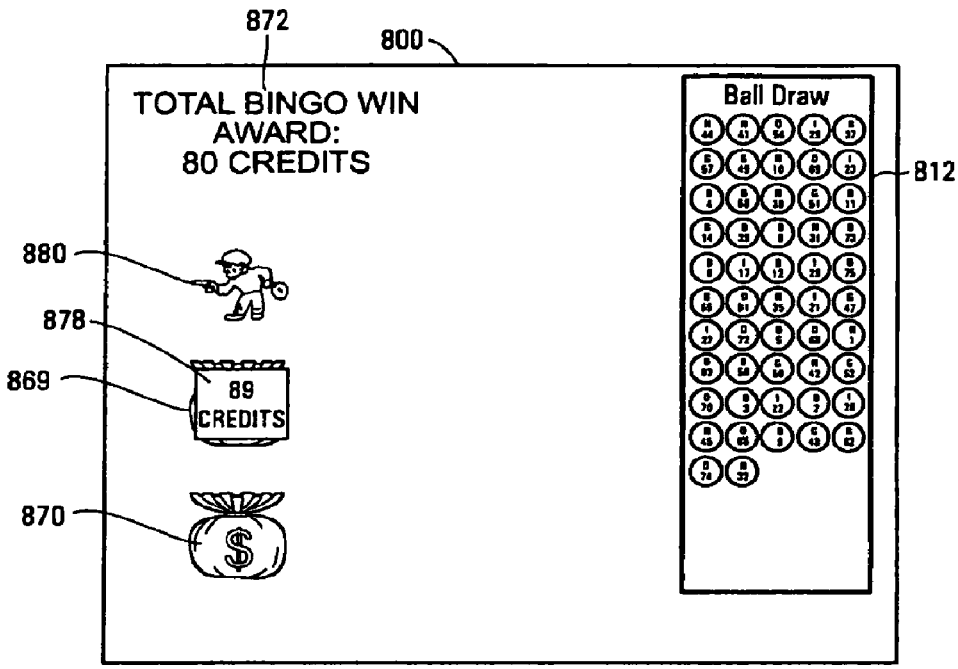

If the selected further Bingo card 874 matches a predetermined Bingo win award pattern 876, the player may receive the corresponding Bingo win award amount that may be displayed to the player with an award image 878. If no patterns are matched, the further Bingo card may yield no award amount. As with the previous embodiment, the player may be permitted to select only one symbol 868-870 to determine the Bingo win award or, as indicated by the prompt image 872, the player may be permitted to select additional symbols 868-870 to increase the player's Bingo win award. The Bingo win award accumulation may continue until the player has selected a predetermined number of the symbols 868-870. Alternatively, one of the symbols 868-870 may be associated with a terminating symbol, such as bank robber 880 displayed in FIG. 26, that when selected by the player ends the Bingo win award selection process and returns the player to the Bingo game display 800. After the Bingo win award is determined, the Bingo win amount 806 and total win amount 810 may be updated to display the amount won by the player as shown in FIG. 27, and the credits for the player on the gaming unit may be incremented accordingly.

It may be desirable to provide Bingo win awards by methods other than paying out a fixed amount or performing a calculation. For example, matching the game-winning pattern may entitle the player(s) to a chance at winning a prize through another game or bonus mechanism. The chance at winning the prize may be any of a wide range of bonus features known in the art. The chance may entitle the player to a spin of a prize wheel having a plurality of positions corresponding to credit or cash award amounts, or possibly positions awarding the player an entry into a lottery. Such chances at winning a prize may or may not involve player interaction in determining the prize awarded to the player. Further, the award for the chance at winning a prize or bonus feature may be a fixed award, a progressive award, a non-monetary prize, free game play, entry into another event, or any combination of these or other types of awards, and the player may or may not be provided with the ability to select the nature of the Bingo win award.

Alternatively, the Bingo win award may be in the form of points, stamps, coupons or other non-monetary award that may be redeemable for prizes such as cash or other monetary award, non-cash prizes, game play, casino goods and/or services, gift certificates, chances are winning further prizes or awards, and the like. These awards may be accrued until the player accumulates enough points, stamps, coupons or other similar awards to redeem for a particular one or more of the available prizes. Reaching a point threshold may be enough to trigger the qualified award or feature. One embodiment may include a scheduled feature event, such as a Big Wheel Spin occurring every hour or half hour. Any player accumulating enough points may qualify for a potential win in the feature event, with the odds of winning the feature event or the amount of the award in the feature event possibly being related to the number of points the player accumulated prior to the occurrence of the feature event.

In a further embodiment, the multi-player Bingo game may incorporate methods for combining players wagering different amounts on the Bingo game to play the Bingo game together such that the probability of players wagering higher amounts to winning the Bingo game is increased. In one method, players placing larger wagers on the Bingo game may be provided with additional Bingo cards for the occurrence of the Bingo game. Alternatively, when the network computer 22 determines the game-winning pattern or patterns for the occurrence of the Bingo game, the players may be assigned game-winning patterns having relative probabilities proportional to their wager amounts. For example, a player wagering twice as much as another player may be assigned a game-winning pattern or set of patterns having approximately twice the odds of winning the Bingo game as the game-winning pattern or set of patterns assigned to the other player, such as providing the player with fewer spots to match, or with more game-winning patterns to match. Thus implemented, in a given Bingo game, the player wagering more on the occurrence of the Bingo game is provided with better odds of winning the award for the Bingo game.

Interim Pattern Bingo Awards

In order to enhance the players' gaming experience while playing the multi-player Bingo game, the Bingo game may be configured with alternative methods for providing additional award payouts to the players, including players that are not the first to match the game-winning pattern. In one embodiment, players may be awarded prizes for matching predefined interim patterns on their Bingo cards having associated award amounts during the course of the Bingo game. The patterns may be termed "interim" because the patterns may be matched during the course of the game, and the patterns do not result in the termination of the game when they are matched. The Bingo game terminates only when one or more players match the game-winning pattern. When a player matches an interim win pattern, the player may be awarded the prize amount corresponding to the matched interim pattern regardless of whether the player matches the game-winning pattern.

Figure 28:
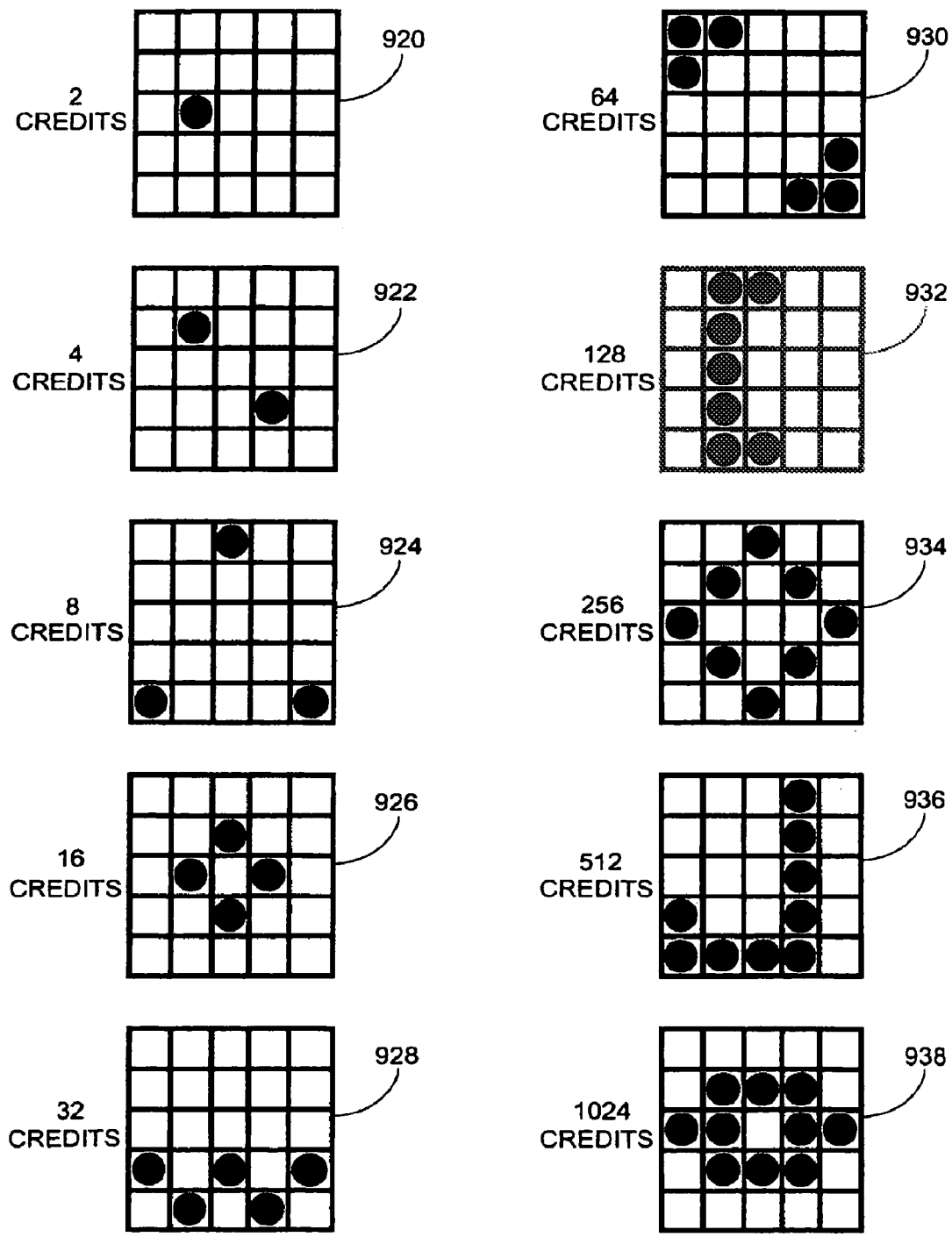
FIG. 28 is an illustration of a set of interim patterns for a multi-player Bingo game awarding interim pattern awards.

FIG. 28 illustrates one example of a set of interim patterns 920-938 that may be applied in the Bingo game. As with the game-winning patterns, the interim patterns are defined by one or more spots on the Bingo card that may be matched during the Bingo game in order to receive the corresponding interim win amount. The probability of matching a given interim pattern is dependent on the number of spots to be matched in the interim pattern, and the value of the interim win amounts may be selected so that the higher interim award amounts generally correspond to the interim patterns lesser probabilities of occurring. For example, matching the first interim pattern 920, which may consist of a single spot and, consequently, a relatively high probability of being matched by a player during an occurrence of the Bingo game, may result in an interim pattern award amount of two credits, while matching the tenth interim pattern 938 consisting of ten spots and having a relatively low probability of being matched, may result in a much larger interim pattern award amount of 1,024 credits. However, it is not necessary that a larger interim pattern award must be associated with a more complex interim pattern than a smaller interim pattern award. Each interim pattern may be associated with any interim pattern award amount to achieve a desired payout rate for interim pattern wins.

After one or more players are declared the winner of an occurrence of the Bingo game and, if necessary, at least one winning player daubs their Bingo card, the Bingo cards for each of the players may be evaluated by the corresponding gaming unit 20 to determine whether the player has matched any of the interim patterns. Referring back to FIG. 11, the first player may have been declared the winner of the Bingo game and may have daubed the Bingo card 802 to claim the Bingo win award of 17 credits. The second player may not have matched the game-winning pattern in the same number of balls as the first player and, consequently, received no Bingo win award. In Bingo games wherein daubing may be required to claim a Bingo win award, players may also be required to daub their Bingo cards in order to receive any interim pattern awards. Under the normal course of play, the players may daub their Bingo cards when prompted and receive any interim pattern awards. Where a potentially winning players sleeping through their opportunity at the Bingo win award may be foreclosed from later claiming the Bingo win award, those players may still be awarded interim pattern awards if their Bingo cards are daubed prior to the conclusion of the Bingo game.

In one embodiment, all of the numbers of the ball draw may be used to determine whether a player has matched one or more interim patterns. Consequently, the Bingo cards 802, 822 may be evaluated based on the numbers marked during the course of the ball draw. On the Bingo card 802, the marked number "27" corresponds to the first interim pattern 920 of FIG. 28 and entitles the first player to two credits as an interim pattern win award in addition to the seventeen credits for the Bingo win award. The interim pattern win award may be reflected on the first Bingo display 800 by updating the pattern win amount 808 to show that two credits were awarded, and updating the total win amount 810 to nineteen credits for the occurrence of the Bingo game. On the Bingo card 822, marked numbers "26" and "54" correspond to the second interim pattern 922 of FIG. 28 and entitle the second player to four credits as an interim pattern win award. The second player may win the interim pattern win award even though the Bingo card 822 may not match the game-winning pattern 840. As with the first Bingo display 800, the second Bingo display 820 may be updated to display four credits at the interim pattern win amount 828, and four credits at the total win amount 830.

Figure 29:
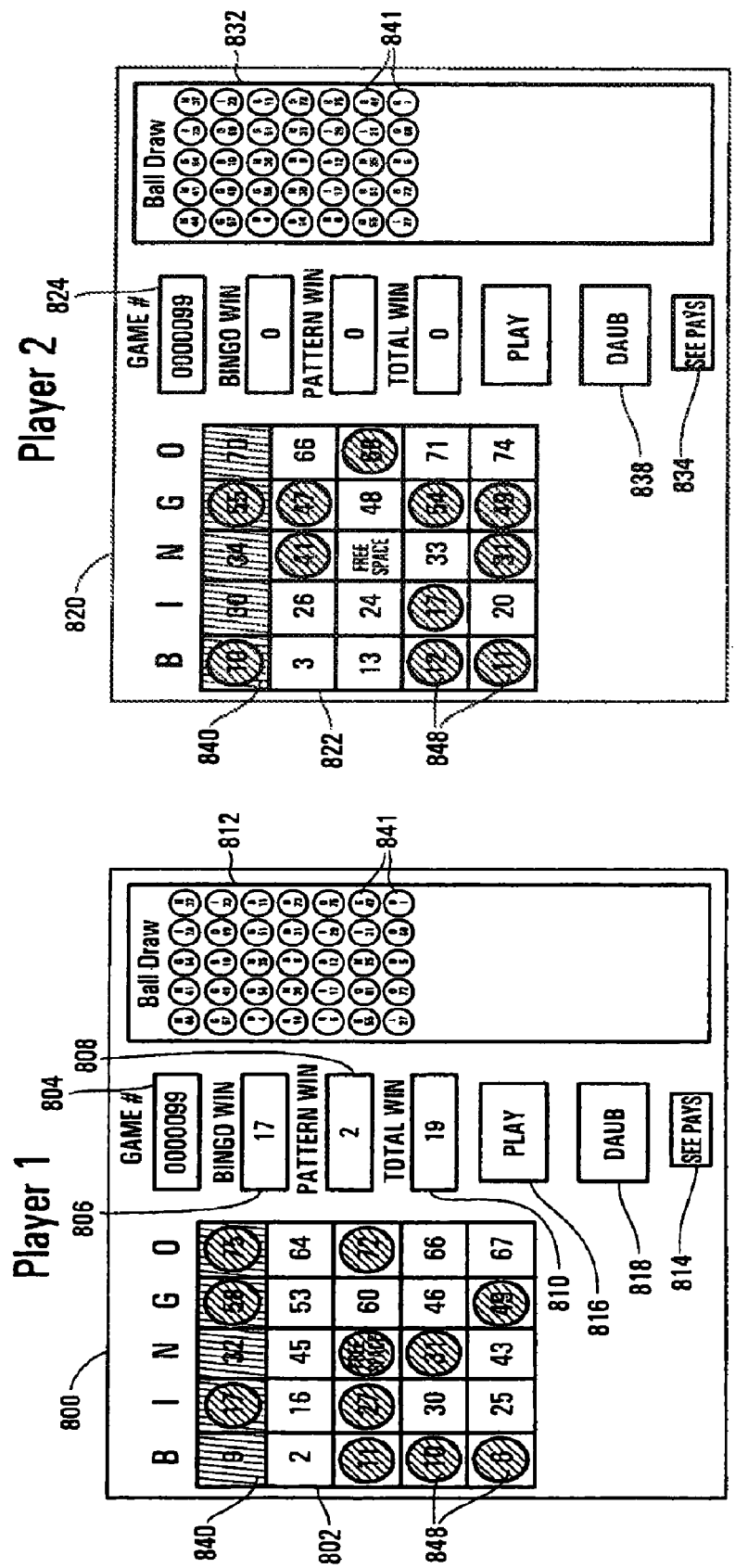
FIGS. 29-31 are illustrations of visual displays that may be displayed after awarding interim pattern win awards in a multi-player Bingo game.

In some implementations of multi-player Bingo games providing interim pattern awards, it may be desired to regulate the interim pattern award payout rate by limiting the number of balls from the ball draw that may be used to evaluate the Bingo card for interim pattern matches. By truncating the ball draw to a predetermined maximum number of balls, the frequency of matching the interim patterns and, consequently, the interim pattern award payout rate may be reduced. For example, FIG. 29 illustrates the outcome of the occurrence of the Bingo game of FIGS. 6-9 with the ball draw truncated to the first thirty-five balls drawn for purposes of evaluating the Bingo cards 802, 822 for matches of interim patterns. After removing the marks 848 corresponding to numbers drawn after the thirty-fifth number, the number "27" corresponding to a number drawn within the first thirty five numbers may still be marked and match the first interim pattern 920. The first Bingo display 800 may be updated to illustrate two credits for the interim pattern win amount 808 and seventeen credits for the total win amount 810.

On the second Bingo card 822, after removing the marks 848 corresponding to numbers drawn after the thirty-fifth number, the number "26" corresponding to a number drawn after the thirty-fifth number may be uncovered. As a result, the Bingo card 822 may no longer match the second interim pattern 922 as had been the case when the entire ball draw was considered in FIG. 11. Because neither the second interim pattern 922 nor any of the other interim patterns 920, 924-938 are matched on the Bingo card 822, the second player may not receive any interim pattern awards, and the interim pattern win amount 828 and total win amount 830 may reflect that the second player has received no Bingo win or interim pattern amounts for that occurrence of the Bingo game.

Figure 30:
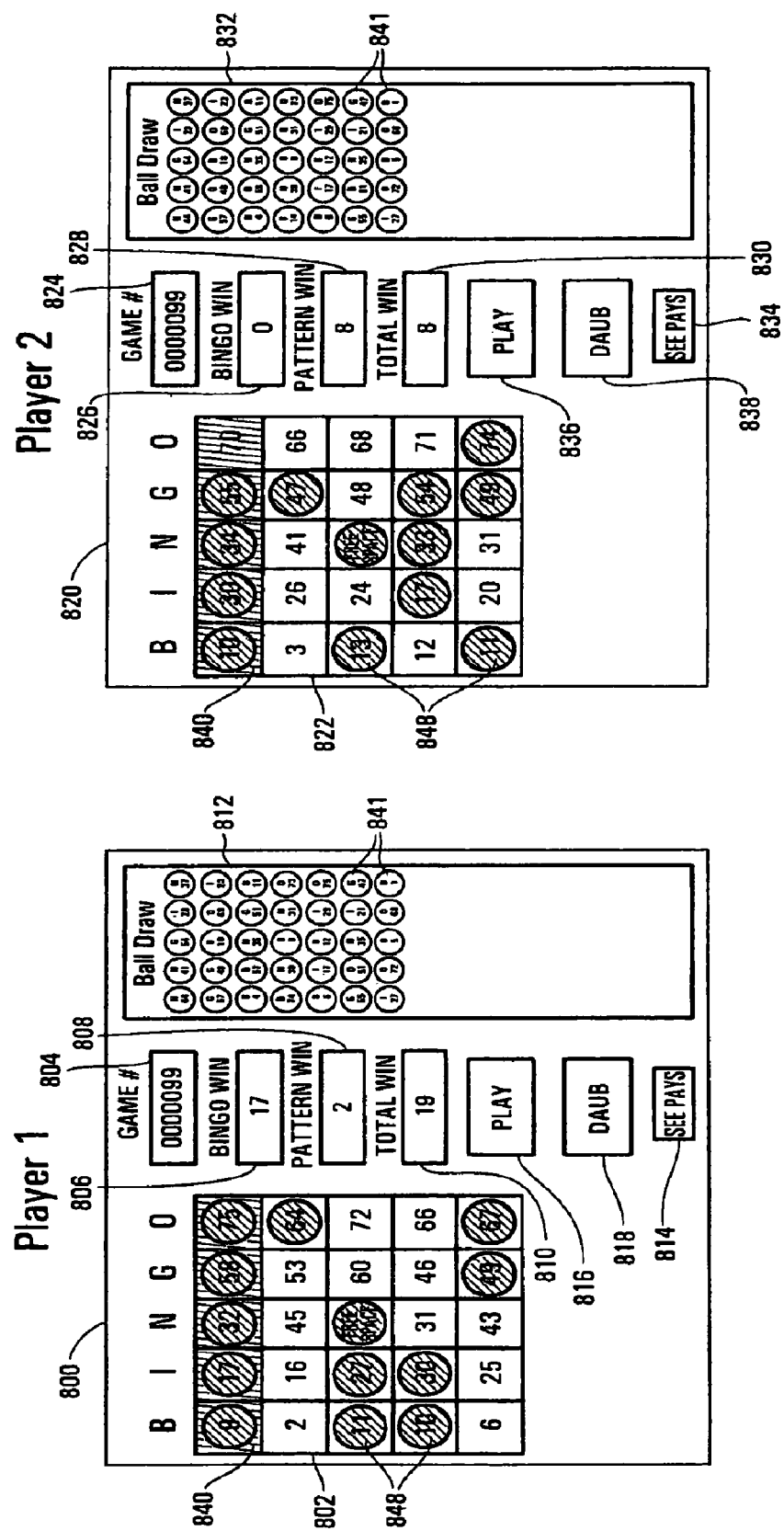

In multi-player Bingo games wherein a predetermined maximum number of balls are used to evaluate interim pattern wins, alternatives exist for evaluating the interim pattern wins when a player or players match the game-winning pattern in fewer than the predetermined maximum number of balls. The interim pattern wins may be evaluated either by using the numbers drawn to determine the winner of the Bingo game, thereby using fewer than the predetermined maximum number of balls, or by drawing additional numbers at the network computer 22 up to the predetermined maximum number of balls. The former alternative is illustrated in FIG. 30. In this occurrence of the Bingo game, the first player may have matched the game-winning pattern on the twenty-fifth ball of the ball draw. The number "27" marked on the Bingo card 802 may match the first interim pattern 920 resulting in a two credit interim pattern award that is reflected by the displays at the interim pattern win amount 808 and total win amount 810 as previously discussed. On the Bingo card 822, the marked numbers "11," "34" and "74" match the third interim pattern 924 resulting in an eight credit interim pattern award that is reflected by the displays at the interim pattern win amount 828 and total win amount 820.

Figure 31:
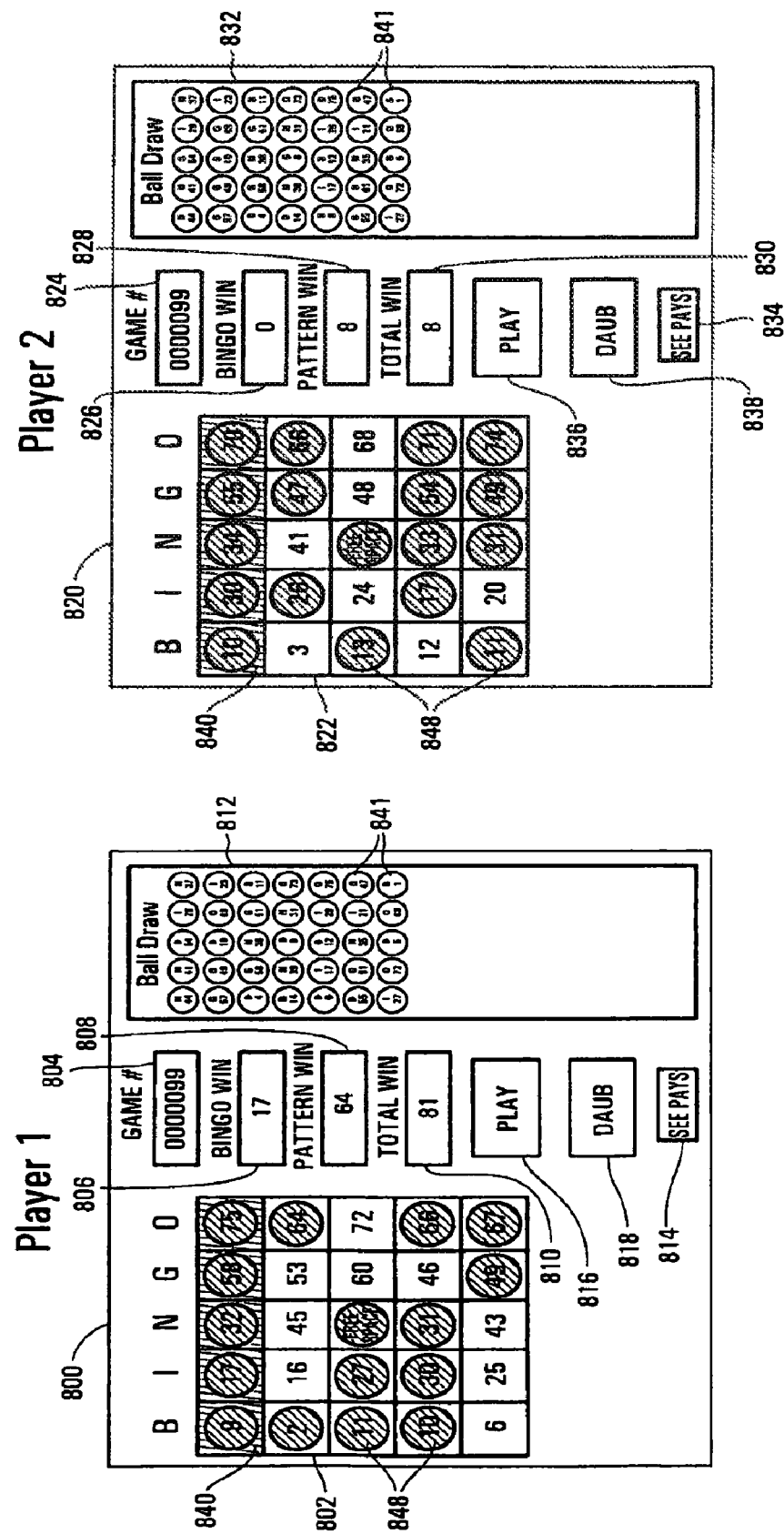

The latter alternative for evaluating the interim pattern wins is illustrated in FIG. 31. Depending on the implemented one of the routines 700, 750, 760, 770 or other routine for conducting the Bingo game, after declaring the first player the winner of the Bingo game at the twenty-fifth number, additional numbers up to the predetermined maximum number of balls (thirty-five in this example) may be drawn by the network computer 22 if not previously drawn by the network computer during the occurrence of the Bingo game, and displayed at the ball draw areas 812, 832. The gaming units 20 may evaluate the Bingo cards 802, 822 with the additional numbers and add marks 848 at any additional matching numbers. After marking the Bingo cards 802, 822, the gaming units 20 may evaluate the Bingo cards 802, 822 for interim pattern matches.

With the additional marks 848, both the first and the second players may match multiple of the interim patterns 920-938. On Bingo card 802, the number "27" matches the first interim pattern 920 and the numbers "2," "9," "17," "49," "66" and "67" match the sixth interim pattern 930, while on Bingo card 822, the numbers "26" and "54" match the second interim pattern 922 and the numbers "11," "34" and "74" match the third interim pattern 924. Depending on the configuration of the Bingo game, the players may be awarded either the sum of the interim pattern awards, or the greater of the interim pattern win awards. Consequently, the first player may receive either a sixty-six credit interim pattern award or a sixty-four credit interim pattern award (shown in FIG. 31), and the second player may receive either a twelve credit award or an eight credit award (shown in FIG. 31).

The chosen alternative for determining the interim pattern award where multiple interim patterns are matched may impact the Bingo game in several ways. Assuming that the same interim patterns and award amounts are used, awarding the highest interim pattern award instead of totaling the interim pattern awards may reduce both the amount of the interim pattern awards won by the players and the payout rate for the interim pattern awards overall. Additionally, the probability that a player may be awarded a given interim pattern award may be reduced in comparison to totaling the interim pattern award amounts by the probability that the player may also match an interim pattern with a higher interim pattern award amount in the same Bingo game. For example, the probability of matching the first interim pattern 920 in thirty-five or fewer numbers is approximately 2.14-to-1, while the probability of matching the second interim pattern in thirty-five or fewer numbers is approximately 4.66-to-1. These are also the probabilities of winning the corresponding interim pattern awards when the interim award amounts are totaled. However, the probability of winning the interim pattern award for the first interim pattern 920 may be reduced by the probability of also matching the second interim pattern 922, which in this example is approximately 10.31-to-1 (i.e., the odds of matching three numbers out of thirty-five drawn from a field of seventy-five numbers). The resulting probability is approximately 2.70-to-1 to match the first interim pattern 920 and not also match the second interim pattern 922. Of course, the probability of awarding the first interim pattern award may be further reduced by probabilities of also matching the remaining interim patterns 924-938 in a given occurrence of the Bingo game.

Those skilled in the art will understand that the interim patterns may be configured to achieve probabilities for paying out interim pattern award amounts according to specified payout rates. Where only the higher interim pattern award amount may be paid, the probabilities of paying the awards associated with the interim patterns may be altered by adjusting the level of interaction between the interim patterns (i.e. the amount of overlap between the interim patterns) to achieve the desired probabilities. For example, the first interim pattern 920 and the second interim pattern 922 do not overlap and, therefore, do not have any spots or positions in common. As noted above, the odds of both interim patterns being matched is approximately 10.31-to-1. However, if the patterns are overlapped such that one of the spots of the second interim pattern 922 is located in the same square as the spot of the first interim pattern 920, the odds of matching both the first and second interim patterns 920, 922 increase to approximately 4.66-to-1, and the odds of paying the first interim pattern award increase to approximately 3.95-to-1. The other interim patterns may be similarly manipulated to adjust the probabilities for the interim patterns to achieve a desired interim pattern payout rate.

While a single set of interim patterns is illustrated in FIG. 28, it is contemplated that multiple sets of interim patterns may be provided for the Bingo game. The interim pattern sets may vary in terms of the number of interim patterns in the sets, the configuration of the interim patterns in the sets, the complexity of the interim patterns in the sets, the interim pattern award amounts available for matching interim patterns in the sets, and the like. The gaming units 20 may be configured to randomly or sequentially select one of a plurality of available interim pattern sets for use in a given occurrence of the Bingo game. Alternatively, the players may be provided with the ability to select one of the available interim pattern sets based on their own preferences. For example, several interim pattern sets having approximately the same overall interim pattern award payout rates may be provided, but with the interim pattern sets paying out interim pattern awards with varying frequencies. Some interim pattern sets may result in paying out relatively small interim pattern awards relatively frequently, some interim pattern sets may result in paying out relatively large interim pattern awards relatively infrequently, and some interim pattern sets may result in paying out a combination of large and small interim pattern awards. The gaming units 20 may display the interim pattern sets and allow the players to select interim pattern sets corresponding to their preferences in their gaming experience.

Alternatively, the interim pattern sets used for an occurrence of the Bingo game may be determined based on the amount wagered by the players. In slots, the number of winning combinations and the maximum amount that may be won by the player is dependent on number of paylines played and the amount wagered per payline. The maximum prizes may only be available for where the player wagers the maximum amount on the maximum number of available paylines. Similarly in the multi-player Bingo game, the players may be able select one of a plurality of available interim pattern sets and select a wager amount to be applied to each interim pattern within the interim pattern sets. Where nine interim pattern sets are available, the player may be able to play the first interim pattern set for one credit, play the second interim pattern set for two credits, and so on up to nine credits for the ninth interim pattern set. The first interim pattern set costing the player only a one credit wager may have lowest probability of paying out an interim pattern award and have the lowest interim pattern award amounts available, while the ninth interim pattern set may have the highest probability of paying out an interim pattern award and have the highest interim pattern award amounts available. Additionally, the player may be able wager from one to five times the credits required for a given interim pattern set. Consequently, in this example the player may be able to wager between one and forty-five credits per game in order to vary the odds of receiving an interim pattern award and of winning a larger interim pattern award based on their preferences for their gaming experience.

Multi-Level Award Amount Pattern Mapping

Where relatively few Bingo win and/or interim pattern award amounts may be offered to the players of the multi-player Bingo game, it may be relatively simple to select a set of patterns to achieve a desired probability of paying out each award amount and a desired overall Bingo award payout rate. Moreover, with relatively few Bingo patterns to evaluate, the players may be able to readily identify whether any of the Bingo patterns are matched on their Bingo cards. As the number of award amounts increases, it may become increasingly difficult to map the award amounts to Bingo patterns on a standard Bingo card. As the number of award amounts increases, the amount of interaction between the Bingo patterns, and the corresponding impact on probabilities of matching the Bingo patterns where only the highest award amount is paid out, may increase the difficulty of matching the probabilities of matching the Bingo patterns to the desired probabilities of paying out the award amounts. Moreover, the players may have more difficulty identifying Bingo pattern matches on their Bingo cards as the number of Bingo patterns increases.

Figure 32:
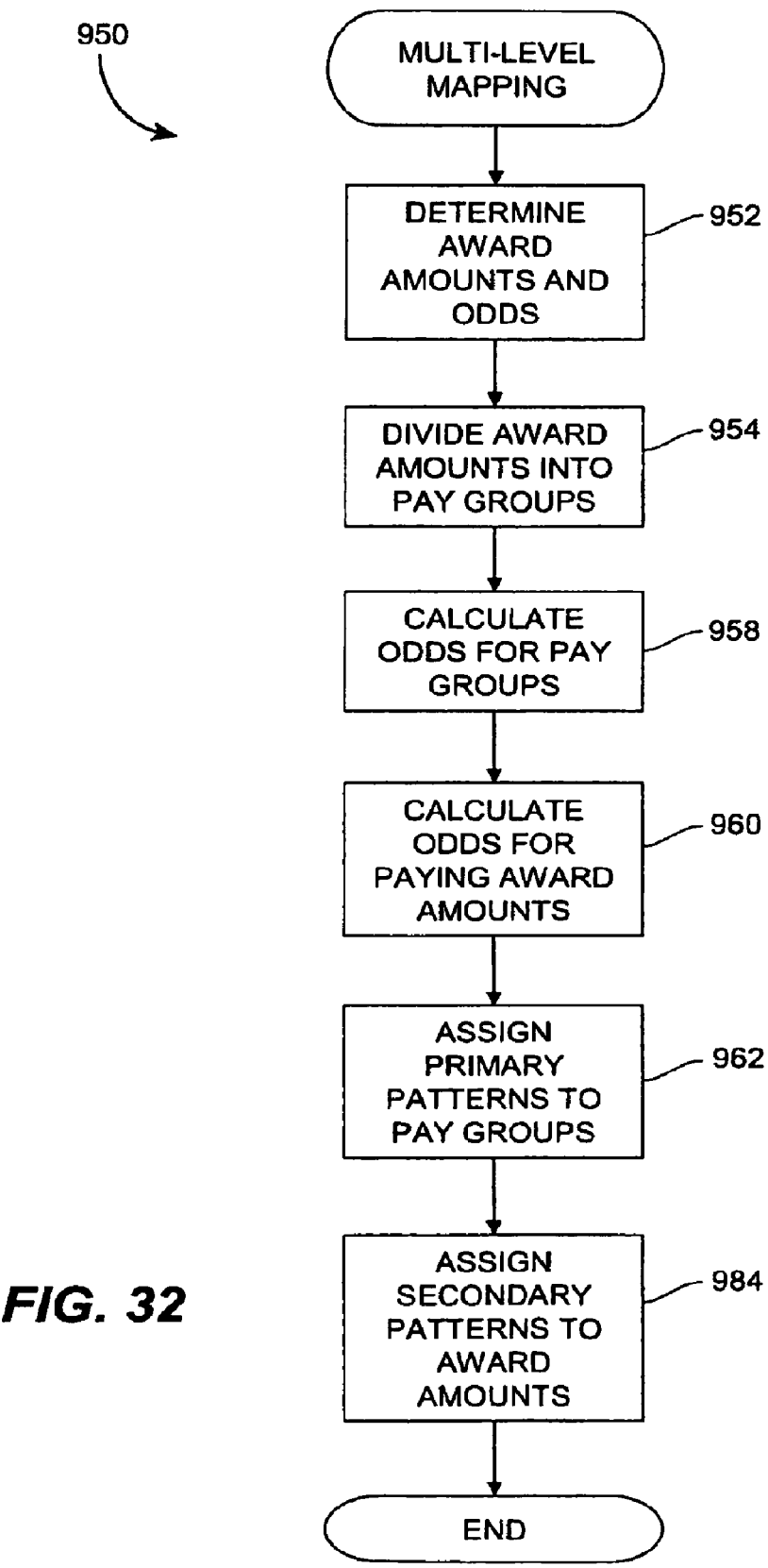
FIG. 32 is a flowchart of a method for performing multi-level pattern mapping.

The difficulty in matching Bingo patterns to a large number of award amounts may be reduced by applying a multi-level mapping strategy wherein most or all of the desired award amounts may be provided without the necessity assigning distinct Bingo patterns to each award amount. In one embodiment of a multi-level mapping strategy, the desired award amounts may be divided into a plurality of subsets or pay groups, with each subset or pay group containing one or more of the award amounts, and then assigning primary patterns to each of the pay groups and secondary patterns to each of the award amounts within the pay groups. FIG. 32 is a flowchart of a multi-level Bingo pattern mapping routine 950 that may be implemented to map the desired award amounts to Bingo patterns. The mapping strategy may be applied equally to award amounts for Bingo game winners and for interim pattern matches. Referring to FIG. 32, the multi-level mapping routine 950 may begin at a block 952 at which the award amounts for the Bingo game and associated probabilities are determined. The award amounts and associated probabilities may be determined in any known manner for calculating paytables to achieve a desired award payout rate. Moreover, as an alternative to determining the award amounts and probabilities from scratch, the awards and probabilities may be derived from known paytables used in other gaming devices to achieve a desired payout rate.

After the award amounts and associated probabilities are determined, the award amounts may be divided into a plurality of pay groups at block 954. The award amounts may be divided into any desired number of pay groups, each containing any desired number of award amounts. Further, the pay groups may each have the same number of award amounts, or the number of award amounts may vary from pay group to pay group. In implementations of the multi-player Bingo games where only the highest award amount may be awarded, the award amounts may be divided into multiple groups such that no overlap exists in the award amounts between the groups. For example, the first group may consist of the ten highest award amounts, the second group may consist of the next seven highest award amounts, the third group may consist of the next fourteen highest award amounts, and so on. Consequently, the groups may be ordered by award amount. This may be viewed as taking the entire list of possible award amounts, ordered by value, and breaking up the list into groups of adjacent values. It may be preferred, but not required, for each group to contain award amounts having similar magnitudes as other award amounts in the group.

One example of a grouping of award amounts is illustrated in FIG. 33. The award amounts consist of the whole numbers between 1 and 100. In the pay group table 956, the award amounts may be separated into ten groups of ten award amounts without overlapping the award amounts between groups. Each award amount may have an associated probability of being awarded. The award amounts may be assigned any desired probability, and the higher value award amounts need not have a lower probability of being awarded than lower value award amounts. In short, the award amounts may be assigned any necessary probabilities in order to achieve the desired award amount payout rate.

Once the award amounts are divided into pay groups, the odds of paying out one of the award amounts from each group may be calculated at block 958. The odds for the group may be calculated based on the cumulative odds for the award amounts within the group. For example, the award amounts in pay group 1 of pay group table 956 may have the assigned odds shown in Table 1:

TABLE 1

| Award Amount | Game Odds |
|---|---|
| 1 | 15-to-1 |
| 2 | 5-to-1 |
| 3 | 150-to-1 |
| 4 | 150-to-1 |
| 5 | 10-to-1 |
| 6 | 700-to-1 |
| 7 | 700-to-1 |
| 8 | 700-to-1 |
| 9 | 750-to-1 |
| 10 | 25-to-1 |

The odds for the pay group are calculated by summing the odds of the individual award amounts in the group. In the above example, the calculated odds for pay group 1 are approximately 2.35-to-1 the one of the award amounts in group 1 may be paid out. Similar calculations may be performed for each of the pay groups.

After calculating the pay group odds, the odds of paying out a particular award amount from its pay group may be calculated at block 960. The odds of paying out an award amount are the odds that once it is determined that an award may be paid out from a given pay group the particular award amount will be the award amount paid out from the pay group. Using the example from Table 1, the approximate odds of paying out the awards from pay group 1 are shown in Table 2:

TABLE 2

| Award Amount | Pay Group Odds |
|---|---|
| 1 | 6.4-to-1 |
| 2 | 2.1-to-1 |
| 3 | 63.8-to-1 |
| 4 | 63.8-to-1 |
| 5 | 4.3-to-1 |
| 6 | 297.9-to-1 |
| 7 | 297.9-to-1 |
| 8 | 297.9-to-1 |
| 9 | 319.2-to-1 |
| 10 | 10.6-to-1 |

Based on these pay group odds for the award amounts in pay group 1, the odds that the 10 credit award will be paid out once it is determined that an award will be paid out of pay group 1 is approximately 10.6-to-1.

Figure 34:
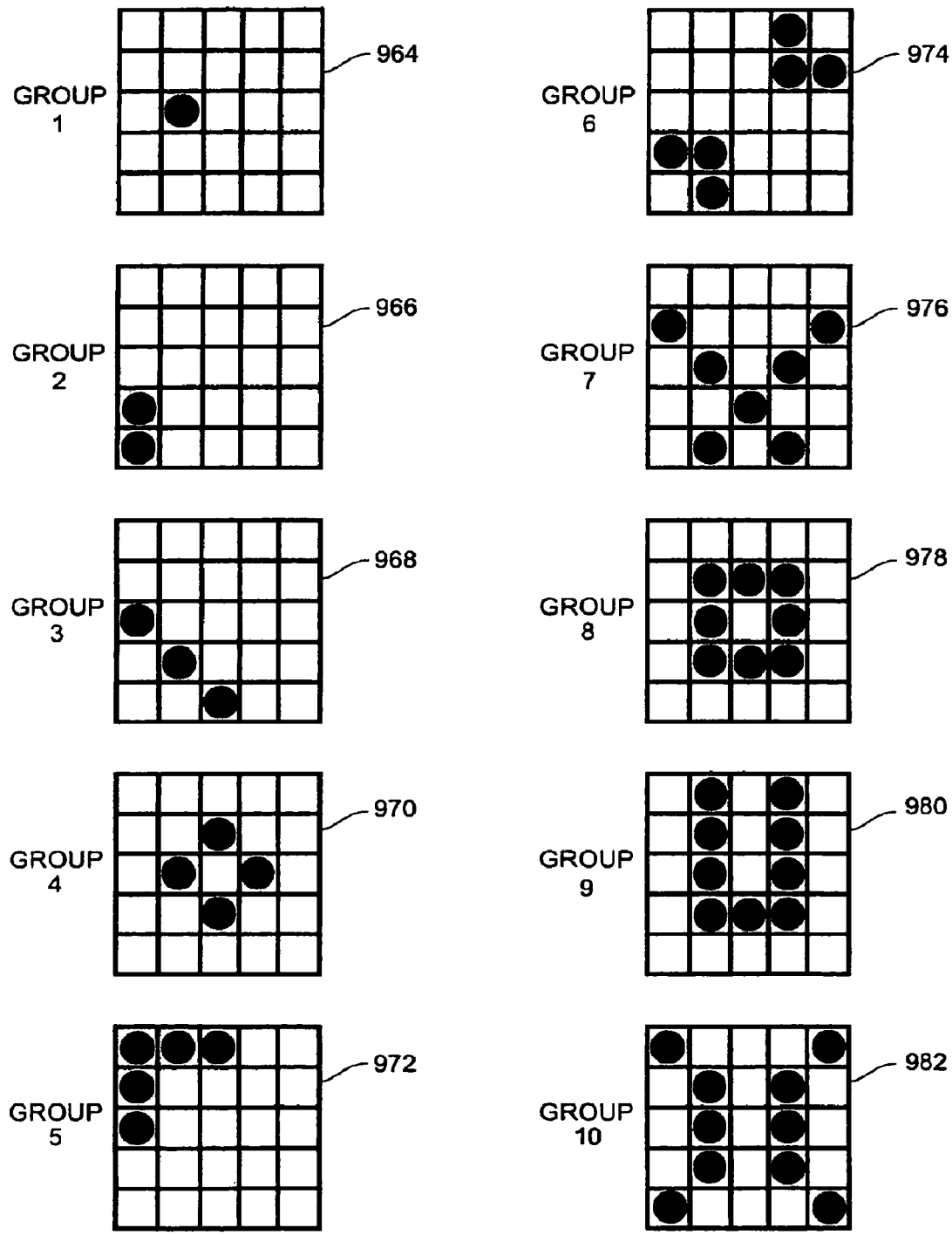
FIG. 34 is an illustration of a set of primary Bingo patterns for a multi-player Bingo game with multi-level pattern mapping of award amounts.

After calculating the odds for the pay groups, and for the award amounts within the pay groups, primary Bingo patterns may be assigned to the pay groups at block 962. In one embodiment, each of the pay groups may be assigned a primary Bingo pattern to be matched on the players' Bingo cards 802, 822. One example of primary Bingo patterns 964-982 corresponding to the pay groups of pay group table 956 is illustrated in FIG. 34. The primary Bingo patterns assigned to the pay groups may be configured so that the odds of matching the primary Bingo pattern during the Bingo game are approximately equal to the calculated odds of paying an award amount from the corresponding pay group. Where the award amounts and pay groups relate to the Bingo game win awards, or to interim pattern awards wherein the award amounts for multiple interim pattern matches may be summed, the odds for each primary Bingo patterns may be considered independently of the other primary Bingo patterns. Conversely, where the award amounts and pay groups relate to the interim pattern awards where only the highest award amount may be paid out, the odds of the primary Bingo patterns may be adjusted based on the odds that the primary Bingo patterns corresponding to higher value pay groups may be matched during the same Bingo game in a similar manner as previously discussed.

Returning to FIG. 32, prior to, concurrently with or after assigning the primary Bingo patterns to the pay groups, secondary patterns may be assigned to the award amounts within the groups at block 984. The secondary patterns may relate to the Bingo cards 802, 822 used by the players during the Bingo game, or may relate to a separate Bingo card that may or may not have the same configuration as the Bingo cards 802, 822. Moreover, the secondary patterns may relate to any other configuration or group of number, symbols or other indicia where patterns may be defined and matched using the numbers selected for the ball draw of the Bingo game. In one embodiment, the secondary patterns may relate to the Bingo cards 802, 822 used by the players, and represent additional patterns that may be matched on the cards 802, 822 to determine an award amount if the corresponding primary Bingo pattern for the pay group is matched on the Bingo card 802, 822. In one approach, the first four columns of the Bingo card may be used for the primary Bingo patterns for the pay groups, and the last column may be used for the secondary patterns for that award amounts within the groups.

Figure 35:
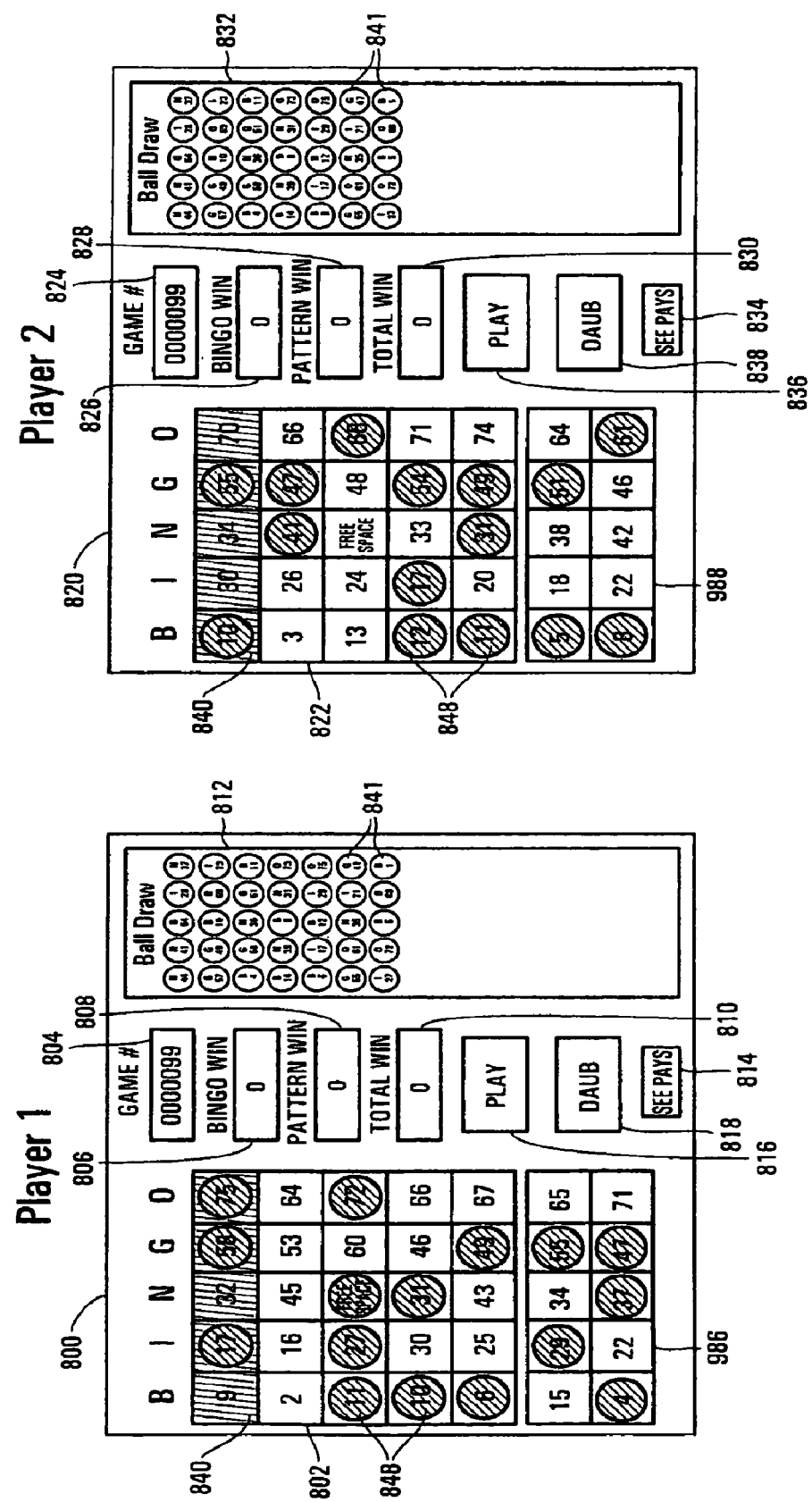
FIG. 35 is an illustration of visual displays that may be displayed during the determination of an interim pattern award amount.

In another embodiment, each player may be provided with a secondary card in addition to the Bingo card 802, 822 used to play the Bingo game and to match the primary Bingo patterns. In one alternative, each player may receive an additional card having two rows and five columns, with each of the columns corresponding to one of the columns of the player's Bingo card 802, 822. FIG. 35 corresponds to the occurrence of the Bingo game previously illustrated in FIG. 29, and showing first and second Bingo displays 800, 820 including secondary Bingo cards 986, 988, respectively, received by each player for evaluating the secondary patterns if one or more of the primary Bingo patterns are matched on the Bingo cards 802, 822. As discussed, the secondary Bingo cards 986, 988 include a two row by five column array of numbers. The numbers of the secondary Bingo cards 986, 988 may be drawn from the same ranges of numbers as the primary Bingo cards 802, 822 (i.e., B=1 to 15, I=16 to 30, N=31 to 45, G=46 to 60 and O=61 to 75), and may be selected such that the numbers of the secondary Bingo cards 986, 988 may not repeat numbers on the primary Bingo cards 802, 822, respectively. However, numbers may be repeated between the primary Bingo cards 802, 822 and the secondary Bingo cards 986, 988 if desired, and the numbers in the columns of the secondary Bingo cards 986, 988 need not be restricted to being selected from any particular ranges as is the case with the primary Bingo cards 802, 822. While the Bingo cards are illustrated herein as a 5×5 card and a separate 2×5 card, they may be considered as a single 7×5 card with the first five rows being used to play the Bingo game and the last two rows being evaluated in the event that certain predefined patterns are matched in the first five rows.

Figure 36:
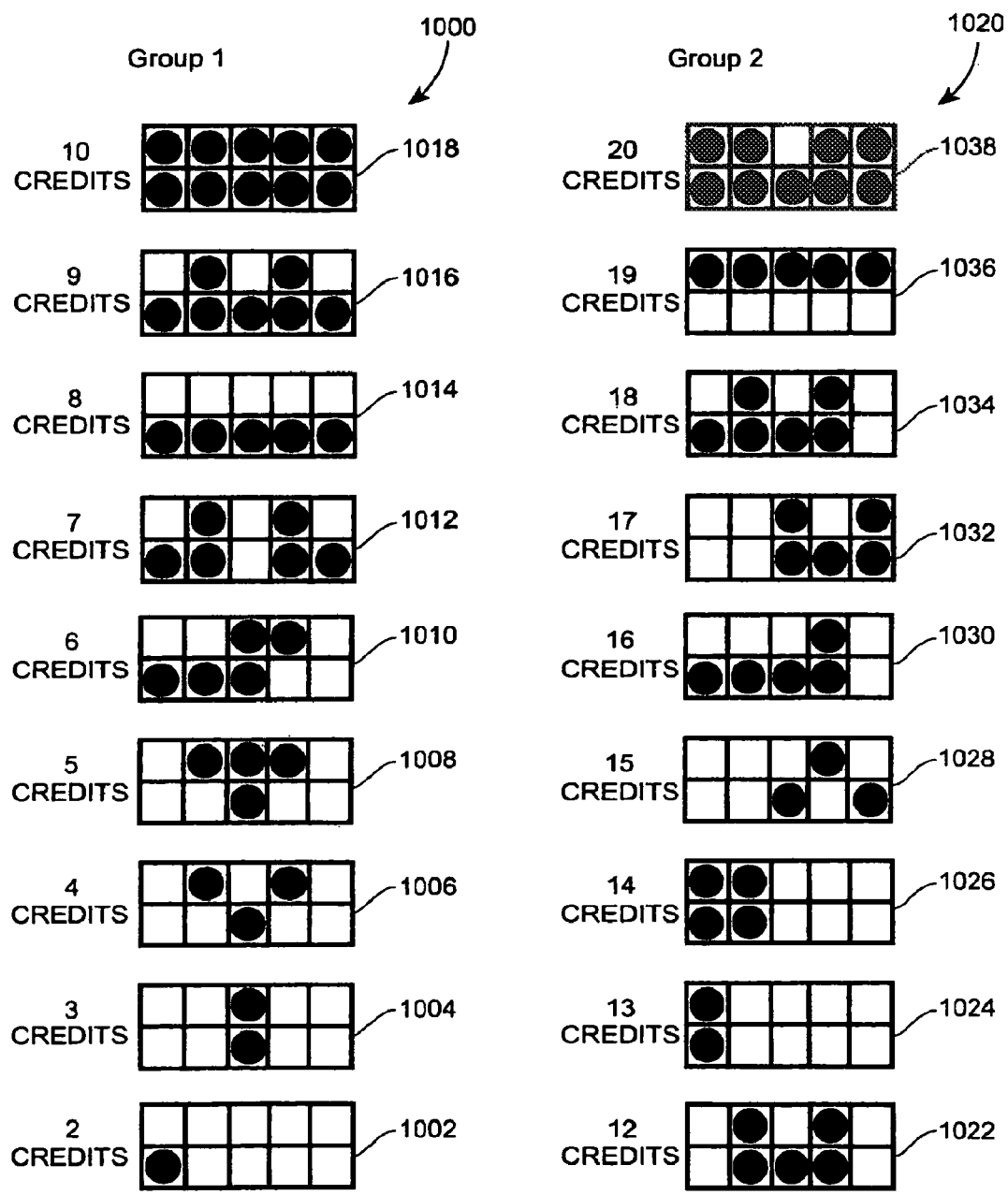
FIG. 36 is an illustration of sets of secondary patterns for a multi-player Bingo game with multi-level pattern mapping of award amounts.

In the embodiment wherein the secondary Bingo cards 986, 988 are used to evaluate the secondary patterns, it follows that the secondary patterns may be similarly defined within two rows and five columns. FIG. 36 illustrates a secondary pattern set 1000 containing secondary patterns 1002-1018 corresponding to the 2 credit through 10 credit award amounts of pay group 1 of FIG. 33, and a secondary pattern set 1020 containing secondary patterns 1022-1038 corresponding to the 12 credit through 20 credit award amounts of pay group 1 of FIG. 33. Similar secondary patterns sets may be assigned for remaining pay groups 3-10. The various secondary pattern sets may or may not use the same secondary patterns. Even where the same secondary patterns are used for all pay groups, the odds within the groups may still be varied based on the particular patterns and the number of patterns assigned to each award amount within a given group. In this embodiment, when a primary Bingo patterns 964-982 is matched on the primary Bingo cards 802, 822, the player may be paid the lowest award amount in the pay group in the event that none of the secondary patterns for the pay group are matched on the secondary Bingo card 802, 822. Consequently, it may not be necessary to assign a secondary pattern to the lowest value award amounts. However, a secondary pattern may be assigned to the lowest value award amounts, and the player may not receive an award if no secondary pattern is matched after matching the primary Bingo pattern.

Referring back to FIG. 35, the award amounts in pay group table 956 may represent interim pattern award amounts, the primary and secondary Bingo cards 802, 822, 986, 988 may be used to determine the award amount for any interim pattern wins. Of course, the award amounts may alternatively relate to Bingo game win awards, and the primary and secondary patterns may be evaluated to determine the amounts of Bingo win awards. The secondary Bingo cards 986, 988 may be evaluated and marked by the network computer 22 and/or the gaming units 20 in a similar manner as discussed for the primary Bingo cards 802, 822. Because one of the primary Bingo patterns must be matched in order to receive an interim pattern award, the gaming units 20 may be configured to display the secondary Bingo cards 986, 988 only after at least one of the primary Bingo patterns may be matched on the primary Bingo cards 802, 822. Alternatively, the secondary Bingo cards 986, 988 may be displayed at all times. As discussed above, a player may be required to daub their Bingo cards in order to claim any interim pattern wins.

Depending on the configuration for determining interim pattern awards (entire ball draw, maximum number of balls, predetermined number of balls), the secondary Bingo cards 986, 988 may be marked based on the same ball draw or portion thereof as is used for the primary Bingo cards, 802, 822. For the first player, on the primary Bingo card 802, the marked number "27" corresponds to the first primary Bingo pattern 964 of FIG. 34 for pay group 1, and the marked numbers "6" and "10" correspond to the second primary Bingo pattern 966 of FIG. 34 for pay group 2. As discussed previously, players may be awarded either the sum of the interim pattern awards when multiple interim patterns are matched, or only the highest award amount, depending on the configuration of the Bingo game. Where only the highest award amount may be awarded, the first player may receive one of the award amounts in pay group 2 since all the award amounts in pay group 2 are higher than the award amounts in pay group 1. On the secondary Bingo card 986, the marked numbers do not match any of secondary patterns 1022-1038 of secondary pattern set 1020. Consequently, the first player may receive eleven credits as an interim pattern win award as the default award amount for pay group 2, in addition to the seventeen credits for the Bingo win award.

On the primary Bingo card 822, the marked numbers "11" and "12" correspond to the second primary Bingo pattern 966 of FIG. 34 for pay group 2. On the secondary Bingo card 988, the marked numbers "5" and "8" correspond to the second secondary pattern 1024 of FIG. 36 and entitle the second player to thirteen credits as an interim pattern win.

Multi-level pattern mapping is not limited to two levels as illustrated herein. Any number of levels may be used depending on the number of potential award amounts available in a paytable to which the patterns are to be mapped. Therefore, groups may further include subgroups, each of which may include further subgroups or multiple award amounts. For example, in addition to a 5×5 primary Bingo card and a 2×5 secondary Bingo card, the Bingo game may further include a 2×2 or 3×3 interim pattern, with patterns on the 5×5 Bingo game corresponding to groups of award amounts, patterns on the 2×5 card corresponding to subgroups of award amounts under the groups, and the 2×2 or 3×3 cards corresponding to particular award amounts within the subgroups. Those skilled in the art will understand that any card configuration and number of levels may be used to implement interim pattern wins in a Bingo game.

Moreover, alternatives exist to assigning multiple patterns at each level. In one alternative embodiment, elements within a level may be distinguished on the basis of the number of balls drawn before a particular pattern may be matched on a Bingo card. For example, instead of assigning distinct primary Bingo patterns to each pay group, a single primary Bingo pattern may be assigned that applies to all the pay groups. When the primary Bingo pattern is matched on the primary Bingo card, the pay group from which to select the award amount may be determined based on the number of balls required to match the primary Bingo pattern. Depending on the assigned primary Bingo pattern, matching the primary Bingo pattern in ten or fewer balls may correspond to the tenth pay group, matching in fifteen or fewer balls may correspond to the ninth pay group, and so on. The numbers of balls may be selected such that the odds of matching the primary Bingo pattern within a particular number of balls may be approximately equal to the odds that an award may be paid out from a given pay group. Once the pay group is determined based on the number of drawn balls, the secondary patterns for the pay group may be evaluated in the manner described above. Alternatively, primary Bingo patterns may be assigned to each pay group as described above, with the award amount within the pay group being determined by the number of balls required to match the primary Bingo pattern for the pay group. Another approach may have the award amount within a pay group selected based on the number of additional number matches on the primary Bingo card in addition to the primary Bingo pattern. Further, if a single set of primary Bingo patterns (i.e. one or more patterns) is used and the award amount is based on the number of balls drawn to match one of the primary Bingo patterns, the primary Bingo patterns may also be the game-winning patterns.

Additional embodiments are contemplated for mapping award amounts to patterns in a Bingo game. In one embodiment, an award amount within a pay group may be selected by other random selection mechanisms, such as by a simulated wheel spin where the wheel stop positions correspond to the award amounts within the pay group. The wheel spin may animate concurrently with the presentation of the marking of the numbers on the players' Bingo cards. In another embodiment, which may be implemented in a Bonanza Bingo game, an award amount may be determined based on a secondary condition associated with the Bingo card received by the player. One such method may use the occurrence of a pseudo-random condition associated with the Bingo card to determine an award amount within a pay group. For example, a player receiving a blue card may receive the highest award amount or pay group, a red card may receive the next highest award amount or pay group, and a white card may receive the lowest award amount or pay group. If the player matches a primary Bingo pattern for one of the pay groups, the card color may determine which award amount may be selected from the matched pay group. In addition to, or instead of, card color, other predefined conditions may determine the award amount selection, such as having certain numbers or types of numbers appearing on the player's Bingo card.

In a further alternative, a specific pay structure may be associated with each Bingo card. Each primary pattern may have an award amount, but the award amounts may be different for different players. The game may include several predefined sets of awards, with each having an award associated with each winning Bingo pattern. When the player receives the Bingo card, the player may also receive a selection of which award set will apply to any Bingo or interim pattern wins for the Bingo game As a still further alternative embodiment, sets of award amounts may contain one award amount for each of the pay groups such that the first set contains the highest award amounts for each pay group, the second set contains the next highest award amounts for each pay group, and so on. If one of the primary Bingo patterns is matched within a certain number of balls, the award amount from the first set may be awarded. As additional numbers are required to match the primary Bingo pattern, the set selection may progressively shift to those sets containing the lower award amounts. In yet another embodiment, states, such as colors, may be assigned to the balls drawn or to the spots on the Bingo cards. The award amount selection may be based on the combination of states of the covered numbers. For example, matched patterns wherein all of the matched balls or spots are the same color may correspond to higher award amounts than matched patterns consisting of multiple colors.

Alternative Displays of Bingo Game Outcomes

As previously discussed, players may find the display of other games, such as slot machines, video poker, video blackjack, video Keno and the like, to be more appealing than the display of Bingo games. Moreover, as the number of award amounts and, correspondingly the number of Bingo patterns, offered in a Bingo game increases, it may become more difficult for players to discern winning outcomes (i.e. pattern matches) in a Bingo game than, for example, a slot machine offering a comparable number of award amounts based on matching reel symbols along a plurality of paylines. The Bingo player's gaming experience may be enhanced by providing an alternative display of the outcome of the Bingo game determined based on a ball draw and the player's Bingo card in a format that may be preferential to the player or allow the player to more readily identify winning outcomes of the Bingo game. In one alternative, the outcome determined by the Bingo game may be presented to the players with the display simulating the appearance of a traditional Class III game, such as electro-mechanical or video slots, video poker, video blackjack, video Keno and the like.

It may be emphasized that the slot reels or other alternative outcome displays used to display the outcome determined by the Bingo game may not themselves determine the outcome of the Bingo game. The Bingo gaming system is conducting a Bingo game that may still be played without providing the supplemental outcome display offered by such alternative outcome displays. The ball draw leads to covered numbers, characters or other game indicia on the Bingo card. Achieving coverage of the predetermined game-winning pattern leads to a Bingo win award. The game-winning patterns and/or interim patterns may be chosen to achieve desired Bingo game dynamics. However, the targeted dynamics (i.e. the Bingo win award values, the relative frequency of occurrence of the awards, the Bingo win and interim pattern payout rates, and the like) may be selected so as to closely mirror the dynamics that a desired alternative outcome display, such as a particular slot machine or other casino game, might produce. The correspondence between the Bingo game dynamics and the casino game dynamics may allow the designer to map the Bingo game awards to the display of the casino game via the alternative outcome display, thereby providing an alternative and potentially more user-appealing display of the Bingo outcome.

In one embodiment, an existing casino game may be used for the alternative outcome display, with the award amounts and the paytable for the casino game being used to configure the Bingo game dynamics. For example, the multi-player Bingo game may include an alternative outcome display simulating the appearance of a traditional slot machine, with interim patterns being mapped to the award amounts of the slot machine paytable to achieve approximately the same payout rate for the interim pattern awards as for the slot machine. Where relatively few award amounts are offered in a paytable for the slot machine, a set of interim patterns, such as, for example, the patterns 920-938 of FIG. 28, may be mapped to the award amounts, with the interim patterns having approximately the same odds of being matched on a player's Bingo card as the odds of the slot machine paying out the corresponding award amount.

Figure 37:
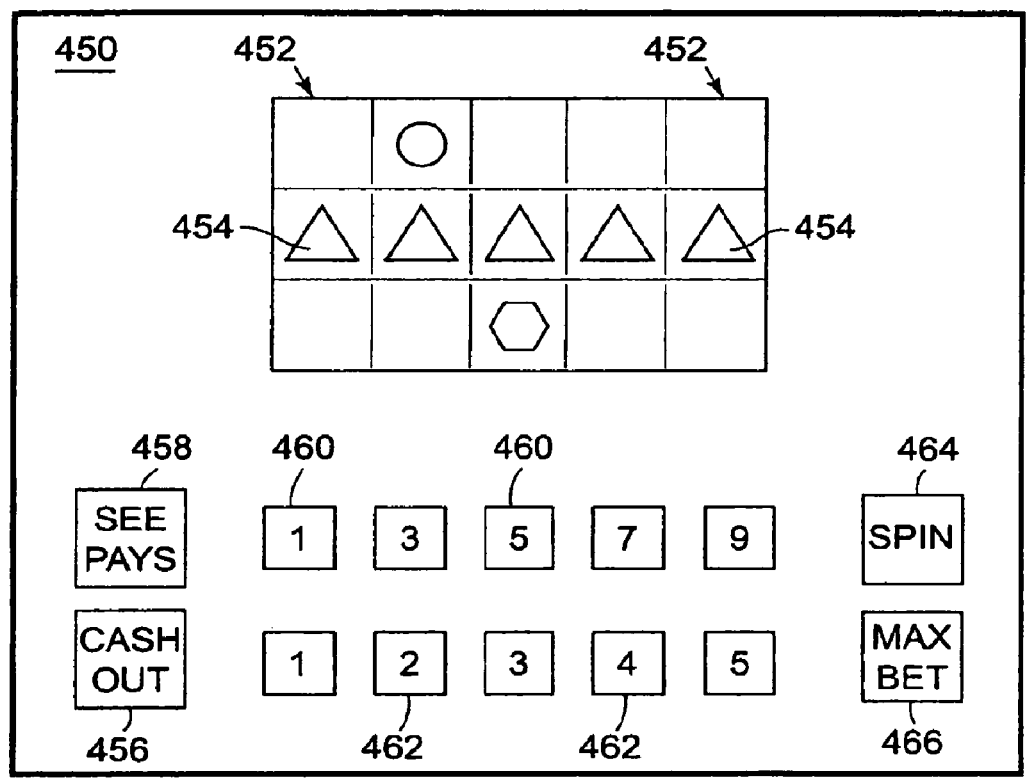
FIG. 37 is an illustration of an embodiment of a video slots display that may be displayed as an alternative outcome display.

The alternative outcome display may be provided at the gaming units 20 in addition to the display of the Bingo game discussed above. For the above example, the outcome of the Bingo game may be displayed at the first display device 68 of the gaming unit 20, and the alternative outcome display may be provided at the second display device 70, perhaps as an electro-mechanical or video display of a set of slot reels. FIG. 37 is an exemplary display 450 that may be shown on the display unit 70 as an alternative outcome display. Referring to FIG. 37, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the Bingo game, a plurality of player-selectable buttons may be displayed that may map wagering selections for a slot machine to wagers by the players on the Bingo game. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 38:
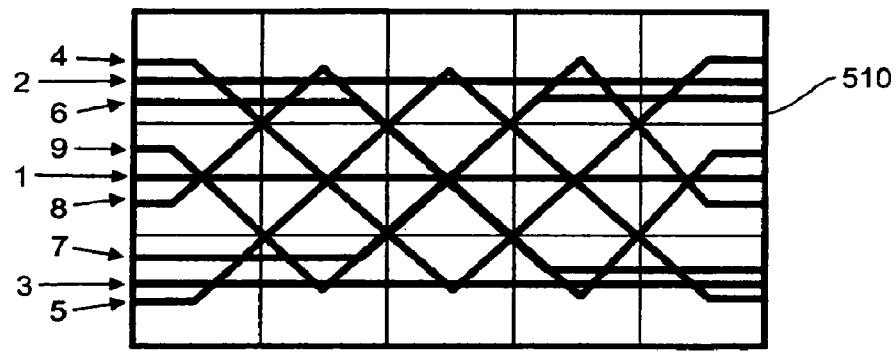
FIGS. 38 and 39 illustrate an embodiment of the multi-line paytable corresponding to the video slots display of FIG. 37, along with illustrations of the individual paylines.
Figure 39:
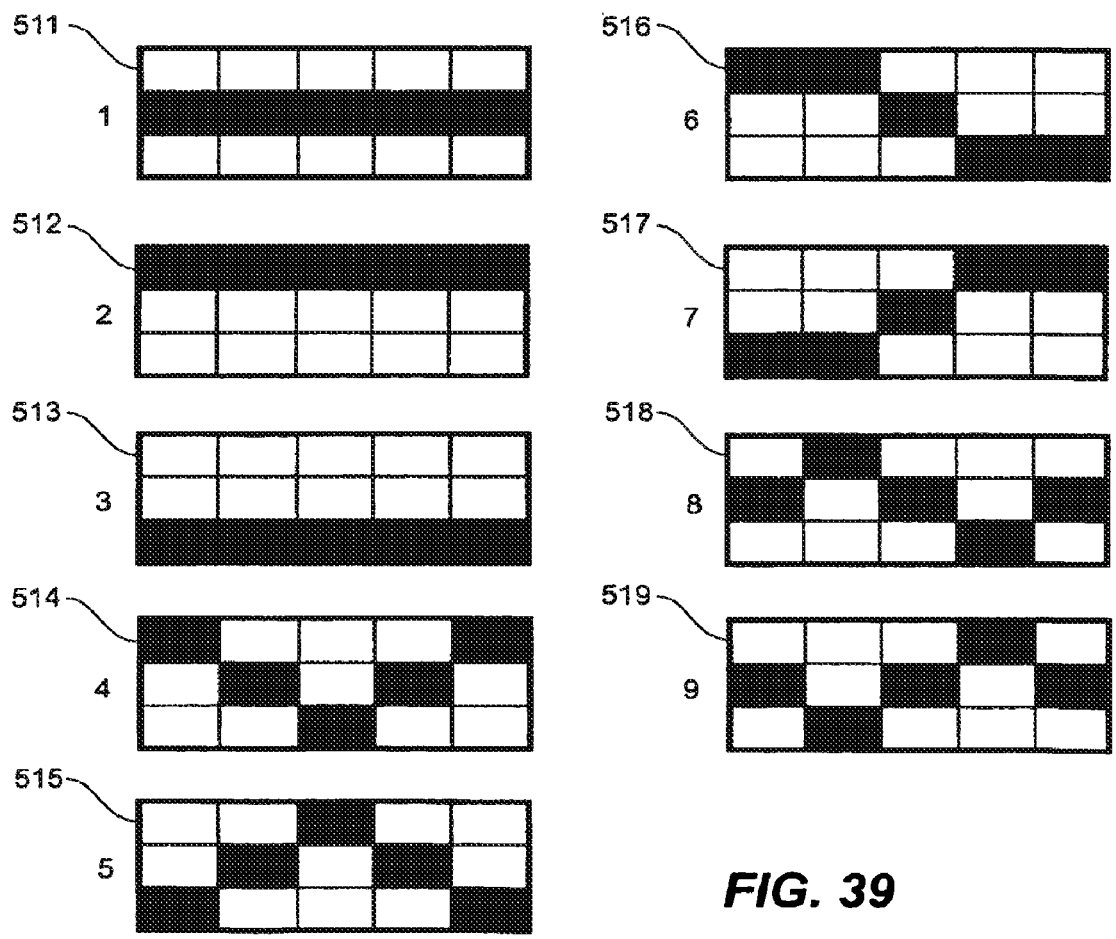

If the player requests payout information, such as by activating the "See Pays" button 458, the gaming unit 20 may cause one or more paytables to be displayed on the display unit 70. One example of a paytable 510 for a slot machine with multiple paylines is illustrated in FIG. 38. The paytable 510 may correspond to a five reel slot machine having three stop positions per reel such that 15 symbols are displayed as shown in FIG. 37. The paytable 510 includes nine paylines that may be played by the player based on selections made using buttons 460. FIG. 39 illustrates each of the individual paylines 511-519 making up the paytable 510 for the purpose of clarity. When the reels are spun and stop, each of the paylines 511-519 on which the player wagers is evaluated to determine whether the symbols on the reels match any of the predefined combination of reel symbols for which a prize is awarded. More than one payline may include a winning combination of reel symbols, and the award amounts for multiple paylines may be added to determine a total award amount for the reel spin.

Each award amount in the slot machine paytable may correspond to one or more combinations of reel stop positions that when hit by the slot machine result in the payout of the associated award amount. The mapping of the interim patterns to the slot machine paytable may further include mapping the interim patterns to the combination or combinations of reel stop positions corresponding to the award amount. For each interim pattern and corresponding award amount, the gaming unit 20 may store the available combination or combinations of reel stop positions to be displayed at the alternative outcome display to represent the outcome of the Bingo game. When a given interim pattern is matched on the Bingo card, the gaming unit 20 may randomly or sequentially select one of the available combinations of reel stop positions corresponding to the award amount, and cause the alternative outcome display to display the slot reels in the appropriate positions to display a slot machine outcome that if determined by a slot machine engine would result in the payout of the award amount.

During the execution of the multi-player Bingo game routines 700, 750, 760, 770, of FIGS. 5A and 5B, 16A and 16B, 17A and 17B, and 18A and 18B, respectively, or other routines for conducting the Bingo game, the gaming unit 20 may control the alternative outcome display to achieve a realistic simulation of the casino game used to display the outcome of the Bingo game. At blocks 704 and 706, once two or more players enroll in the occurrence of the Bingo game, thereby ensuring that the Bingo game may be played, the gaming unit 20 may cause the display device 70 to display an animated graphic or other display simulating the initiation of the casino game. For example, if a slot machine is being simulated, the gaming unit 20 may cause the display device 70 to start the electro-mechanical or video reels spinning as if a player had hit a "Spin" button or pulled the arm of a slot machine. For video card games, the display device 70 may display a graphic of a deck of cards being shuffled or of hands being dealt face down by a dealer. Still further, for video Keno games, the display device 70 may display a graphic of a blower-type ball draw mechanism tumbling the Keno balls.

The animated display may continue until the Bingo game winner or winners are determined and the Bingo cards are evaluated for interim patterns and corresponding award amounts. After the awards are determined at block 730, in addition to displaying the Bingo game outcome and award graphics at the display device 68 at block 732, the gaming device 20 may also determine and display at the display device 70 an alternative outcome display corresponding to the Bingo game outcome. Using the outcome of the Bingo game and corresponding award amount, the gaming unit 20 may select one of the available alternative outcome displays for the outcome and award amount, and cause the display device 70 to display the selected outcome display. For a slot machine, the gaming unit 20 may cause the display device 70 to stop the reels at the corresponding combination of reel stop positions. Similarly, for video card games, the display device 70 may display player and/or dealer hands that would result in the payout of the award amount by the corresponding video card game.

While a single level of Bingo patterns may be appropriate to map a paytable for a casino game having a relative small number of award amounts, the multi-level pattern mapping strategy discussed above may be necessary to configure the Bingo game dynamics to correspond to a casino game desired to be used as an alternative outcome display having a large number of available award amounts. In one example of a slot machine having five reels with three symbols per reel being displayed, and players being able to wager on up to nine paylines, the paytable may contain hundreds of available award amounts. In this example, thirty four distinct award amounts may be available when only one payline is played, while 351 distinct award amounts may be available when all nine paylines are played with the award amounts ranging from two to 4,727 credits.

In one embodiment, Bingo patterns for the Bingo game may be mapped to the paytable for the slot machine using three levels of mapping. At the first level, the paytable may be divided into groups of award amounts corresponding to the number of paylines being played by a player. In the above example, the one line group may include thirty-four distinct award amounts, the nine line group may include 351 distinct award amounts, and the groups corresponding to playing two through eight lines may each include the corresponding distinct award amounts available in the paytable. Once the award amounts are divided into groups based on the number of lines played, primary and secondary patterns may be assigned for the award amounts in each group according to the multi-level pattern strategy discussed above. It should be noted that in this example of multi-level pattern mapping, the first level groups may not have corresponding patterns mapped thereto for selecting between the groups. Instead, the first level groups will be selected by the players based on the number of paylines the players elect to play in the Bingo game.

Using the nine payline group as a further example, the available award amounts may be divided into non-overlapping pay groups as shown in pay group table 1050 of FIG. 40. With extremely large numbers of award amounts, it may be desirable to select a subset of the most prevalent award amounts, or select a subset based on other criteria. In this example, the 149 most prevalent award amounts may have been selected and divided into the sixteen non-overlapping groups of pay group table 1050. Once the groups are determined, the pay group odds and the odds for the award amounts within the pay groups may be calculated in the manner described above.

Figure 41:
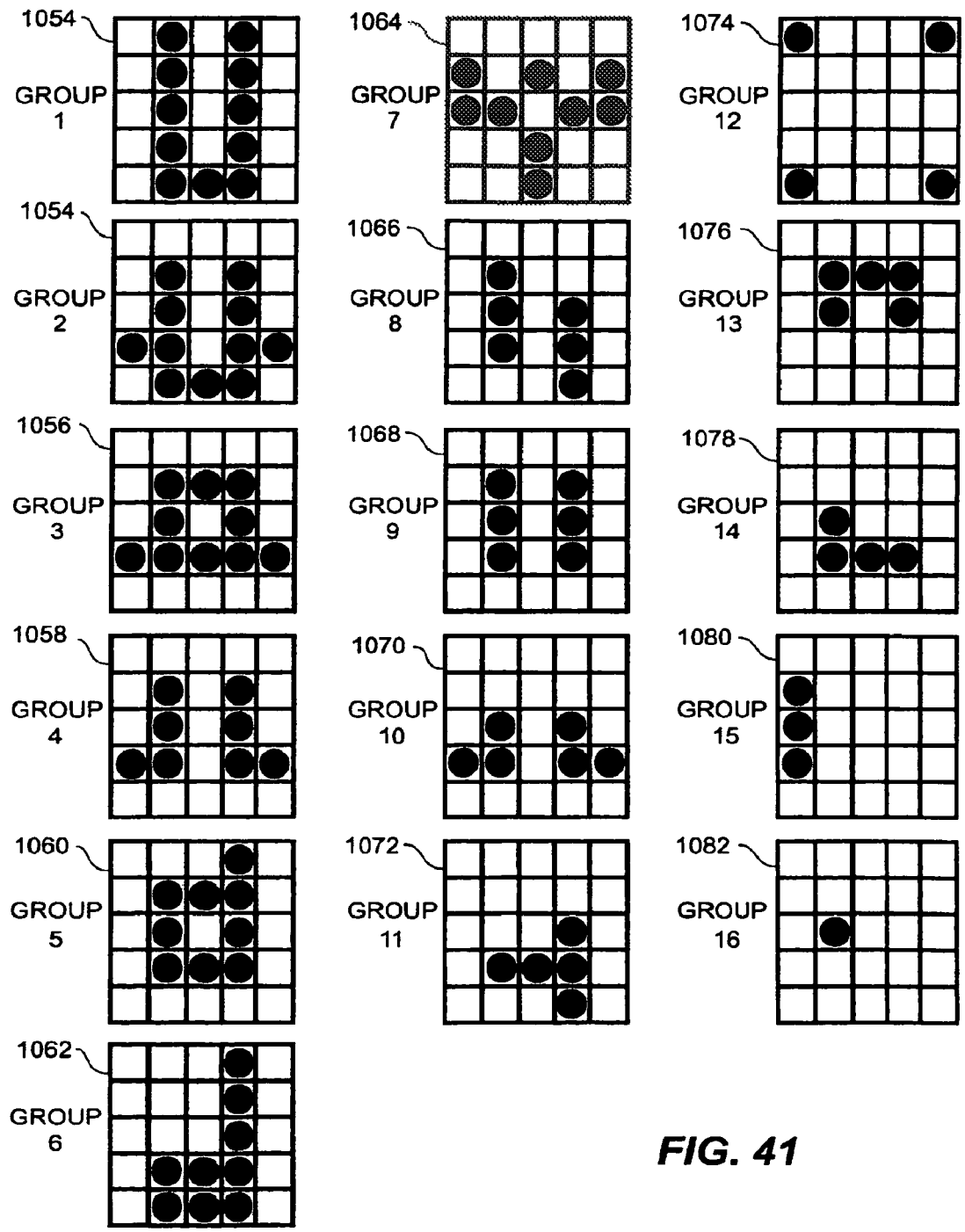
FIG. 41 is an illustration of a set of primary Bingo patterns for a multi-player Bingo game with multi-level pattern mapping of award amounts from a slots paytable.

After the odds are calculated for the pay groups and the awards, primary patterns may be assigned to the pay groups and secondary patterns may be assigned to the award amounts within the pay groups corresponding to the calculated odds in the manner described above. An example of a set of primary patterns 1052-1082 for pay groups 1-16 is shown in FIG. 41. Where only the highest award amount may be paid for multiple pattern matches, the odds of paying out an award from each of the pay groups are shown in Table 3:

TABLE 3

| Primary Pattern | Odds of Payout |
| --- | --- |
| 1 | 11,740-to-1 |
| 2 | 13,602-to-1 |
| 3 | 4,766-to-1 |
| 4 | 909-to-1 |
| 5 | 2,142-to-1 |
| 6 | 1,979-to-1 |
| 7 | 1,798-to-1 |
| 8 | 139-to-1 |
| 9 | 282-to-1 |
| 10 | 172-to-1 |
| 11 | 71-to-1 |
| 12 | 24-to-1 |
| 13 | 67-to-1 |
| 14 | 33-to-1 |
| 15 | 11-to-1 |
| 16 | 2.9-to-1 |

The primary patterns may be configured so that the odds of matching the primary patterns may be approximately equal to the calculated odds of paying out an award amount from the corresponding pay groups.

Figure 42:
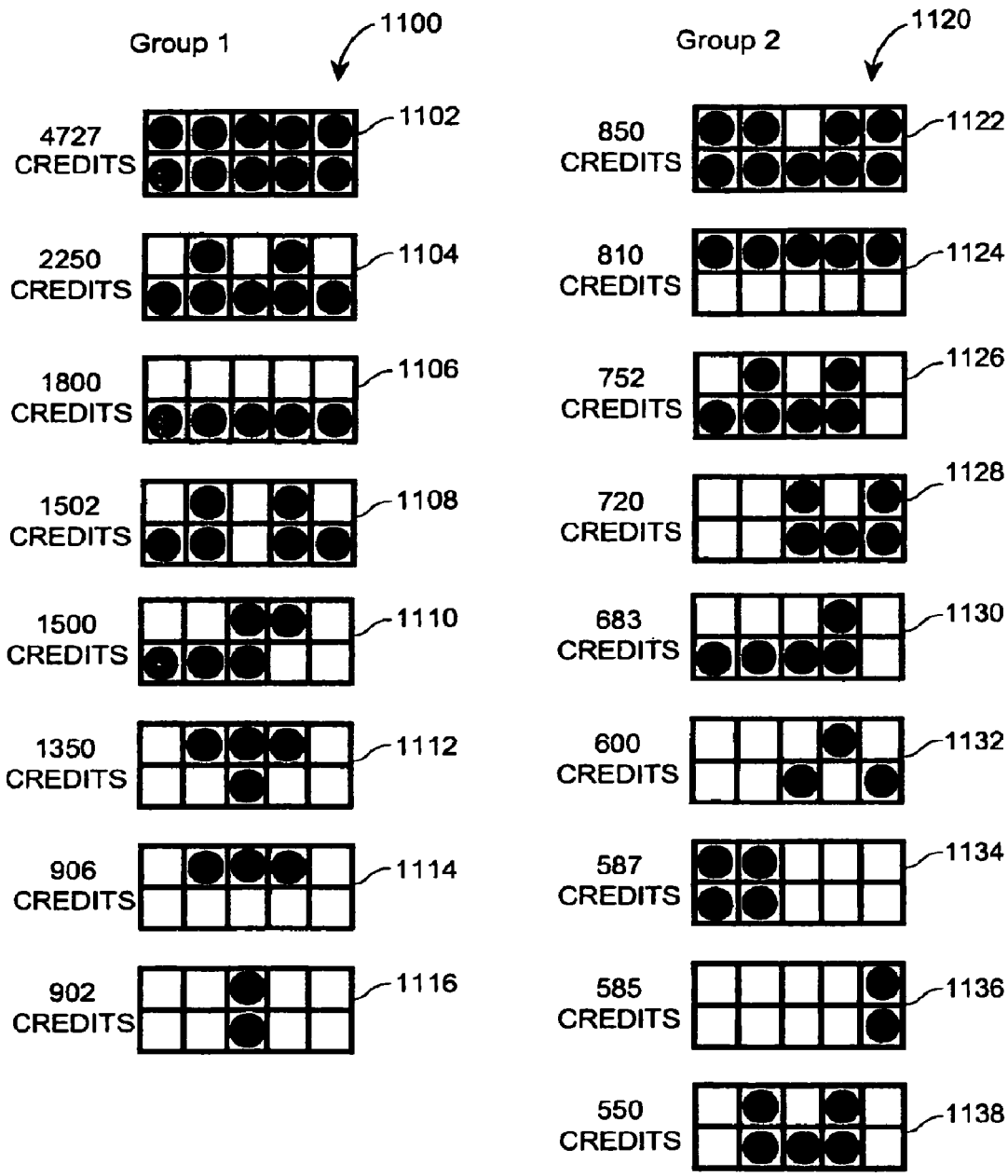
FIG. 42 is an illustration of sets of secondary patterns for a multi-player Bingo game with multi-level pattern mapping of award amounts.

As with the example above, the secondary patterns for the award amounts may correspond to the secondary Bingo cards 986, 988 discussed above. FIG. 42 illustrates a first secondary pattern set 1100 of secondary patterns 1102-1116 that may be assigned to the award amounts in pay group 1, and the second secondary pattern set 1120 of secondary patterns 1122-1138 that may be assigned to the award amounts in pay group 1. Similar secondary pattern sets may be assigned to the remaining pay groups 3-16. The odds of matching the secondary patterns may be approximately equal to the calculated odds of paying out a particular award amount from the pay group when the corresponding primary pattern is matched on a player's Bingo card. In each pay group, a secondary pattern may not be assigned to the lowest award amount in a pay group where the lowest award amount may be paid out if none of the secondary patterns of the pay group are matched.

Figure 43:
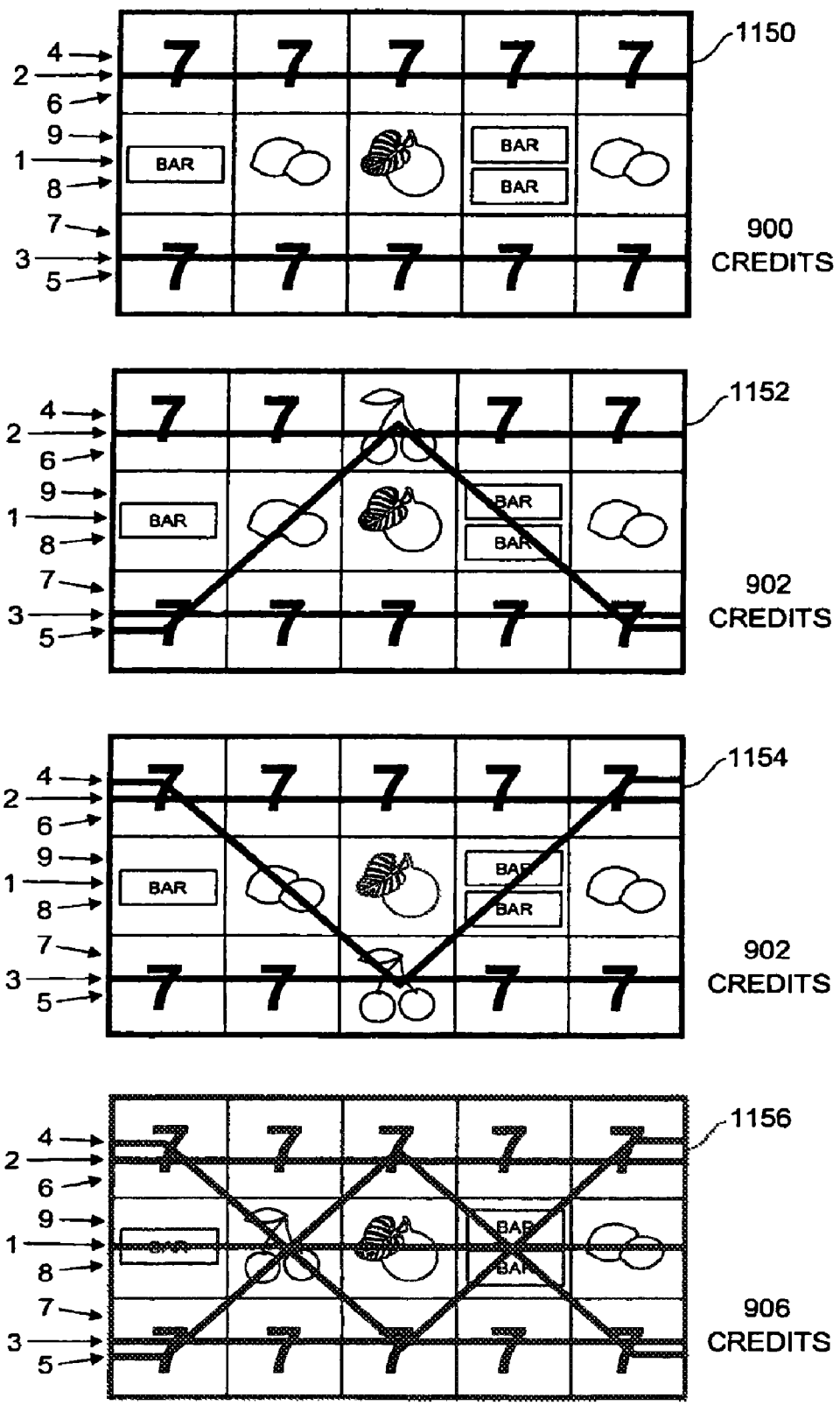
FIG. 43 is an illustration of possible slot machine reel stop positions corresponding to various award amounts.

As previously discussed, each award amount from the paytable may correspond to one or more outcomes of the casino game being simulated at the alternative outcome display. Several example reel stop positions 1150-1156 corresponding to award amounts from pay group 1 are illustrated in FIG. 43, and may be stored at gaming units 20 for display at the alternative outcome display. As discussed above, the example slot machine may include five reels with three symbols of each reel that would be generated by slot machine engine if the slot machine were being paid. Moreover, up to nine paylines may be used to evaluate combinations of symbols. The reel stop positions 1150, in which five "7's" are matched on payline 2 and payline 3, correspond to the 900 credit award amount of in pay group 1. When a player matches primary pattern 1052 of FIG. 41 on the primary Bingo card, and does not match any of the secondary patterns 1102-1116 of secondary pattern set 1100 of FIG. 42 on the secondary Bingo card, the player may be awarded 900 credits. The gaming unit 20 selects the reel stop positions 1150 from the pool of slot machine outcomes, and causes the second display device 70 to stop the slot reels at the reel stop positions 1150 to simulate the appearance of a slot machine, and to display the outcome determined in the Bingo game.

The reel stop positions 1152, 1154 may both correspond to a 902 credit award amount, and both may be stored at the gaming units 20 in the pool of available slot machine outcomes. The cherry may be a wild card symbol combinable with other symbols to match the predetermined combination of symbols, or may pay an award of two credits even if no combinations are matched. Consequently, the cherry in the top row may complete the five "7's" for payline 2, and result in additional two credit awards on paylines 5 and 4, respectively, giving a total award of 902 credits. When a player matches primary pattern 1052 of FIG. 41 on the primary Bingo card, and also matches the secondary pattern 1116 of secondary pattern set 1100 of FIG. 42 on the secondary Bingo card, the player may be awarded 902 credits, and the gaming unit 20 may randomly or sequentially select one of the reel stop positions 1152, 1154 for display at the second display device 70. The reel stop positions 1156 may correspond to a 906 credit award amount, with the wild card cherry resulting in two credit awards on each of pay lines 1, 4 and 5. When a player matches primary pattern 1052 of FIG. 41 on the primary Bingo card, and also matches the secondary pattern 1114 of secondary pattern set 1100 of FIG. 42 on the secondary Bingo card, the player may be awarded 906 credits, and the gaming unit 20 may select the reel stop positions 1156 for display at the second display device 70. If none of the primary patterns 1052-1080 are matched on the primary Bingo card, regardless of whether any secondary patterns for any pay groups are matched on the secondary Bingo card, no credits are awarded to the player and the gaming unit 20 may randomly or sequentially select an outcome from a pool of non-winning reel stop positions for display at the second display device 70.

While the embodiment of an alternative outcome display illustrated and discussed herein may simulate the appearance of a slot machine, those skilled in the art will understand that other casino games may be simulated in an alternative outcome display, with the award amounts for the casino game's paytable being mapped to single or multiple levels of Bingo patterns. For example, the alternative outcome display may simulate the appearance of a video poker machine. The award amounts for the video poker machines may correspond to one or more poker hands. When particular Bingo patterns are matched by a player in an occurrence of the Bingo game resulting in the payout of an award amount, the gaming unit 20 may select an available poker hand corresponding to the award amount for display at the display device 70. Other casino games may be similarly mapped and simulated by the alternative outcome display in a similar manner. Moreover, the gaming units 20 may be programmed with a plurality of alternative outcome displays corresponding to a plurality of casino games, with the player being provided with the opportunity to select a desired one of the available alternative outcome displays.

Determining Game-Winning Patterns

In the simplest embodiment, the network computer 22 may use the same game-winning pattern or patterns for each occurrence of the Bingo game, or randomly or sequentially select from a pool of game-winning patterns, with each player playing to match the same game-winning pattern or patterns. In an alternative embodiment, players may be assigned a game-winning pattern corresponding to the amount of the player's wager. For the same wager, the game-winning pattern may have the same probability of occurring. For different wager amounts, the greater the wager, the game-winning pattern assigned to the player may have a greater the probability of being matched in fewer numbers than for the game-winning patterns assigned to players placing smaller wagers.

In some configurations of the Bingo game, the number of Bingo cards being played in an occurrence of the Bingo game, due to either varying numbers of players, varying numbers of Bingo cards being played by the players, or both, may impact the payout rate for interim pattern awards. For a given game-winning pattern, as more Bingo cards are being played in the Bingo game, the average number of balls required for one player to match the game-winning pattern decreases. Where interim pattern awards are evaluated based on a predetermined maximum number of balls from the ball draw, and fewer if the game-winning pattern is matched in fewer than the predetermined maximum number of balls, this may result in interim pattern win truncation whereby fewer interim pattern awards are paid out due to the increased number of Bingo games ending when fewer than the predetermined maximum number of balls have been drawn. In order to ensure that the desired interim pattern award payout rate is achieved, the game-winning pattern or patterns may be adjusted based on the number of Bingo cards enrolled in the Bingo game to ensure that the distribution of Bingo game wins in fewer than the predetermined number of balls is approximately the same regardless of the number of Bingo cards.

In one embodiment, the multi-player Bingo game may minimize the impact of varying numbers of Bingo cards on the payout rate for interim pattern awards by using different game-winning patterns depending on the number of Bingo cards enrolled in the occurrence of the Bingo game to achieve a consistent distribution of the number of balls to Bingo. As previously discussed, after the players are enrolled for the occurrence of the Bingo game, the network computer 22 may determine the game-winning pattern for the occurrence of the Bingo game at the block 712 of routine 700.

To achieve a consistent distribution, for each number of Bingo cards that may be enrolled in an occurrence of the Bingo game, parameters may be established for randomly determining the game-winning pattern or patterns that may guarantee a consistent distribution of the number of balls to Bingo. The parameters may include, among other criteria, the number of spots to be covered in one or more game-winning pattern and the number of spots that may be shared between multiple game-winning patterns. One example of parameters for determining the game-winning patterns to achieve a uniform number of balls to Bingo distribution is illustrated in Table 4, where the predetermined maximum number of balls used to evaluate interim pattern wins is thirty-five:

TABLE 4

| Number of Bingo Cards | First Game-Winning Pattern Spots | Second Game-Winning Pattern Spots | Number of Shared Spots |
|---|---|---|---|
| 2 | 7 | 7 | 5 |
| 3 | 7 | 8 | 6 |
| 4 | 8 | 8 | 5 |
| 5 | 8 | 9 | 0 |
| 6 | 8 | 11 | 0 |

TABLE 4-continued

| Number of Bingo Cards | First Game-Winning Pattern Spots | Second Game-Winning Pattern Spots | Number of Shared Spots |
|---|---|---|---|
| 7 | 8 | 0 | 0 |
| 8 | 9 | 9 | 6 |
| 9 | 9 | 10 | 0 |
| 10 | 9 | 10 | 0 |
| 11 | 9 | 10 | 8 |
| 12 | 9 | 11 | 6 |
| 13 | 9 | 11 | 8 |
| 14 | 9 | 12 | 9 |
| 15 | 9 | 0 | 0 |

Figure 44:
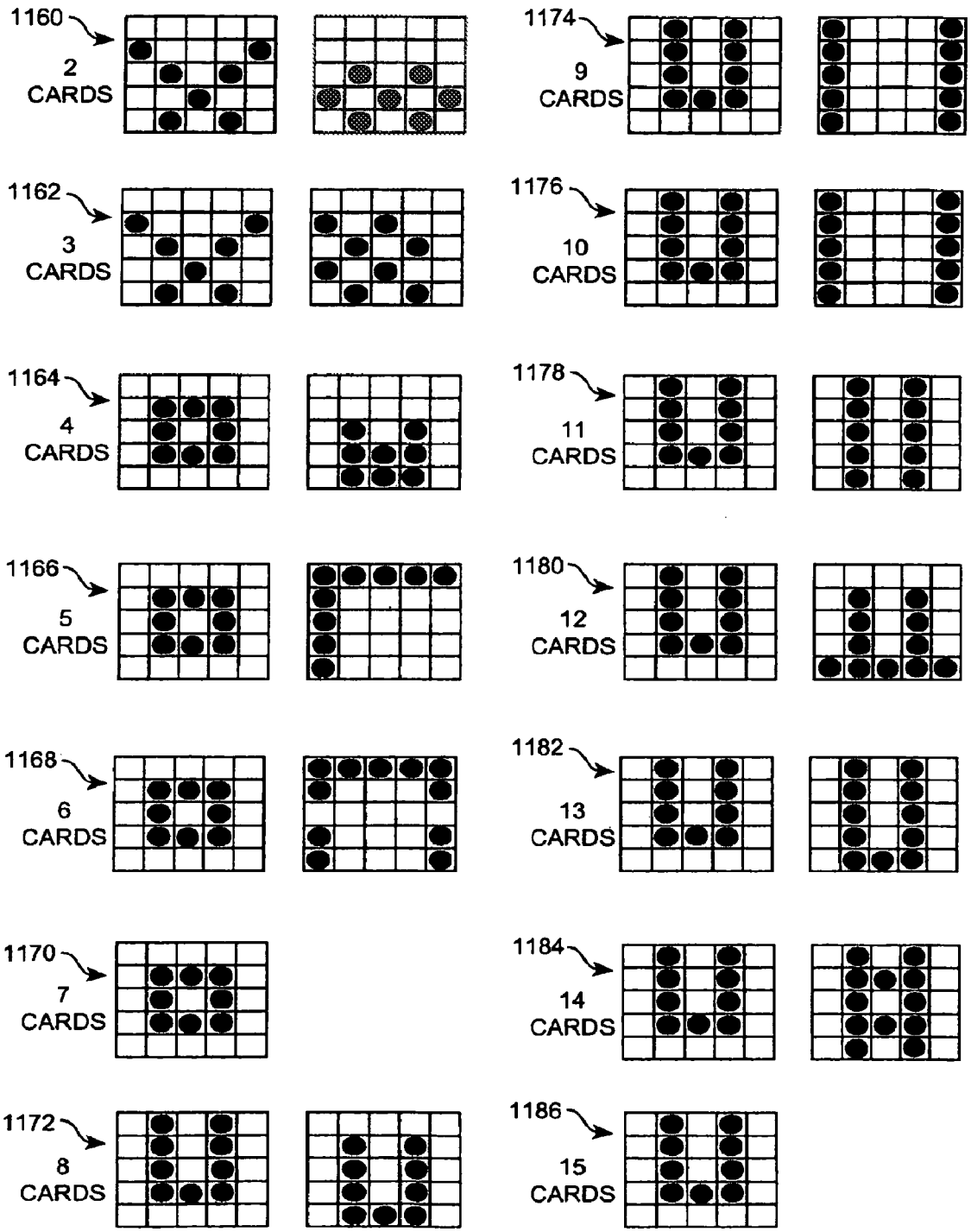
FIG. 44 is an illustration of sets of game-winning patterns for achieving uniform probability distributions for varying numbers of Bingo cards.

As illustrated in Table 4, this method may include the use of one or more patterns for a given number of Bingo cards, as well as patterns having different specified numbers of spots to be covered. Moreover, given a specified number of game-winning patterns, the number of spots per pattern and number of shared spots between the patterns for a given number of Bingo cards, a plurality of pattern combinations fitting the criteria may be available for use in a given occurrence of the Bingo game. FIG. 44 illustrates one example of game-winning pattern sets 1160-1186 that may be generated by the network computer 22 satisfying the parameters of Table 4. It will be readily apparent to those skilled in the art that many other game-winning pattern sets may be generated that satisfy the parameters of Table 4. However, for a given number of Bingo cards, each pattern set generated satisfying the designated parameters, such as the parameters of Table 4, will result in the same distribution of the number of balls to Bingo.

Figure 45:
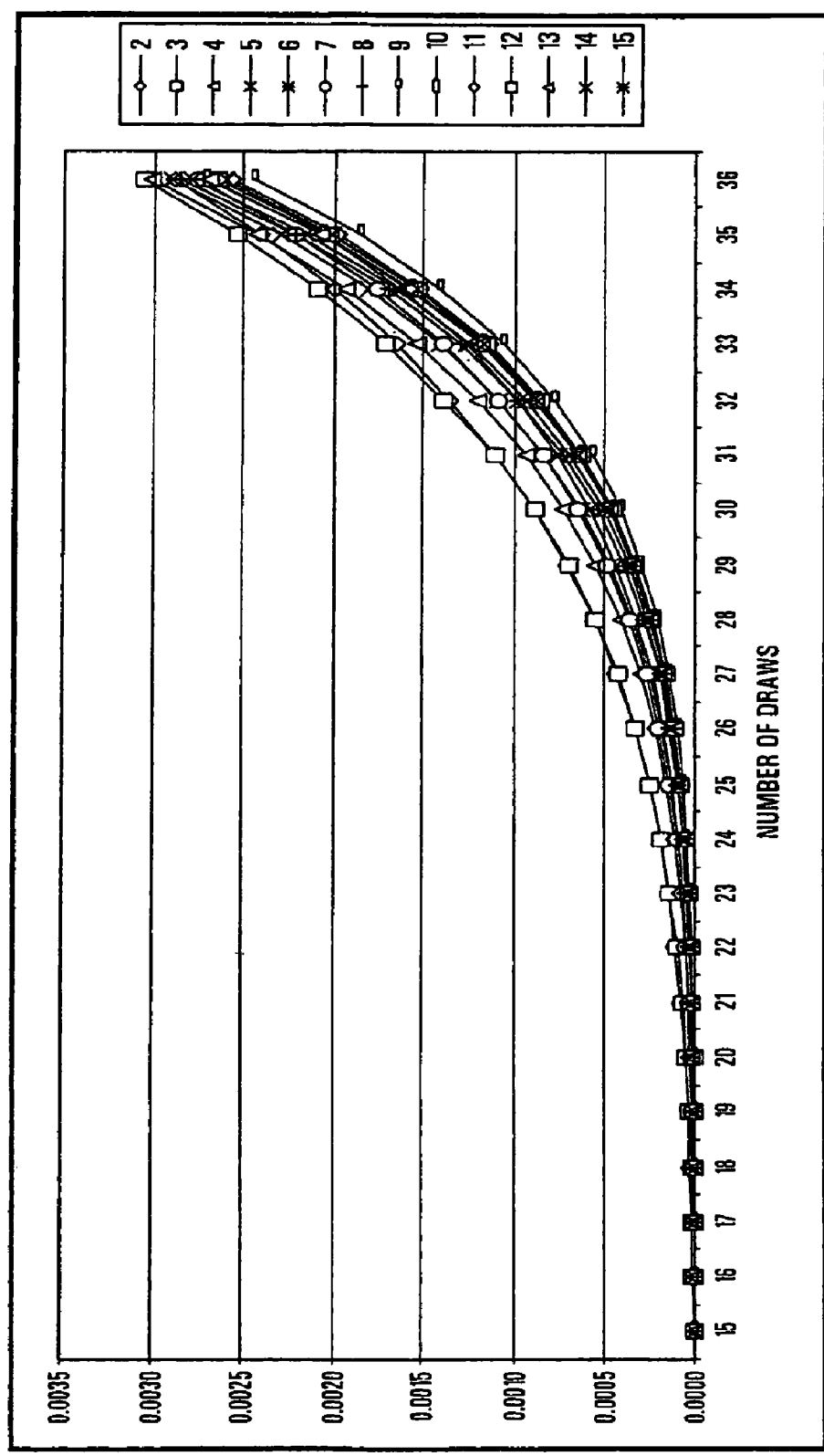
FIGS. 45 and 46 are charts of the probability distributions of balls drawn to match the game-winning patterns of FIG. 44.
Figure 46:
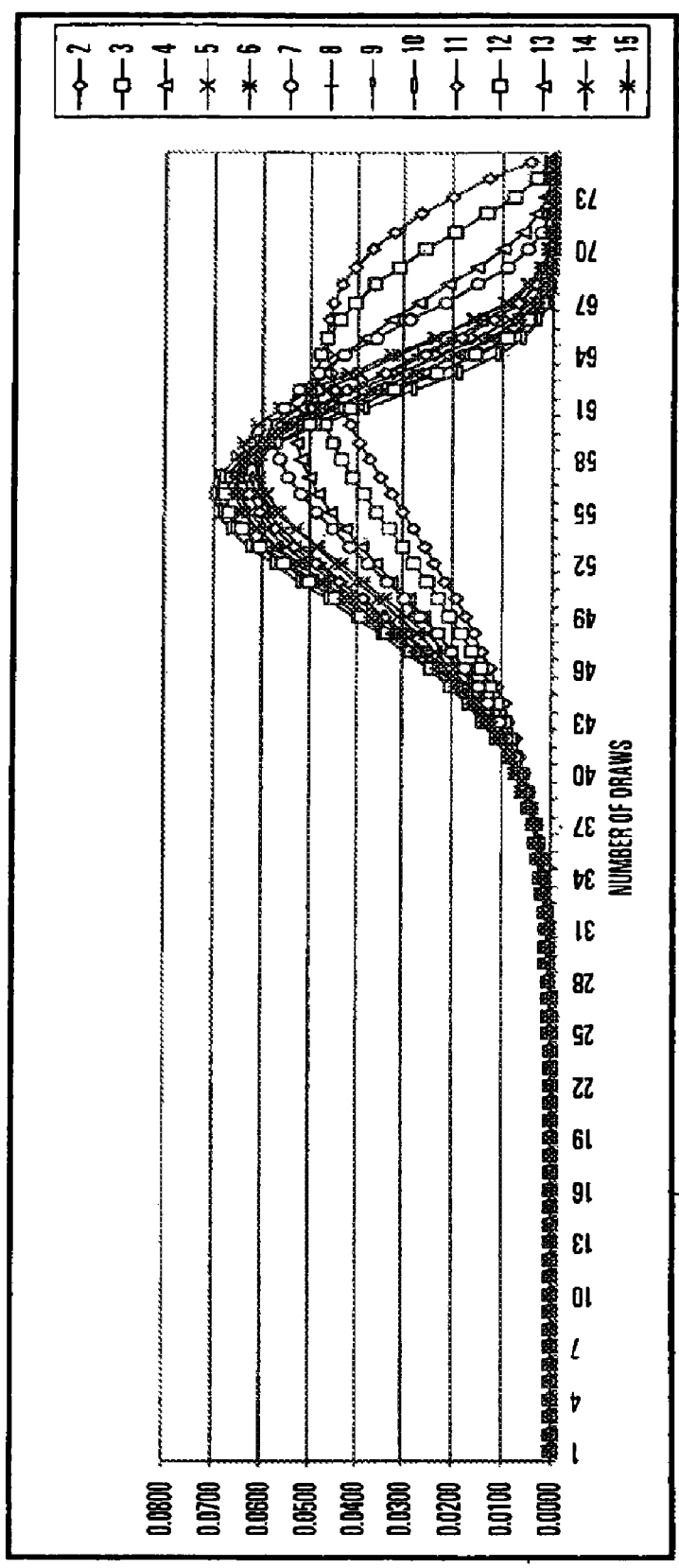

As can be seen in chart 1188 of FIG. 45 and the chart 1190 of FIG. 46, the probability distributions for the number of balls to Bingo for each of the number of Bingo cards listed in Table 4 using game-winning patterns conforming to the parameters specified in Table 4 is essentially uniform for game-winning patterns being matched in less than thirty-five balls. Because the probability distributions for matching game-winning patterns in fewer than thirty-five numbers is uniform, the payout rate for the interim pattern wins should be approximately the same regardless of the number of Bingo cards being played in the Bingo game.

The network computer 22 may be configured to select any one of a plurality of available combinations of game-winning patterns fitting the criteria for the number of enrolled Bingo cards, such as by executing an algorithm for randomly determining a set of patterns satisfying the criteria, randomly or sequentially selecting pattern sets from a stored pool of predetermined patterns satisfying the criteria, of any other method for selecting a set of patterns matching the criteria for the corresponding number of players. Moreover, it is contemplated that the locations of the spots in the game-winning patterns may also be selected, either during the Bingo game or when the game-winning pattern sets are determined prior to the Bingo game, so that any interaction of the game-winning patterns and the interim win patterns may not significantly alter the interim pattern award payout rate.

While the illustrated example relates to achieving a uniform distribution below thirty-five numbers, those skilled in the art will understand that the parameters may be varied to achieve uniform probability distributions for predetermined maximum numbers of balls greater than or less than thirty-five. Moreover, a similar methodology may be used to manipulate the probability distributions in other ways, such as to achieve a uniform average number of balls to Bingo regardless of the number of Bingo cards being played. In another embodiment, the game-winning patterns may be selected based on the number of Bingo cards enrolled in the game such that the average number of balls drawn to match the game-winning pattern or patterns is approximately equal regardless of the number of Bingo cards enrolled in the Bingo game. Consequently, the fewer the number of Bingo cards enrolled in the Bingo game, the simpler the game-winning pattern (i.e. fewer balls to be matched), and the greater the number of Bingo cards, the more complex the game-winning pattern (i.e. more balls to be matched). As with varying the game-winning patterns to match a desired distribution of balls to Bingo less than or equal to the maximum number of balls used to determine interim pattern awards, the game-winning patterns may varied in terms of the number of balls or symbols in the pattern, the number of game-winning patterns used for a given number of Bingo cards, the number of spots shared between multiple game-winning patterns, and the like as may be necessary to achieve the desired distribution of the number of balls to Bingo.

Multi-Player Bingo with Progressive Jackpots

As previously discussed, the multi-player Bingo game may be implemented with an additional progressive jackpot that may be fully or partially awarded to a player based on the player matching a predetermined pattern on the player's Bingo card, perhaps within a predetermined maximum number of drawn numbers. In current implementations, progressive jackpots may be funded by diverting a portion of each player's wager on the base wagering game, such as 2% of each wager, to the progressive jackpot pool. Moreover, in some implementations, only player's making the maximum wager on an occurrence of the base wagering game may be eligible to win the progressive jackpot, while all wagers on the base wagering game, including wagers that do not qualify for the player to be eligible to win the progressive jackpot, have a portion diverted to the progressive jackpot pool. However, it may be desirable to fund a progressive jackpot pool using only the wagers of the players qualifying or electing to have an opportunity to win the progressive jackpot.

Figure 47:
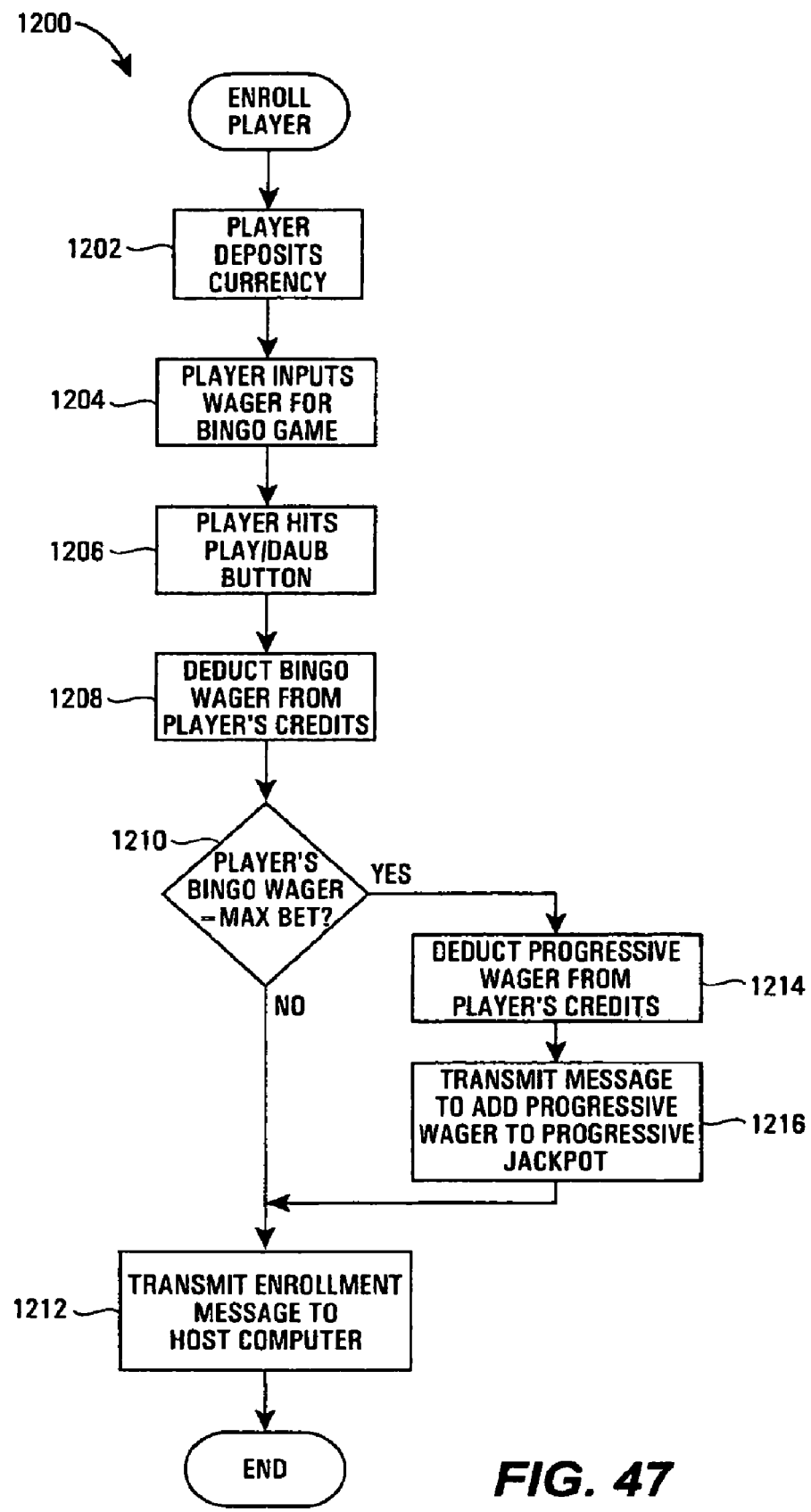
FIG. 47 is a flowchart of an embodiment of an enrollment routine for a multi-player Bingo game having optional progressive jackpot wagering.

FIG. 47 is a flowchart of a player enrollment routine 1200 for a multi-player Bingo game wherein a wager or fee for an opportunity to win a progressive jackpot may be automatically deducted from a player's credits when the player wagers at least a minimum wager amount on the occurrence of the Bingo game. The player enrollment routine 1200 may begin at a block 1202 wherein a player may deposit a medium of currency in a currency-accepting mechanism of one of the gaming units 20, such as the coin acceptor 52, bill acceptor 54, ticket reader 56, card reader 58 or other mechanism for receiving currency or other media having or representing value that may be converted into credits for playing a wagering game such as the multi-player Bingo game. When the currency-accepting mechanism detects the deposit of the medium of currency therein, the controller 100 may, in response to the detection of the medium of currency at the currency-accepting mechanism, convert the medium of currency into a corresponding amount of credits available for the player to wager on the gaming unit 20, store the amount of available credit at the memory 102, and display the amount of available credit to the player, such as at one or both of the displays 68, 70. It should be noted that if the player previously deposited currency in the gaming unit 20 and has credits remaining after wagering on one or more occurrences of the multi-player Bingo game, the player enrollment routine 1200 may proceed without the need for the player to deposit additional currency at block 1202.

Once currency is deposited by the player in the gaming unit 20 and converted into credits for playing the multi-player Bingo game, control may pass to a block 1204 wherein the player may input a wager for the occurrence of the Bingo game at the control panel 66 or other input device of the gaming unit 20. The player may be given the opportunity to wager varying amounts of credits on an occurrence of the Bingo game. For example, the player may be permitted to wager any amount of credits from a minimum of one credit to a predetermined maximum number of credits. As discussed above, the amount of credits wagered on an occurrence of the Bingo game may correspondingly impact the player's probability of winning and/or the amount of any prize awarded to the player during the Bingo game. Consequently, a player wagering twice the number of credits as another player be twice as likely to win the Bingo, and/or may receive double the prize amount for winning the occurrence of the Bingo game.

Moreover, depending on the implementation of the Bingo game and an associated alternative outcome display to which the Bingo game may be mapped, the interim patterns available for the player to match in order to win interim pattern awards may vary based on the amount wagered on the occurrence of the Bingo game. For example, for the slot reels display 450 illustrated in FIGS. 37-39 and discussed in the accompanying text, the associated slots pay table may be mapped to interim patterns as previously discussed such that a first set of interim patterns may correspond to the award amounts that may be won by wagering on payline 1, a second set of interim patterns may correspond to the award amounts that maybe won by wagering on paylines 1 and 2, and so on. When wagering on an occurrence of the Bingo game, the player may wager one credit to be eligible to receive awards for matching the interim patterns associated the payline 1 award amounts, wager two credits to be eligible to receive the awards for matching the interim patterns associated with the payline 1 and 2 award amounts, and so on up to wagering nine credits to be eligible to receive the awards for matching the interim patterns associated with the payline 1 through 9 award amounts. Additionally, the player may be able to wager varying amounts per payline, which may, based on the interim pattern mapping, may also be deterministic of the set of interim patterns that the player may be eligible to match. Consequently, if the Bingo game is configured to allow the player to wager from one to five credits per line, and the alternative outcome display includes nine paylines, then the player may wager from one credit (one payline and one credit per payline) to forty-five credits (nine paylines and five credits per payline) to be eligible to match one of up to forty-five sets of interim patterns corresponding to interim pattern awards.

Those skilled in the art will understand that both the maximum number of credits that may be wagered on an occurrence of a Bingo game and the value of a credit may be varied as desired to implement a desired betting amount and payout for a given implementation of the Bingo game. In the above example, the value of a credit may be equal to $0.01 resulting in a minimum wager of $0.01 and a maximum wager (45 credits) of $0.45 or, if a higher limit game is desired, the value of a credit may be equal to $0.50 resulting in a minimum wager of $0.50 and a maximum wager of $22.50 for an occurrence of the Bingo game. In alternative implementations of the Bingo game, the value of a credit may be varied to any desired amount and the maximum number of credits that may be wagered may be varied to achieve any desired betting and payout structure.

The player may be provided with the opportunity to change the wager for the occurrence of the Bingo game up until the time that the player confirms entry into the next occurrence of the Bingo game. After the player inputs the desired wager amount, the player may confirm entry in the next occurrence of the Bingo game by pressing the "Play/Daub" button 82 or otherwise confirming entry at block 1206. Once the player confirms entry in the game, the player's wager on the next occurrence of the Bingo game may not be altered by the player. After the "Play/Daub" button 82 is pressed, control may pass to block 1208 wherein the amount of credits wagered by the player may be deducted from the amount of available credits for the player stored at memory 102 of the gaming unit 20. The controller 100 may update the amount of available credits in memory 102, and may cause the displays 68, 70 to update the display of the player's credits to reflect the updated amount of available credit. Additionally, the controller 100 may transmit a message reflecting the player's wager to network computer 22 or other host computer of the Bingo gaming system 10 responsible for tracking wagering on the Bingo game and for maintaining any winner prize pool associated with the Bingo game.

As previously discussed, in the embodiment illustrated in the routine of FIG. 47, the player may have an opportunity to win a progressive jackpot when the player wagers at least a minimum wager amount on an occurrence of the Bingo game. The minimum wager amount may be any predetermined amount of credits required to be wagered in order to qualify to win the progressive jackpot, and may be the maximum bet allowed for the Bingo game at the gaming unit 20. Moreover, the Bingo game system 10 may be configured such that the minimum wager amount may be changed either automatically or manually to any desired amount, and may be applied uniformly at all gaming units 20, or may be set to desired amounts at individual gaming units 20 or groups of gaming units 20. At block 1210, if the player wagers less than the minimum wager amount for entry in the progressive jackpot, control may pass to a block 1212 wherein the game unit 20 may transmit an enrollment message to the host computer 22 indicating that the player has enrolled in the next occurrence of the Bingo game.

If the player wagers at least the minimum wager amount for entry in the progressive jackpot, control may pass to a block 1214 wherein a progressive jackpot wager or fee for the player may be deducted from the amount of available credits for the player stored at memory 102 of the gaming unit 20. The controller 100 may update the amount of available credits in memory 102, and may cause the displays 68, 70 to update the display of the player's credits to reflect the updated amount of available credit. Alternatively, the progressive jackpot wager or fee may be diverted from the credits deducted for the player's wager in order to fund the progressive jackpot pool. Depending on the implementation, the progressive jackpot wager or fee may be a fixed amount, or may be a predetermined portion or percentage of the player's wager on the occurrence of the Bingo game. Whether a fixed amount or a portion or percentage of the wager on the Bingo game, the wager or fee for the progressive jackpot may be any desired amount, and may be set at an amount to allow the progressive jackpot pool to increase at an acceptable rate while being low enough to motivate the players to make the additional wager for the chance at winning a larger progressive jackpot.

In addition to deducting the progressive jackpot wager or fee from the player's credits, control may pass to a block 1216 wherein the gaming unit 20 transmits a message to the network computer 22, or other computer at which the progressive jackpot is maintained and administered, to add the player's progressive jackpot wager or fee to the progressive jackpot pool. Upon receiving the message from the gaming unit 20, the network computer 22 or other computer may add the progressive jackpot wager or fee to the funds available for the progressive jackpot and update any displays of the current progressive jackpot displayed at gaming units or other display devices. Control may then pass to the block 1212 wherein the gaming unit 20 may transmit an enrollment message to the host computer 22 as discussed above. Once the player is enrolled, the execution of the occurrence of the Bingo game may proceed as implemented, such as by one of the routines 700, 750, 760 or 770 as previously described.

In current implementations of progressive jackpots with wagering games, a portion of each player's wager may be used to fund the progressive jackpot even where the player does not qualify to win all or a portion of the progressive jackpot. Conversely, as illustrated in the present embodiment of the routine 1200, a player's wager and/or available credits may only be used to fund the progressive jackpot where the player wagers a sufficient amount of credits to qualify for an entry to win the progressive jackpot.

Figure 48:
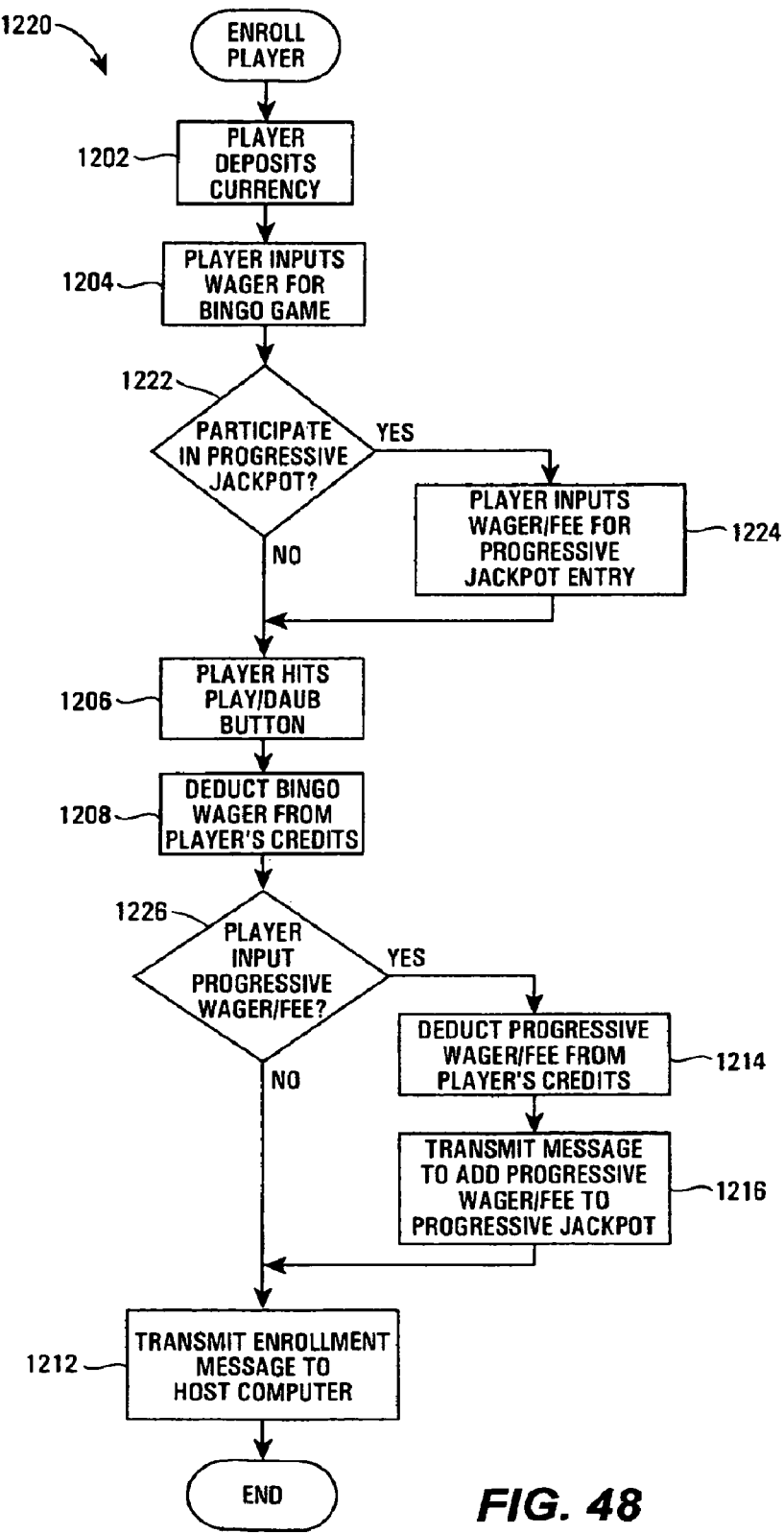
FIG. 48 is a flowchart of an alternative embodiment of an enrollment routine for a multi-player Bingo game having optional progressive jackpot wagering.

FIG. 48 is a flowchart of an alternative player enrollment routine 1220 for a multi-player Bingo game wherein the player may input a wager or fee for an opportunity to win a progressive jackpot at the time the player inputs a wager on the occurrence of the Bingo game. The player enrollment routine 1220 may begin in a similar manner as routine 1200 at block 1202 wherein the player deposits a medium of currency in a currency-accepting mechanism at the gaming unit 20, and at block 1204 wherein the player inputs a wager on an occurrence of the Bingo game. In addition to the wager on the Bingo game, the player may elect to have the opportunity to win the progressive jackpot. At block 1222, if the player has elects to participate and have the opportunity to win the progressive jackpot, control may pass to a block 1224 wherein the player may input a wager or fee for the progressive jackpot. The gaming unit 20 may provide a prompt at the displays 68, 70 to participate in the progressive jackpot, and the control panel 66 may be configured to allow the player to indicate an election to participate in the progressive jackpot, such as by entering a wager or fee amount. Alternatively, the player may be prompted to provide an affirmative response regarding progressive jackpot participation or otherwise indicating the player's desire to participate in the progressive jackpot.

If the player does not elect to participate in the progressive jackpot, or after the player inputs a wager or fee or otherwise elects to participate, control may pass to block 1206 wherein the player may hit the "Play/Daub" button 82, and to block 1208 wherein the player's wager may be deducted from the player's available credits as previously discussed. At a block 1226, if the player input a wager or fee for the progressive jackpot or otherwise indicated the election to enter the progressive jackpot, control may pass to block 1214 to deduct the progressive jackpot wager or fee from the player's available credits, and to block 1216 wherein the gaming unit 20 transmits a message to the network computer 22 or other computer administering the progressive jackpot to add the progressive jackpot wager or fee to the progressive jackpot pool as previously described. If the player does not elect to participate in the progressive jackpot, or after adjusting the player's available credit and the jackpot pool as described, control may pass to block 1212 wherein the gaming unit 20 transmits the enrollment message to the host computer 22 as discussed above. In either routine 1200 and 1220, or any other optional enrollment routine, the gaming unit 20 may be configured to display graphics relating to the progressive jackpot at the displays 68, 70 when the player is eligible to win the progressive jackpot, and may not display progressive jackpot graphics when the player is not eligible to win the progressive jackpot.

While the routines 1200 and 1220 are described as being implemented with a multi-player Bingo game as the base wagering game, those skilled in the art will understand that other base wagering games may incorporate progressive jackpots wherein the progressive jackpot pools are funded from the wagers or fees of the players who are eligible to win the progressive jackpot. Moreover, the progressive jackpots having optional wagering may be implemented at gaming networks connecting multiple casino locations, including casinos located in different gaming jurisdictions. In multi-location gaming networks, progressive jackpot wagering may be offered at some but not all of the casino locations. Casino operator may elect not to offer progressive jackpot wagering, or progressive jackpot wagering may be prohibited within particular jurisdictions. Moreover, progressive jackpot wagering may only be offered for some gaming units within a particular casino locations. In such instances, the gaming units may be configured to avoid displaying any information relating to progressive jackpot wagering, such as suppressing a progressive wagering prompt, and may not display graphics related to progressive jackpots when the outcomes of the occurrences of the wagering game are displayed. In these implementations, the gaming units, wagering game network computers and/or the progressive jackpot network computer may be configurable to disable progressive jackpot wagering at particular gaming units, network computers, casino locations or jurisdictions.

Generally, when offered in conjunction with a multi-player Bingo game, the progressive jackpot or a portion thereof may be awarded to a player matching a predetermined pattern on the Bingo card during the occurrence of the Bingo game. As previously discussed, the progressive jackpot may be awarded any time a player matches the predetermined pattern or patterns, or may be awarded when a player matches the pattern within a predetermined maximum number or after a predetermined minimum number of numbers are drawn. For example, the progressive jackpot may be awarded to a player matching the numbers in the four corners of the Bingo card with the first four drawn numbers for the occurrence of the Bingo game, while players matching the four corners after more than four drawn are numbers drawn may not win the progressive jackpot, but may still be eligible to receive an award if the four corners pattern in the game-winning pattern or an interim win pattern.

As previously discussed, the multi-player Bingo game may be implemented such that a player failing to daub to claim a game-winning pattern award or an interim pattern award may forfeit the awards. For the game-winning pattern awards, the Bingo game may continue until one of the players daubs to claim the award as discussed above. For the slept interim pattern awards, the gaming units 20 may simply indicate that the awards have been slept and not dispense the award to the player, add credit for the player, or otherwise pay off the award. Alternatively, the slept interim pattern award amounts may be used as further funding for the progressive jackpot. By adding the slept interim pattern awards to the progressive jackpot instead of retaining the awards for the gaming establishment, the multi-player Bingo game may be able to achieve the projected payout rate for the Bingo game by ultimately paying out the interim pattern win awards through the progressive jackpot, and the progressive jackpot may accumulate at a faster rate, thereby potentially increasing player participation with the anticipation of winning larger progressive jackpot awards.

Figure 49:
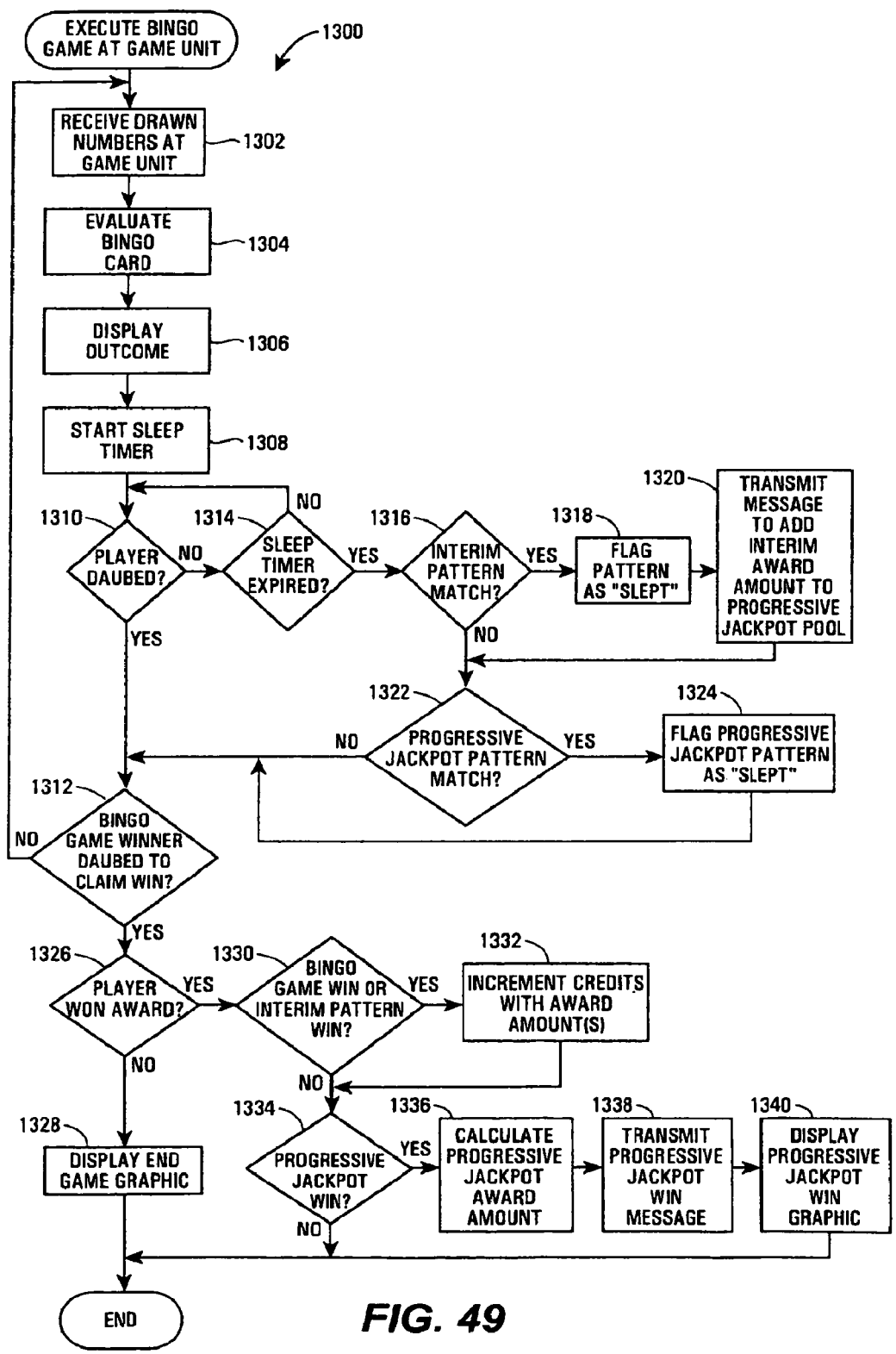
FIG. 49 is a flowchart of an embodiment of a multi-player Bingo game routine having slept awards added to a progressive jackpot.

FIG. 49 is a flowchart of a Bingo game execution routine 1300 for the gaming units 20 wherein slept interim pattern win awards may be added to the progressive jackpot pool such that the slept awards may ultimately be dispensed in progressive jackpot awards. In the illustrated embodiment, any progressive jackpot awards won by a player may be calculated and deducted from the progressive jackpot pool after the player daubs to claim the progressive jackpot award. The routine 1300 may begin at a block 1302 wherein the gaming unit 20 may receive a batch of drawn numbers for an occurrence of the Bingo game. As discussed above, depending on the implementation of the Bingo game, the batch may include a single drawn number, all the numbers in the order drawn for the occurrence of the Bingo game, or any desired subset of the numbers. After receiving the batch of numbers at the gaming unit 20, control may pass to a block 1304 wherein the gaming unit 20 evaluates the player's Bingo card by comparing the numbers in the received batch to the numbers on the Bingo card, and determining whether any predetermined game-winning patterns, interim patterns or progressive jackpot patterns are matched on the Bingo card.

After the gaming unit 20 evaluates the Bingo card, control may pass to a block 1306 wherein the gaming unit 20 may display the outcome of the ball draw for the Bingo game at the display unit 68 as previously discussed and illustrated, and to a block 1308 wherein a sleep timer may be started to provide the player with a period of time in which to daub and claim any award for the occurrence of the Bingo game. At a block 1310, if the player daubs before the sleep timer expires, control may pass to block 1312 to determine whether a player or players matching the game-winning pattern have daubed to claim the game-winning pattern award for the occurrence of the Bingo game. If the player has not yet daubed their Bingo card, control may pass to a block 1314 to determine whether the sleep timer expired without the player daubing. If the sleep timer has not expired, control may pass back to the block 1310 to continue waiting for the player to daub. If the sleep timer has expired without the player daubing, the gaming unit 20 may determine whether the player slept any interim pattern awards or progressive jackpot awards.

If the gaming unit determines that the player matched and slept through an interim pattern award at block 1316, control may pass to a block 1318 wherein the gaming unit 20 may flag or otherwise indicate that the interim pattern matched by the player has been slept and, consequently, may not be awarded to the player. The indicator may be in the form of a flag or code stored in the memory 102 of the gaming unit 20 that may be updated to a value signifying that the player may not receive the award amount associated with the interim pattern. The interim patterns flagged as being slept by the player may vary based on the implementation of the multi-player Bingo game. In implementations where a player is paid an award for each matched interim pattern, each of the patterns matched with the numbers drawn up to the current batch may be flagged as slept. However, the player may still receive interim pattern awards for patterns matched when preceding batches of numbers were received and correspondingly daubed by the player. For example, a first interim pattern may be matched on the player's Bingo card after a first batch of numbers is received, and a second interim pattern may be matched after a second batch of numbers is received. If the player daubed within the sleep time limit after the first batch was received, but failed to daub within the sleep time limit after the second batch was received, the second interim pattern award that went unclaimed due to the player's failure to daub may be flagged as having been slept, while the previously-claimed first interim pattern award may still be awarded to the player. In implementations where a player is paid only the highest interim pattern award matched on the Bingo card, the gaming unit 20 may only flag the highest value interim pattern as slept. As with the above example, the player may still receive any previously-claimed interim pattern awards. Where the player matches lower value interim patterns within the same batch of balls, the player may still be allowed to claim the lower value interim pattern awards if a subsequent batch of numbers are received (i.e., no player has yet matched the game-winning pattern and daub to claim the win) and the player daubs within the sleep time limit. In either implementation, the player may still be eligible to claim interim patterns newly matched when subsequent batches of numbers are received at the gaming unit 20.

In addition to flagging the interim pattern(s) as slept, at a block 1320, the gaming unit 20 may transmit a message to the network computer 22 or other network computer administering the progressive jackpot to add the value of the slept interim pattern award amount(s) to the progressive jackpot pool. Depending on the implementation of the multi-player Bingo game, the gaming unit 20 may transmit a separate message for each slept interim pattern with the corresponding award amount, or may transmit a single message including the total of the award amounts for the slept interim patterns. When the message is received at the network computer 22 or other computer, the award amount may be added to the progressive jackpot pool and awarded to a subsequent winner or winners of the progressive jackpot.

In addition to determining whether any interim patterns were slept and, if so, adding the corresponding award amounts to the progressive jackpot pool, at a block 1322, the gaming unit 20 may determine whether a progressive jackpot pattern was matched and, consequently, slept by the player. If the player matched the progressive jackpot pattern and would have won a progressive jackpot award, control may pass to a block 1324 wherein the gaming unit 20 may flag or otherwise indicate that the progressive jackpot pattern matched by the player has been slept and, consequently, the corresponding progressive jackpot prize may not be awarded to the player. The indicator may be in the form of a flag or code stored in the memory 102 of the gaming unit 20 that may be updated to a value signifying that the player may not receive the award amount associated with the progressive jackpot. In the illustrated embodiment, the award associated with the progressive jackpot may not be calculated until the player daubs to claim the progressive jackpot award. Consequently, after determining whether the player slept a progressive jackpot award and, if so, indicating that the progressive jackpot may not be awarded to the player for the present occurrence of the Bingo game, control may pass to the block 1312 to determine whether a player or players matching the game-winning pattern have daubed to claim the game-winning pattern award for the occurrence of the Bingo game.

If the player or players matching the game-winning pattern have slept their win, control may pass back to the block 1302 wherein the gaming unit 20 may receive an additional batch of drawn numbers and continue the occurrence of the Bingo game. If one or more players daub to claim their Bingo win, control may pass to a block 1326 wherein the gaming unit 20 may determine whether to display and/or dispense any award won by the player during the occurrence of the Bingo game. If the player does not win any award for the occurrence of the Bingo game, control may pass to a block 1328 wherein the gaming unit 20 may display an end game graphic at the displays 68, 70. If the player has won a game-winning, interim pattern and/or a progressive jackpot award, control may pass to a block 1330 wherein the gaming unit 20 determines whether player should receive credits for a Bingo game win award and/or an interim pattern award. If the player should receive credits for one or more of these awards, control passes to a block 1332 wherein the gaming unit 20 may increase the player's available credits by adding the amount of credits corresponding to the Bingo game win and/or the interim pattern awards. The gaming unit 20 may update the amount of available credit stored at the memory 102, and redisplay the updated amount of available credit to the player, such as at one or both of the displays 68, 70.

In addition to evaluating any Bingo game win and interim pattern awards, at a block 1334, the gaming unit 20 may determine whether the player should receive a progressive jackpot award. If the player has won a progressive jackpot award for the occurrence of the Bingo game, control may pass to a block 1336 wherein the gaming unit 20 and/or the network computer administering the progressive jackpot may calculate a progressive jackpot award amount for the player, and a block 1338 wherein the award amount may be deducted from the progressive jackpot pool. Depending on the implementation of the Bingo game, the calculation of the progressive jackpot award may occur at either the gaming unit 20 or the computer administering the progressive jackpot, or the processing of the progressive jackpot win may be divided between the two components. For example, the gaming unit 20 may receive from the progressive jackpot network computer and/or store the information necessary to calculate the progressive jackpot award. When the gaming unit determines that a player has won and daubed to claim the progressive jackpot, the gaming unit 20 may use the information to calculate the progressive jackpot award amount and transmit a message to the progressive jackpot network computer with the information necessary for the progressive jackpot network computer to deduct the award amount from the progressive jackpot pool. Alternatively, the progressive jackpot network computer may calculate the award amount. The gaming unit 20 may transmit a message containing information necessary for the administrating computer to calculate the award amount, such as the amount wagered by the player, the pattern matched by the player, and the like. Upon receiving the message, the progressive jackpot network computer may calculate the award amount based on information in the message and stored at the progressive jackpot network computer, deduct the award amount from the progressive jackpot pool, and transmit a response message to the gaming unit 20 containing the progressive jackpot award amount. Those skilled in the art will understand that the calculation of the progressive jackpot award amount may be performed at any other desired component or components of the Bingo gaming system 10 and in any desired manner based on the particular implementation of the Bingo gaming system 10.

Once the progressive jackpot award amount is calculated and communicated to the gaming unit 20, control may pass to a block 1340 wherein a progressive jackpot win graphic may be displayed to the player at the gaming unit 20, such as at the displays 68, 70. The graphic may include the progressive jackpot award amount and other displays to signify the awarding of a substantial jackpot award. The gaming unit 20 may also be programmed to activate other output devices to draw attention to the progressive jackpot-winning gaming unit 20, such as generating music or sounds at the speakers 62, illuminating lights at the bezel 84, topper 90 and candle 92, and the like. In addition to drawing attention to the gaming unit 20 through graphics, illuminations and sound, the gaming unit 20 may also transmit a message to inform the casino operators of the awarding of the progressive jackpot award.

During the course of an occurrence of the Bingo game, a player may match more than one interim pattern with patterns on the player's Bingo card. In one implementation where slept interim awards are forfeited, the player may be deemed to have daubed and claimed any interim patterns matched by a batch of numbers when the player daubs within the time limit, and to have slept any interim patterns matched by the batch if player fails to daub. As previously discussed, the resultant interim pattern award for the player may be either the total of award amounts corresponding to the claimed interim patterns, or the highest award amount corresponding to any claimed pattern. In instances where a player has slept an interim pattern award and has slept an interim pattern award, in order to more closely achieve the projected payout rate for the Bingo game, it may be desired to add the amount that a player lost by sleeping the interim pattern award to the progressive jackpot pool. Consequently, in one embodiment, the difference between the slept interim pattern award and the claimed interim pattern award may be added to the progressive jackpot pool if the slept interim pattern award was greater than the claimed interim pattern award.

In one scenario, a player may match a first interim pattern when a first batch of numbers is received at the gaming unit and match a second interim pattern when a second batch of numbers is received. If the player successfully daubs within the sleep time period associated with the first batch of numbers, the player may be guaranteed to receive at least the award amount associated with the claimed first interim pattern. When the second batch of numbers is received, if the player fails to daub within the sleep time period associated with the second batch, and consequently slept the second interim pattern, the player may still be entitled to receive the first interim pattern award. At the conclusion of the occurrence of the Bingo game, the player may receive a payout for the first interim pattern award amount that was successfully claimed. If the award amount for the second interim pattern award was greater than the award amount for the first interim pattern award, the player's failure to claim the second interim pattern award resulted in a net loss of the difference between the award amounts. In this case, the gaming unit 20 may transmit a message to the progressive jackpot network computer to add the difference between the award amounts to the progressive jackpot pool. If the slept award amount is less than the claimed award amount, the player is in no worse position than if the player had claimed the second interim pattern award and, consequently, no amount may be required to be added to the progressive jackpot pool to compensate for the player's failure to claim the second interim pattern award.

In a further scenario, a player may match the first and the second interim patterns on the same batch of numbers. As in the above example, a player may receive the highest award amount where multiple interim patterns are matched and claimed. Moreover, the player may only be considered to be eligible to claim the interim pattern having the highest award amount when multiple interim patterns are matched on the same batch of numbers. Still further, where a player matches multiple interim patterns matched on a batch of balls and sleeps the interim pattern having the highest award amount, the player may be eligible to claim the interim pattern having the next highest award amount when the next batch of balls is received at the gaming unit 20.

Consequently, when the player matches the first and the second interim patterns on the first batch of numbers, if the player fails to daub within the associated sleep time period, the player may have slept the interim pattern having the greater award amount, but may not have claimed the other interim pattern. If the occurrence of the Bingo game concludes on that batch of numbers, the player may receive no interim pattern award, and the gaming unit 20 may transmit a message to the progressive jackpot network computer to add the slept award amount to the progressive jackpot pool. If a subsequent batch of numbers is received at the gaming unit 20, the player may claim the other matched interim pattern and corresponding lower award amount during the associated sleep time period. At the conclusion of the occurrence of the Bingo game, the gaming unit 20 may award the lower award amount to the player, and may transmit a message to the progressive jackpot network computer to add the difference between the slept higher award amount and the claimed lower award amount to the progressive jackpot pool. In configuring the gaming units 20 to conduct the Bingo game in this manner, it may be necessary to modify a routine, such as routine 1300, to transmit messages to the progressive jackpot network computer to add slept award amounts to the progressive jackpot pool until the conclusion of the occurrence of the Bingo game after a player has daubed to claim a game-winning pattern.

Figure 50:
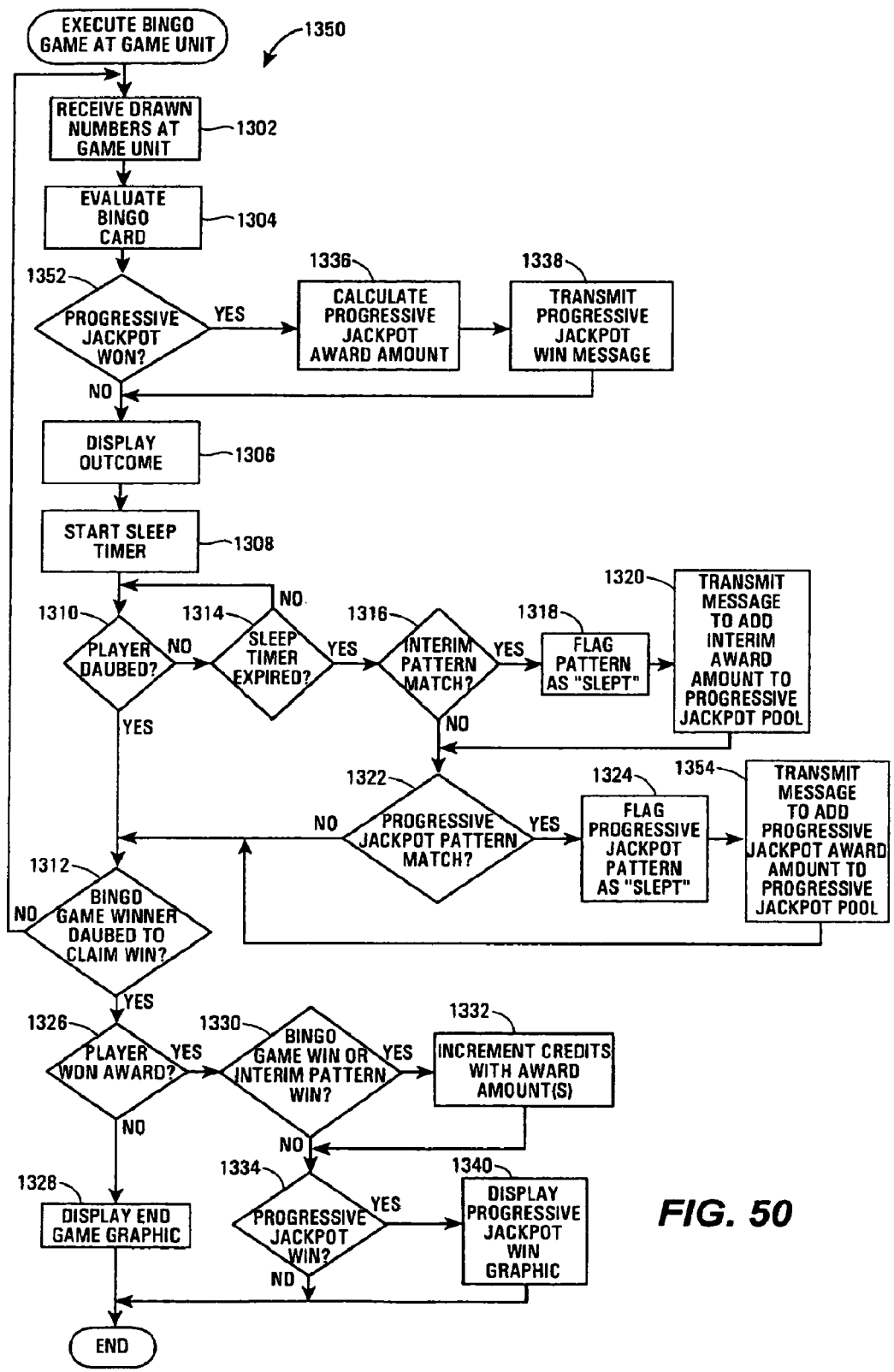
FIG. 50 is a flowchart of an alternative embodiment of a multi-player Bingo game routine having slept awards added to a progressive jackpot.

In the embodiment detailed above, the progressive jackpot award amount may be calculated only after the player daubs to claim the progressive jackpot award. By waiting until the progressive jackpot is claimed, the progressive jackpot pool may be updated only after confirming that the progressive jackpot award will be played out to the player. In other implementations, it may be desired to calculate and display the actual progressive jackpot award amount to the player after evaluating the card and prior to the player daubing to provide the player with the award that the player stands to win, and to update the progressive jackpot pool to reflect the current progressive jackpot available for other players. FIG. 50 illustrates an alternative embodiment of a flowchart of a Bingo game execution routine 1350 for the gaming units 20 wherein the progressive jackpot award amount is calculated prior to the player daubing to claim a progressive jackpot win whereby the progressive jackpot awards, in addition to slept interim pattern win awards, may be added back to the progressive jackpot pool and made available to the players to be awarded in subsequent progressive jackpot awards.

The routine 1350 may follow the same general flow as the routine 1300 illustrated in FIG. 49 and discussed above. In the routine 1350, after the gaming unit 20 evaluates the Bingo card at block 1304, and before displaying the outcome at block 1306, control may pass a block 1352 to determine whether the player has won a progressive jackpot. If the player did not win the progressive jackpot, control may pass to block 1306 to display the outcome. If the player won the progressive jackpot, control may pass to block 1336 to calculate the progressive jackpot award amount and to block 1338 to transmit the message to the administering computer that the player has won the progressive jackpot in a similar manner as described above. At this time, the progressive jackpot award amount may be available to the player upon successfully daubing within the sleep time period, while the progressive jackpot pool is reduced to reflect the jackpot amount available to other players. If the player daubs within the sleep time period, the routine 1350 proceeds generally as described above, with the previously-calculated progressive jackpot award amount being displayed to the player at the gaming unit 20 at block 1340. If the player fails to daub and claim the progressive jackpot award, after the gaming unit 20 determines that the player slept the progressive jackpot award, control may pass to a block 1354 wherein the gaming unit 20 may transmit a message to the administering computer indicating that the player slept the progressive jackpot award and to add the calculated progressive jackpot award amount back into the progressive jackpot pool. Because the progressive jackpot award amount was not actually paid out to the player, the award may still be available for other players to win. Upon receiving the message, the administering computer may add the award amount to the progressive jackpot pool and redisplay the updated progressive jackpot amount.

In the simplest implementation of a progressive jackpot in connection with a Bingo game or other wagering game, a player may receive the entire progressive jackpot pool as an award, and the progressive jackpot pool may be reduced to zero or to a minimum seed amount sufficient to encourage players to wager on the progressive jackpot. However, as an incentive to players to increase the amount wagered on the underlying wagering game, it may be desired to determine and pay out a prorated portion of the progressive jackpot pool based on the amount wagered by the player on the occurrence of the Bingo game versus the maximum amount that could have been wagered. Players may be encourage to wager more on each occurrence of the wagering game if they stand to receive a larger share of the progressive jackpot pool. In one embodiment, the prorated award amount may be calculated by determining the ratio of the player's wager to the maximum wager that may be made by a player, and multiplying the progressive jackpot pool amount by the ratio. For example, if the player wagers $1.00 on an occurrence of the wagering game, and the maximum amount that may be wagered is $2.00, the ratio of the player wager to the maximum wager is 0.5, or 50%, and the player may be entitled 50% of the pool for winning the progressive jackpot. The actual calculation may vary based on the underlying wagering game or games with which the progressive jackpot is associated.

In one type of implementation, the progressive jackpot may be offered with a single wagering game played on multiple machines each having the same wagering structure. As one example, the progressive jackpot may be offered in conjunction with a Bingo game as previously described having an alternate outcome display of a slot machine with five reels each having three visible reel symbols, and allowing a player to wager from one to forty-five credits on each occurrence of the Bingo game. Each credit may be worth $0.01 so that each player may wager from a minimum of $0.01 to a maximum of $0.45 on each occurrence of the Bingo game. For such a system, the prorated progressive jackpot award may be calculated according to the following formula:

$$Award_{prorated} = Pool_{prog} \times \frac{wager_{player}}{wager_{max}} \quad (1)$$

Where:
Award$_{prorated}$=prorated progressive jackpot award
Pool$_{prog}$=progressive jackpot pool amount
wager$_{player}$=player's wager on occurrence of the game
wager$_{max}$=maximum wager for wagering game In the current example, wager$_{max}$ is equal to the $0.45 maximum wager for an occurrence of the Bingo game on any of the gaming units 20. Applying the formula, if the progressive jackpot pool amount is currently $9,000,000, a player wagering one credit ($0.01) on an occurrence of the Bingo game may receive a prorated award of 1/45 of the progressive jackpot pool ($200,000), while a player wagering fifteen credits ($0.15) may receive a prorated award of 1/3 of the progressive jackpot pool ($3,000,000), and a player making a maximum bet may receive the entire $9,000,000 progressive jackpot.

In other implementations, the progressive jackpot may be offered with wagering games having different wagering structures. In one example, the Bingo gaming system 10 having gaming units 20 with $0.01 Bingo games as described in the preceding example may further include gaming units 30 with $1.00 Bingo games wherein a player may wager from one to fifteen credits, with each credit being worth $1.00 resulting in a wagering range of from $1.00 to $15.00 on an occurrence of the Bingo game. For systems having wagering games with multiple wagering structures, the prorated progressive jackpot award may be calculated according to the following formula:

$$Award_{prorated} = Pool_{prog} \times \frac{wager_{player}}{wager_{system\,max}} \quad (2)$$

Where:
Award$_{prorated}$=prorated progressive jackpot award
Pool$_{prog}$=progressive jackpot pool amount
wager$_{player}$=player's wager on occurrence of the game
wager$_{system\,max}$=maximum wager for available on the system The wager$_{system\,max}$ is equal to the largest wager that may be made on a wagering game associated with the progressive jackpot. In the present example, wager$_{system\,max}$ may be a $15.00 wager on the $1.00 Bingo game. Consequently, for the same $9,000,000 progressive jackpot pool, a player wagering fifteen credits on an occurrence of the $0.01 Bingo game ($0.15) may receive a prorated award of 1/100 (0.15/15) of the progressive jackpot pool ($90,000), while a player wagering one credit on an occurrence of the $1.00 Bingo game ($1.00) may receive a prorated award of 1/15 of the progressive jackpot pool ($600,000). Moreover, a player making a maximum bet on the $0.01 Bingo game ($0.45) may receive $270,000 as a prorated progressive jackpot award, while a player making a maximum bet on the $1.00 Bingo game ($1.00) may receive the entire $9,000,000 progressive jackpot.

The prorated progressive jackpot award may be calculated in a system having multiple wagering structures using the following alternative formula:

$$Award_{prorated} = Pool_{prog} \times \frac{denom_{game}}{denom_{system\,max}} \times \frac{credits_{player}}{credits_{system\,max}} \quad (3)$$

Where:
Award$_{prorated}$=prorated progressive jackpot award
Pool$_{prog}$=progressive jackpot pool amount
denom$_{game}$=denomination of the wagering game
credits$_{player}$=credits wagered on occurrence of the game
denom$_{system\,max}$=maximum denomination available on the system
credits$_{system\,max}$=maximum credits to wager on the system As distinct from Formula (2), Formula (3) addresses the maximum denomination and the maximum credits to be wagered on the system separately in determining the prorated progressive jackpot award. Consequently in the above example, denom$_{system\,max}$ may be equal to the $1.00/credit denomination of the $1.00 Bingo game, and credits$_{system\,max}$ may be equal to the forty-five credits of the $0.01 Bingo game. Applying Formula (3), the four players in the immediately preceding example may win prorated progressive jackpot awards of $30,000, $200,000, $90,000 and $3,000,000, respectively.

Those skilled in the art will understand that prorated progressive jackpot awards as discussed herein may be implemented with combinations of wagering games having varying wagering structures with which progressive jackpots may be associated in addition to Bingo games as described herein, such as mechanical and video slot machines, video poker games, video blackjack games, video keno games, and in gaming networks having varying combinations of wagering games. Moreover, the prorated awards may be implemented with progressive jackpots associated with gaming networks wherein networked gaming machines may be disposed in multiple gaming locations, such as wide area progressive networks. In a given implementation, an appropriate one of the formulas (1)-(3), or other formula relating the actual wagers of the players to the wagering structures available in the gaming network, may be used to calculate prorated progressive jackpot awards in order to achieve desired payout rates and award levels for the players wagering on the wagering games with which the progressive jackpot may be associated.

Progressive Jackpots with Main Pools and Reserve Pools

In many progressive jackpot implementations, a progressive jackpot pool may be accumulated by adding a percentage or fixed amount of each player's wager to the progressive jackpot pool, and may be paid out entirely or down to a predetermined minimum seed amount when a player wins the progressive jackpot. These progressive jackpots may go from an extremely large progressive jackpot payout to a relatively meager progressive jackpot pool offering the players minimal incentive to play the associated wagering games and wager sufficient amounts on the occurrences of the wagering games to qualify to win the next progressive jackpot. Consequently, the progressive jackpot pool may increase at a relatively slow rate until reaching amounts sufficient to induce players to play the wagering games.

In alternative implementations, a progressive jackpot pool may be subdivided into a main pool from which progressive jackpot awards may be paid, and a reserve pool that may be used to replenish the main pool after an award is paid out to a winning player. As the wagering games are played by the players, a percentage of each player's wager, or a fixed amount of the wager or other fee as described above, may be separated from the wager and added to the progressive jackpot pool. In current implementations, the money diverted from the wagers may be added entirely to either the main pool or the reserve pool, or may be split between the pools in proportions that may be manually adjusted by a system operator based on predetermined guidelines or other criteria to achieve a desired rate of increase of the main pool and the reserve pool. When a player wins the progressive jackpot, the money in the main pool may be paid out, and an amount equal to a minimum payout amount maybe transferred from the reserve pool to the main pool in order to set the progressive jackpot at a level that may motivate players to play the wagering games and to make wagers large enough to qualify for the progressive jackpot.

It may be desirable to further enhance a gaming network implementing a progressive jackpot having a main pool and a reserve pool such that when main pool contains a relatively low balance, such as when the progressive jackpot is initially introduced, or after paying a progressive jackpot award from the main pool, the gaming network may be configured to automatically replenish the main pool at a faster rate as the players play the wagering game to a desired minimum payout rate that may induce additional play and increased wagering amounts on the wagering game. In one embodiment, the gaming network may be configured to add a relatively large portion of money diverted from the player's wagers to the main pool when the main pool amount is relatively small, such as zero or a predetermined minimum seed amount, with the portion of the diverted money added to the main pool decreasing as the main pool amount increases. Correspondingly, the portion diverted to the reserve pool may be relatively small when the main pool is small, and increase as the main pool increases.

At the introduction of the progressive jackpot, the main pool may be set to a desired minimum seed amount (MSA) and the reserve pool may have the minimum seed amount MSA subtracted therefrom, resulting in a negative balance equal to the minimum seed amount MSA. From the casino accounting perspective, prior to player wagering, the balance of the progressive jackpot pool is $0 and the casino or other progressive jackpot sponsor may not need to commit funds to the progressive jackpot at the outset. Due to the statistically low frequency with which progressive jackpot awards may be paid out, in most instances the funds diverted from the player's wagers and added to the progressive jackpot pool may fully fund the progressive jackpot by the time a player wins the first progressive jackpot award. In the less common instances wherein a player wins the progressive jackpot before the progressive jackpot pool is fully funded by player contributions, the casino or other sponsor may have to provide funds to cover any short-term shortfall between the progressive jackpot award amount and the net amount in progressive jackpot pool. Once the progressive jackpot pool reaches a balance sufficient to cover the main pool amount (i.e. the maximum winnable progressive jackpot at a given point in time), and the minimum seed amount MSA and the funds advanced by the sponsor (i.e. the balance of the reserve pool is greater than the minimum seed amount MSA and the advanced funds), the sponsor may deduct the advanced funds from the reserve pool.

Figure 51:
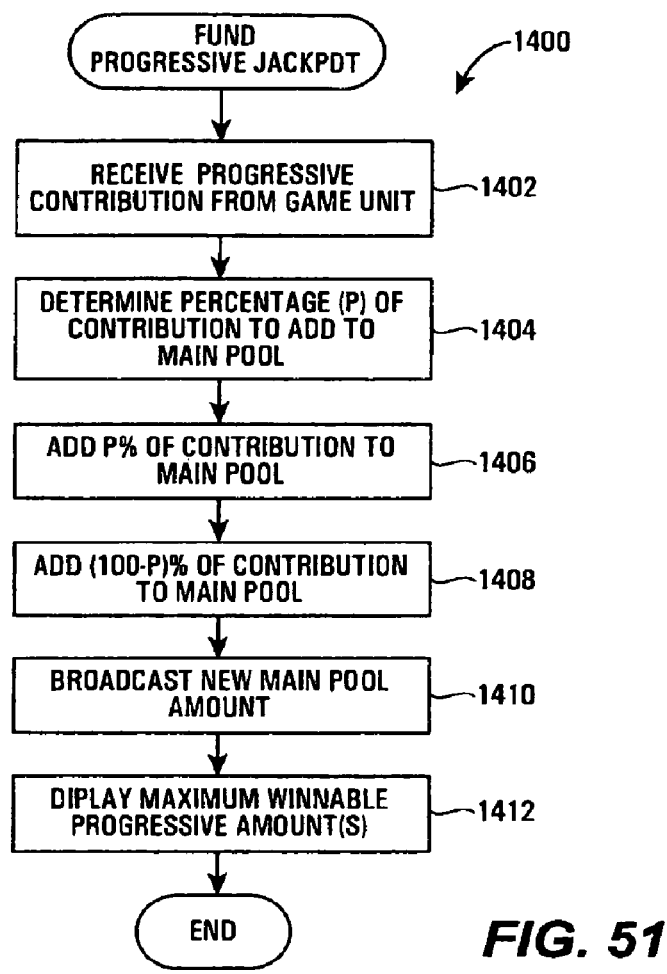
FIG. 51 is a flowchart of an embodiment of a progressive jackpot funding routine for a progressive jackpot having a main pool and a reserve pool.

As previously discussed, as players play the wagering game(s) associated with the progressive jackpots, portions of the wagers are diverted to the main and/or reserve pools to fund the progressive jackpot. FIG. 51 is a flowchart of a progressive jackpot funding routine 1400 for adding money diverted from the player's wagers to the main pool and the reserve pool of the progressive jackpot. The routine 1400 may begin at a block 1402 wherein the network computer administering the progressive jackpot receives a message from a gaming unit or other network computer with a progressive jackpot contribution from one or more player wagers. The progressive jackpot contribution from a player's wager may be determined in any manner as previously described or other manner known to those skilled in the art, and at the gaming unit where the wager is made or at a network computer administering the particular wagering game. After determining the progressive jackpot contribution, the gaming unit or network computer may transmit a message to the progressive jackpot network computer with information relating to the progressive jackpot contributions from one or more individual player wagers.

After the progressive jackpot network computer receives the progressive jackpot contribution message, control may pass to a block 1404 wherein the progressive jackpot network computer may determine the percentage P of the contribution to add to the main pool of the progressive jackpot. The progressive jackpot may be programmed to calculate or otherwise determine the percentage P based on a predetermined formula, the amounts in the main pool and the reserve pool relative to predetermined threshold amounts, or other criteria established by the jackpot sponsor such that the main pool and the reserve pool increase at the desired rates. Embodiments of methods for calculating or otherwise determining the percentage P are illustrated and discussed more fully below.

Once the percentage P is determined by the progressive jackpot network computer at block 1404, control may pass to a block 1406 wherein the progressive jackpot network computer may add P % of the progressive jackpot contribution to the main pool, and to a block 1408 wherein the progressive jackpot network computer may add the remaining (100-P) % to the reserve pool. After the main pool and the reserve pool are updated with the progressive jackpot contribution, the progressive jackpot network computer may broadcast a message on the gaming network containing the updated main pool amount at a block 1410. The message with the updated main pool amount may be received by the gaming units and network computers, and displayed on the appropriate display devices as maximum winnable progressive amounts at a block 1412. The displayed maximum winnable progressive amounts may vary based on the particular wagering game, and may also vary based on the gaming unit, with the maximum winnable progressive amount displayed being determined in a manner described more fully below.

As discussed above generally and with respect to block 1404 of routine 1400, the progressive jackpot network computer may be programmed to determine the percentage P of the progressive jackpot contributions for the main pool in order to achieve a desired rate of growth for the main pool or the reserve pool, perhaps based on the current balances of the pools. In some implementations, it may be desired to increase the main pool from zero or from a minimum seed amount to a desired minimum jackpot amount relatively quickly, and increase the main pool more slowly when the main pool exceeds the desired minimum jackpot amount. This strategy may be achieved by programming the progressive jackpot network computer to apply a constant, relatively high percentage P to the progressive jackpot contribution when the amount in the main pool is less than the desired minimum jackpot amount, and to apply a constant, relatively low percentage P when the amount in the main pool exceeds the desired minimum jackpot amount.

Figure 52:
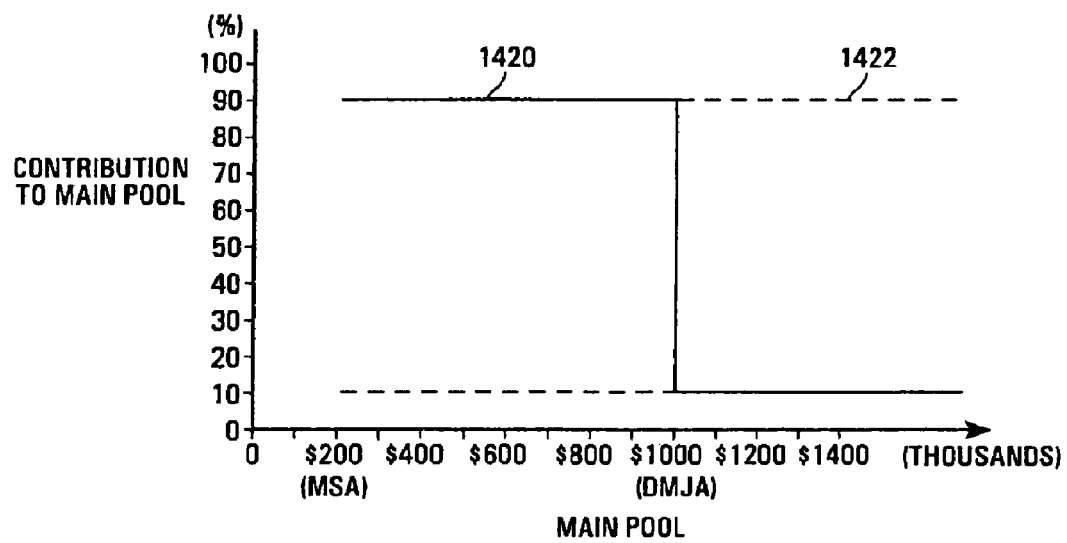
FIG. 52 is chart graphing a strategy for funding a main pool and a reserve pool of a progressive jackpot that may be implemented in a progressive jackpot network computer.

The graph of FIG. 52 illustrates an example of an implementation of this strategy. In this example, the minimum seed amount MSA for the main pool may be set at $200,000 and the desired minimum jackpot amount DMJA may be set at $1,000,000. When the main pool amount is less than the desired minimum jackpot amount DMJA, the sponsor may desire to add 90% of the progressive jackpot contributions to the main pool until the main pool equals the desired minimum jackpot amount DMJA, and then 10% thereafter, as indicated by line 1420. Correspondingly, as shown by line 1422, the remainders of the contributions are added to the reserve pool, i.e., 10% of the contributions are directed to the reserve pool when the main pool is less than the desired minimum jackpot amount DMJA, and 90% thereafter.

Figure 53:
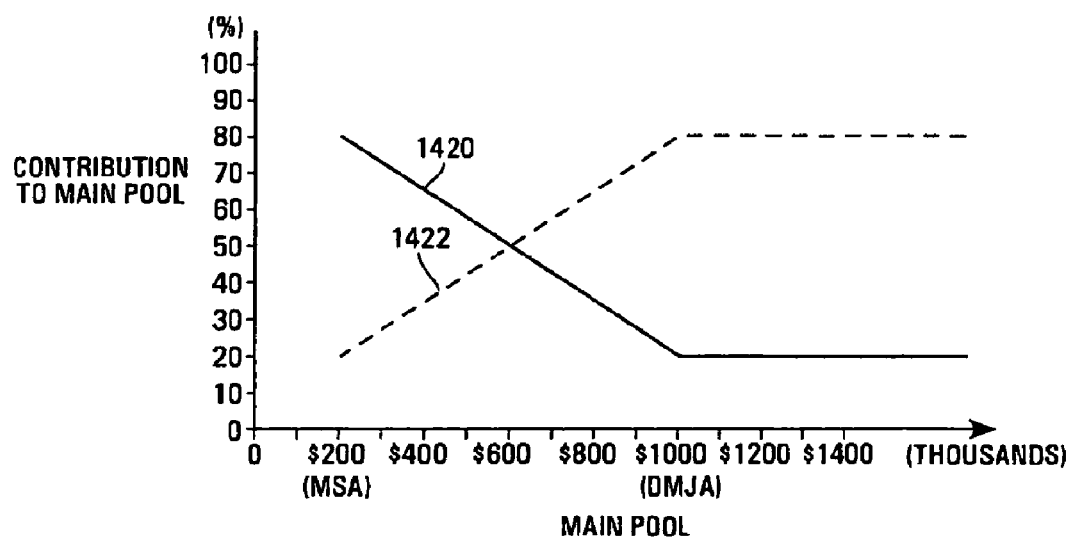
FIG. 53 is chart graphing an alternative strategy for funding a main pool and a reserve pool of a progressive jackpot that may be implemented in a progressive jackpot network computer.

FIG. 53 illustrates an alternative strategy that may be programmed at the progressive jackpot network computer wherein the percentage P of the contributions added to the main pool may decrease linearly as the main pool amount increases from the minimum seed amount MSA to the desired minimum jackpot amount DMJA, and maintain a constant rate thereafter. The percentage P of the contribution added to the main pool for a given main pool amount between the minimum seed amount MSA and desired minimum jackpot amount DMJA may be calculated using the following formula:

$$P_{main} = P_{main\,max} - (P_{main\,max} - P_{main\,min})\left(\frac{pool_{main} - MSA}{DMJA - MSA}\right) \quad (4)$$

Where:
$P_{main}$=percentage contributed to main pool
$P_{main\,max}$=maximum percentage contributed to main pool
$P_{main\,min}$=minimum percentage contributed to main pool
$pool_{main}$=main pool amount
MSA=minimum seed amount
DMJA=desired minimum jackpot amount Within the same range, the percentage of the contribution added to the reserve pool may be calculated using the following formula:

$$P_{reserve} = 100 - P_{main} \quad (5)$$

Where: $P_{reserve}$=percentage contributed to reserve pool

In the example of FIG. 53, $P_{main\,max}$=80%, $P_{main\,min}$=20%, MSA=$200,000 and DMJA=$1,000,000. Substituting the values into formula (4) yields:

$$P_{main} = 80\% - (80\% - 20\%)\left(\frac{pool_{main} - \$200,000}{\$1,000,000 - \$200,000}\right) \quad (6)$$
$$= 80\% - 60\%\left(\frac{pool_{main} - \$200,000}{\$800,000}\right)$$

When the main pool is greater than the desired minimum jackpot amount DMJA, the contribution to the main pool may be a constant 20%.

Figure 56:
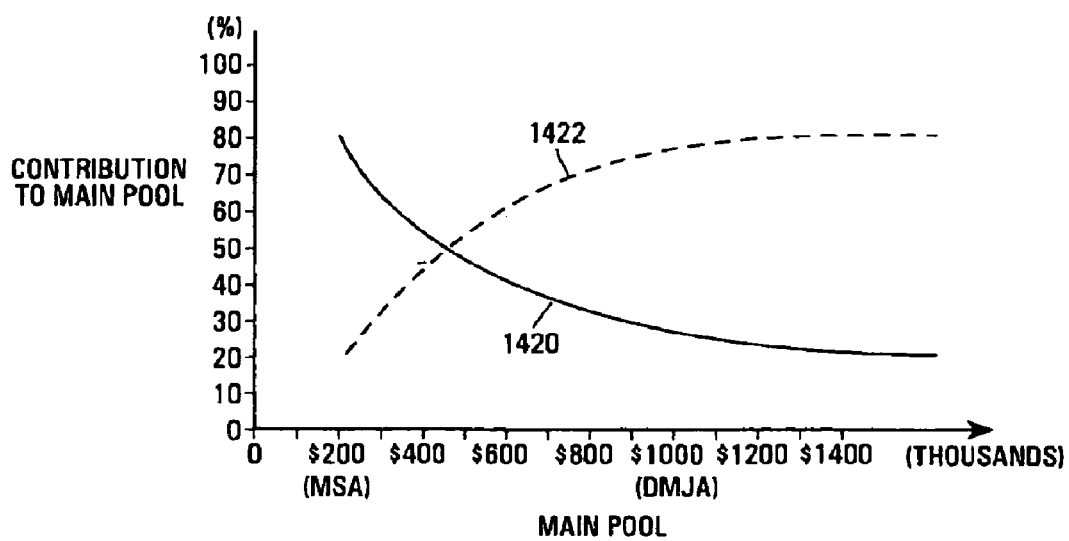
FIG. 56 is chart graphing a still further alternative strategy for funding a main pool and a reserve pool of a progressive jackpot that may be implemented in a progressive jackpot network computer.
Figure 54:
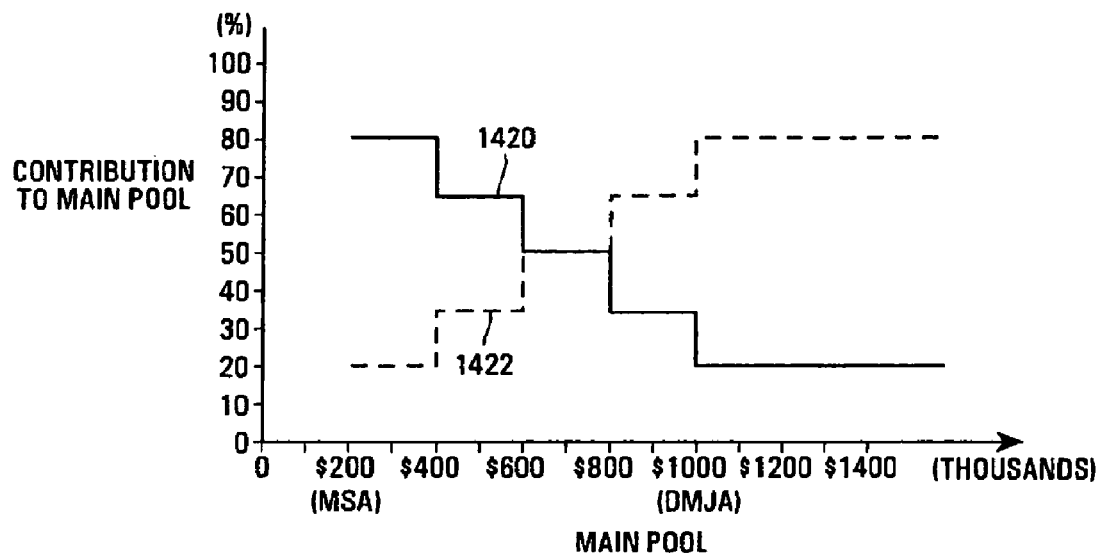
FIG. 54 is chart graphing a further alternative strategy for funding a main pool and a reserve pool of a progressive jackpot that may be implemented in a progressive jackpot network computer.
Figure 55:
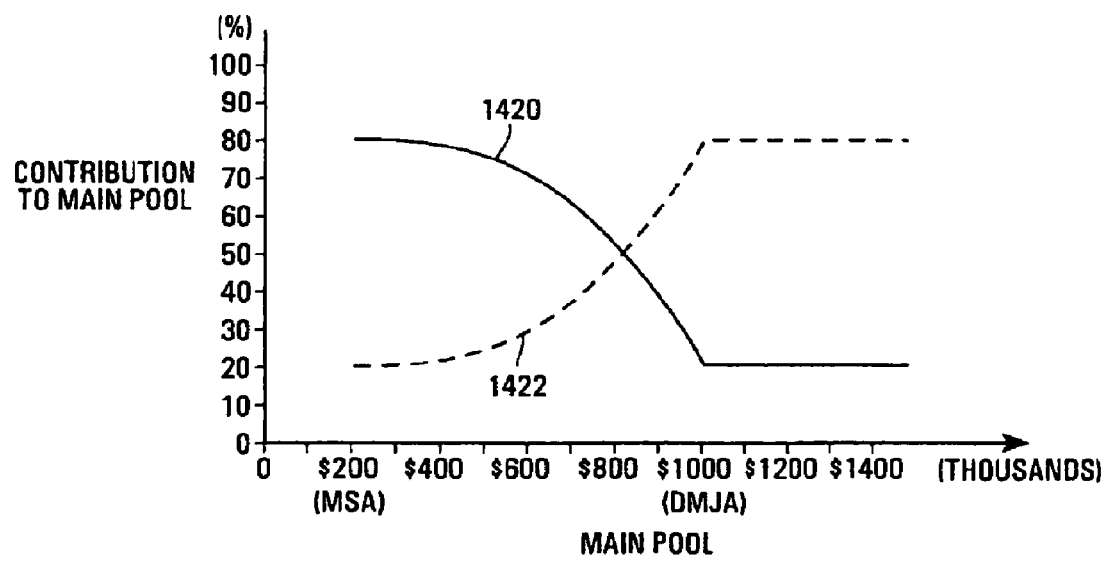
FIG. 55 is chart graphing another alternative strategy for funding a main pool and a reserve pool of a progressive jackpot that may be implemented in a progressive jackpot network computer.

FIGS. 54-56 are graphs illustrating further alternative strategies for funding the main pool and the reserve pool that may be programmed at the progressive jackpot network computer. Referring to FIG. 54, the percentage contributed to the main pool may decrease in a stepwise fashion such that the percentage decreases incrementally as the main pool amount increases from the minimum seed amount MSA. In FIGS. 55 and 56, the progressive jackpot network computer may be programmed with more complex functions for determining the percentage contributed to the main pool. In FIG. 55, the portion of line 1420 between the minimum seed amount MSA and the desired minimum jackpot amount DMJA may be parabolic such the percentage contributed to the main pool decreases slowly when the main pool amount is close to the minimum seed amount MSA, and decreases much more rapidly as the main pool amount approaches the desired minimum jackpot amount DMJA. The line 1420 in FIG. 56 may also be parabolic, but with the percentage contributed to the main pool decreasing rapidly when the main pool amount is close to the minimum seed amount MSA, and leveling off and decreasing more slowly as the main pool amount approaches the desired minimum jackpot amount DMJA. FIG. 56 further illustrates that line 1420 may maintain continuity beyond the desired minimum jackpot amount DMJA such that a single function may define the percentage contributed to the main pool for any given main pool amount. Moreover, where different portions of line 1420 are defined by different functions, each of the functions may define a constant percentage, a linearly varying percentage, or any other more complex function in order to achieve the desire rate of increase of the main pool and the reserve pool. Those skilled in the art will further understand that the percentage contributions for the pools may be defined in terms of the reserve pool amount, or in terms of both the main pool amount and the reserve pool amount.

In routine 1400, the maximum winnable progressive jackpot amount may be displayed to the players at block 1412. The maximum winnable progressive jackpot amount may be displayed at the individual gaming units of the gaming network and/or at separate display devices located at central locations within the casino, such as near banks of gaming units associated with the progressive jackpot. In the simplest and most common form, the maximum winnable progressive jackpot displayed to the players may be the current amount in the main pool. However, as discussed above, progressive jackpots may be implemented wherein the maximum progressive jackpot award for which a player may be eligible may vary based on the wagering structure of the wagering game and the amount wagered by the player on an occurrence of a wagering game. In order to manage player expectations regarding the size of a progressive jackpot for which the player qualifies, it may be desired by the casino or other sponsor to display to the player or group of players the actual amount they may receive for winning the progressive jackpot.

The maximum winnable progressive jackpot amount may be calculated in a similar manner as previously described in connection with block 1336 of FIGS. 49 and 50 for determining the player's actual progressive jackpot award amount by prorating the total progressive jackpot amount. Consequently, in implementations where the progressive jackpot may be offered with a single wagering game played on multiple machines each having the same wagering structure, the maximum winnable progressive jackpot amount for a player may be calculated using a formula similar to formula (1) wherein $Pool_{prog}$ is equal to the current amount in the main pool. Similarly, in implementations where the progressive jackpot may be offered with wagering games having different wagering structures, the maximum winnable progressive jackpot amount for a player may be calculated using a formula similar to formulas (2) or (3).

The calculation of the maximum winnable progressive jackpot may be performed at any appropriate or desired component or combination of components within the gaming network. For example, each gaming unit may store information relating to the maximum wager for the wagering game, the maximum wager for the system, or the corresponding denominations and credits making up the maximum wagers. When the progressive jackpot network computer transmits the message containing the updated main pool amount, the gaming units may, upon receiving the message, calculate the maximum winnable progressive jackpot for the gaming unit by multiplying the main pool amount by the ratio of the maximum wager for the wagering game to the maximum wager for the system, and display the maximum winnable progressive jackpot on an appropriate display. The gaming units may further update the maximum winnable progressive jackpot for the occurrence of the wagering game for the player by multiplying the current maximum winnable progressive jackpot for the gaming unit by the ratio of the player's wager to the maximum wager for the wagering game, with the updated maximum winnable progressive jackpot being displayed as the player plays the wagering game.

In other implementations, the calculation of the maximum winnable progressive jackpot may occur in stages at the network computers active as game servers for the wagering games, and at the associated gaming units. For example, a network computer for a wagering game may receive the updated main pool amount and calculate the maximum winnable progressive jackpot for the wagering game in a similar manner as discussed above. The network computer may then display the maximum winnable progressive jackpot for the wagering game at a central display or displays, and transmit a message containing the maximum winnable progressive jackpot for the wagering game to the associated gaming units. Upon receiving the message, the gaming units may display the maximum winnable progressive jackpot for the wagering game, and calculate and display the maximum winnable progressive jackpot for the occurrence of the wagering game when the player makes a wager. While the calculation and display of maximum winnable progressive jackpots are discussed herein with progressive jackpots having a main pool and a reserve pool, those skill in the art will understand that maximum winnable progressive jackpots may be calculated and displayed in conjunction with other configurations of progressive jackpots In progressive jackpots using a single pool, awards are paid out of the progressive jackpot pool and the contributions from the player's wagers are added into the single progressive jackpot pool in their entirety. In a progressive jackpot having a main pool and a reserve pool as described above, money may be transferred from the reserve pool to the main pool after a progressive jackpot award is paid out of the main pool in order to reseed the main pool and, consequently, the potential progressive jackpot award to relatively higher initial amounts, and in many instances without the need for initial funding by the jackpot's sponsor. As discussed above, the main pool and the reserve pool may be increased simultaneously so that reserve pool may grow to a substantial amount, and may even exceed the main pool. After an award is paid out of the main pool, it may be desired to reseed the main pool to at least a minimum seed amount, and to a greater amount to the extent additional money is available in the reserve pool. However, it may further be desired to limit the amount to which the main pool is reseeded to the amount in the main pool prior to awarding the progressive jackpot so that the winning player may not have the sense of being cheated if the progressive jackpot is immediately reset to a higher amount. Moreover, in implementations wherein a player may be paid a maximum winnable progressive jackpot based on the ratio of the player's wager to a system maximum wager, it may be desired to determine a reseeding amount based at least partially on the ratio used in determining the progressive jackpot award.

Figure 57:
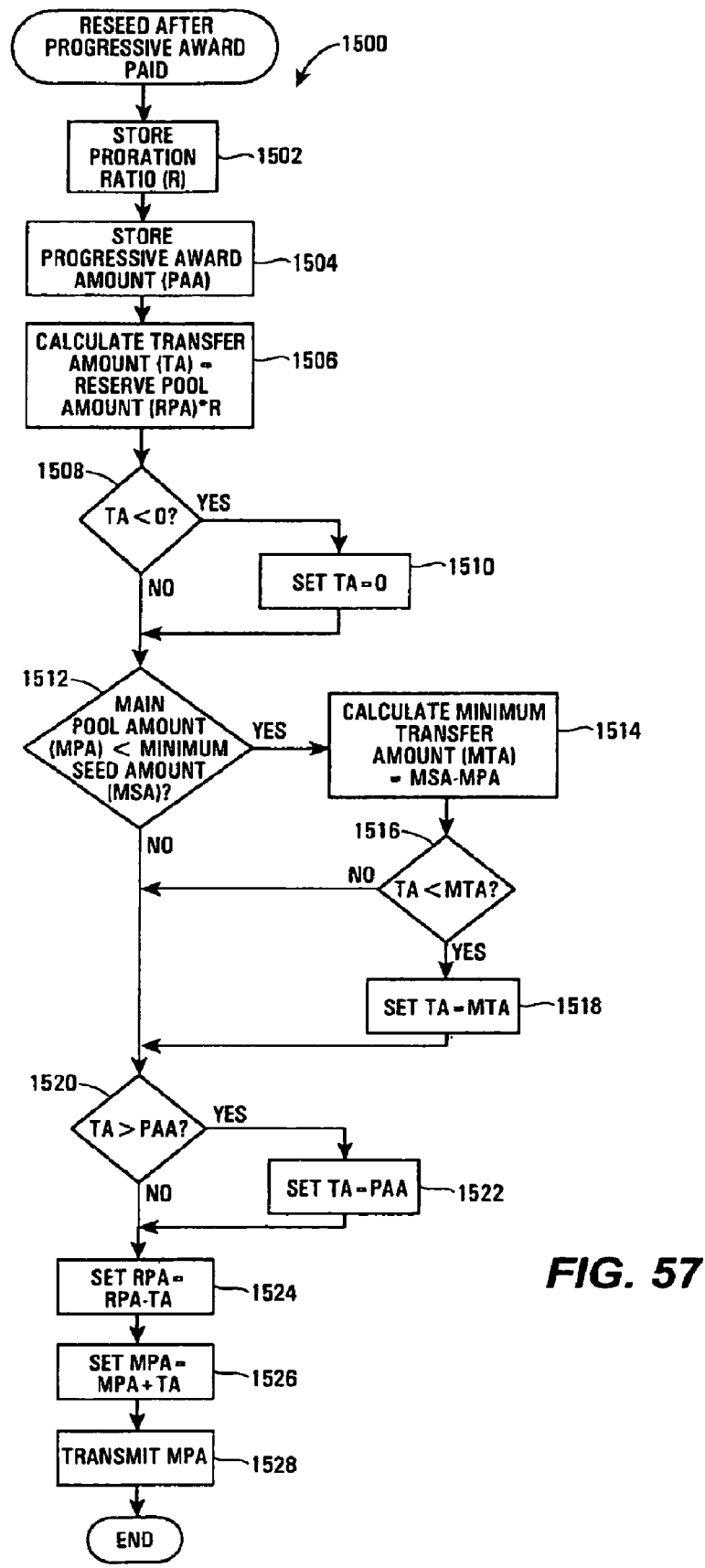
FIG. 57 is a flowchart of an embodiment of a progressive jackpot reseeding routine for a progressive jackpot having a main pool and a reserve pool.

FIG. 57 is a flowchart of an embodiment of a progressive jackpot reseeding routine 1500 for reseeding a main pool of the progressive jackpot by transferring money from a reserve pool to the main pool. The routine may be performed in whole or in part at the progressive jackpot network computer, or may be distributed among the other components of the gaming network as desired. Moreover, the routine may be implemented regardless of whether progressive jackpot awards are paid out in their entirety each time, or are prorated based on the player's wager on the occurrence of the wagering game. In implementations where a player is award a prorated amount of the progressive jackpot, the routine 1500 may begin at a block 1502 wherein the proration ratio (R) used to calculate the progressive jackpot award may be stored for use in determining the transfer amount (TA) to move from the reserve pool to the main pool. The ratio R may be, for example, the number from formulas (1)-(3) by which the progressive jackpot pool amount is multiplied to determine the prorated progressive jackpot award for the player. The ratio R may be transmitted to the progressive jackpot network computer by the gaming unit or network computer determining the prorated progressive jackpot award, or may be calculated at the progressive jackpot network computer, and subsequently stored in an appropriate location in the memory of the progressive jackpot network computer.

After the ratio R is stored, if necessary, control may pass to block 1504 wherein the progressive jackpot network computer may store the progressive award amount (PAA) at the progressive jackpot network computer. The progressive award amount PAA may be used to ensure that the transfer amount TA does exceed the previously awarded progressive jackpot such that the new maximum winnable progressive jackpot exceeds the amount available to the player that just won the progressive jackpot. For example, if a player receives a progressive jackpot award of $400,000 out of a $500,000 main pool, the player may be disappointed to see the progressive jackpot reset to $1,000,000 if sufficient funds exist in the reserve pool.

At a block 1506, the progressive jackpot network computer may calculate a preliminary transfer amount TA by multiplying the reserve pool amount (RPA) by the ratio R. The preliminary transfer amount TA resulting from the calculation may represent the maximum funds, or the prorated amount of the maximum funds, available for transfer from the reserve pool to the main pool. If the preliminary transfer amount TA is negative at a block 1508, control may pass to a block 1510 wherein the preliminary transfer amount TA may be reset to $0 to prevent the main pool from being reduced further after the progressive jackpot award is paid out.

After determining whether the preliminary transfer amount TA is negative and, if so, resetting the value to $0, control may pass to a block 1512 wherein the progressive jackpot network computer may compare the main pool amount (MPA) to the minimum seed amount (MSA). If the main pool amount MPA still exceeds the minimum seed amount MSA after the progressive jackpot award is paid out, the routine 1500 may proceed to determine the final transfer amount TA. If the main pool amount MPA is less than the minimum seed amount MSA, control may pass to a block 1514 to calculate the minimum transfer amount (MTA) necessary to raise the main pool to the minimum seed amount MSA by subtracting the main pool amount MPA from the minimum seed amount MSA. If the current value of the transfer amount is less than the minimum transfer amount MTA at a block 1516, control may pass to a block 1518 wherein the transfer amount TA may be reset to the minimum transfer amount MTA to ensure that the main pool may be reseeded to at least the minimum seed amount MSA. It should be noted that, if necessary, the transfer amount TA may be set to an amount that may result in a negative balance in the reserve pool after the transfer amount TA is transferred to the main pool.

After comparing the main pool amount MPA to the minimum seed amount MSA and, if necessary resetting the transfer amount TA to the minimum transfer amount MTA, control may pass to a block 1520 wherein the current value of the transfer amount TA may be compared to the progressive award amount PAA previously stored at the progressive jackpot network computer at block 1502. If the transfer amount TA is less than the progressive award amount PAA, the routine 1500 may proceed to transfer the transfer amount TA from the reserve pool to the main pool. If the transfer amount TA is greater than the progressive award amount PAA, control may pass to a block 1522 to set the transfer amount TA to the progressive award amount PAA, thereby ensuring that the new balance in the main pool may not exceed the previous balance. Once the value of the transfer amount TA is determined, control may pass to a block 1524 to subtract the transfer amount TA from the reserve pool amount RPA, and to a block 1526 to add the transfer amount TA to the main pool amount MPA. Once the transfer from the reserve pool to the main pool is complete, control may pass to a block 1528 wherein the progressive jackpot network computer may transmit the updated main pool amount MPA to the gaming units and network computers on the gaming network for display to the players.

The following examples illustrate the reseeding of the main pool using the process of routine 1500 of FIG. 57. In each example, the minimum seed amount MSA for the main pool is $200,000. The first example is shown in Table 5 as follows:

TABLE 5

|  | PAA | MPA | RPA |
| --- | --- | --- | --- |
| Initial Balances | $0 | $200,000 | −$200,000 |
| Award Jackpot | $100,000 | $100,000 | −$200,000 |
| Reseed Main Pool | $100,000 | $200,000 | −$300,000 |

The initial balances may reflect the balances of the progressive jackpot when the progressive jackpot is initially offered, with the main pool amount MPA being equal to the minimum seed amount MSA and the reserve pool amount RPA being equal to the negative minimum seed amount MSA. In this example, the first player to place a wager on an associated wagering game may place a wager equal to 50% of the system maximum wager on the occurrence of the wagering game, and may hit a progressive jackpot-winning combination. Based on the player's wager, the player may receive a prorated progressive jackpot award equal to the main pool amount MPA multiplied by the proration rate P of 50% for a progressive award amount PAA of $100,000, with the main pool amount MPA being reduced by the progressive award amount PAA to $100,000.

The preliminary transfer amount TA may be calculated as −$100,000 (RPA*R) at block 1506 and, since the preliminary transfer amount TA is less than $0, be reset to $0 at block 1510. Because the main pool amount MPA is less than the minimum seed amount MSA, the progressive jackpot network computer may calculate a minimum transfer amount MTA of $100,000 at block 1514 to raise the main pool amount MPA to the minimum seed amount MSA of $200,000. The transfer amount TA, previously set to $0, is less than the minimum transfer amount MSA. Consequently, at block 1518, the transfer amount TA may be set equal to the minimum transfer amount MTA of $100,000, which is also equal to the progressive award amount PAA. As a result, $100,00, equal to the transfer amount TA and the progressive award amount PAA, may be subtracted from the reserve pool amount RPA at block 1524 and added to the main pool amount MPA at block 1526, thereby yielding the post-reseeding balances shown in Table 5.

A second example of the execution of the routine 1500 is shown in Table 6 as follows:

TABLE 6

|  | PAA | MPA | RPA |
| --- | --- | --- | --- |
| Initial Balances | $0 | $1,000,000 | $2,000,000 |
| Award Jackpot | $750,000 | $250,000 | $2,000,000 |
| Reseed Main Pool | $750,000 | $1,000,000 | $1,250,000 |

In this example, the player may have won the progressive jackpot with a wager of 75% of the system maximum wager, resulting in a progressive award amount PAA of $750,000. Based on the proration rate R of 75%, the preliminary transfer amount TA calculated at block 1506 (RPA*R) may be $1,500,000. The main pool amount MPA exceeds the minimum seed amount MSA, so it may not be necessary for the progressive jackpot network computer to determine a minimum transfer amount MTA. However, the preliminary transfer amount TA is greater than the progressive award amount PAA. As a result, the transfer amount TA may be set to the progressive award amount PAA at block 1522, resulting in the main pool amount MPA being set to back to the pre-jackpot award balance of $1,000,000 at block 1526 and the reserve pool amount RPA being reduced accordingly.

A further example of the execution of routine 1500 is shown in Table 7 as follows:

TABLE 7

|  | PAA | MPA | RPA |
|---|---|---|---|
| Initial Balances | $0 | $500,000 | $250,000 |
| Award Jackpot | $400,000 | $100,000 | $250,000 |
| Reseed Main Pool | $400,000 | $300,000 | $50,000 |

In this example, the player may have won the progressive jackpot with a wager of 80% of the system maximum wager, resulting in a progressive award amount PAA of $400,000. Based on the proration rate R of 80%, the preliminary transfer amount TA calculated at block 1506 (RPA*R) may be $200,000. As in the first example, the main pool amount MPA is less than the minimum seed amount MSA, and the progressive jackpot network computer may calculate the necessary minimum transfer amount MTA of $100,000 at block 1514. In the present example, however, the preliminary transfer amount TA is greater than the minimum transfer amount MTA, and may result in a main pool amount MPA that exceeds the minimum seed amount MSA. Moreover, the preliminary transfer amount TA is less than the progressive award amount PAA so that the reseeded balance of the main pool amount MPA may be less than the pre-jackpot award balance. As a result, the calculated preliminary transfer amount TA may be added to the main pool amount MPA at block 1526 and subtracted from the reserve pool amount RPA at block 1524, resulting in the balances shown in Table 7.

What is claimed is:

1. A method comprising:
    receiving a first input for a wager from a player on an occurrence of a primary game at an input device of a gaming unit;
    subtracting the amount of the wager on an occurrence of the primary game from credit available to the player at the gaming unit in response to receiving the first input;
    receiving a second input for a progressive jackpot wager amount from the player on an occurrence of a secondary game at the input device, wherein the occurrences of the primary and secondary games are parts of an occurrence of a wagering game, wherein the secondary game is associated with a progressive jackpot, wherein said receiving the second input is performed via the input device;
    subtracting the progressive jackpot wager amount from the available credit in response to receiving the second input;
    adding the progressive jackpot wager amount to a progressive jackpot pool for the progressive jackpot when the progressive jackpot wager amount is subtracted from the available credit, wherein said subtracting the amount of the wager, said subtracting the progressive jackpot wager amount, and said adding the progressive jackpot wager amount are performed by a gaming unit controller of the gaming unit, wherein the wagering game is a multi-player game, wherein the player has a unique game array of game indicia for the occurrence of the wagering game and individual game indicia are sequentially selected from a range of game indicia, wherein the player wins the occurrence of the primary game by matching a predetermined game winning pattern of game indicia on the unique game array with the sequentially selected game indicia, and wherein an outcome of the occurrence of the secondary game is a predetermined progressive jackpot winning outcome when a pattern on the unique game array formed by game indicia on the unique game array matches a predetermined progressive jackpot winning pattern.

2. A method in accordance with claim 1, wherein the outcome of the occurrence of the secondary game is the predetermined progressive jackpot winning outcome when the player matches the predetermined progressive jackpot winning pattern within a predetermined maximum number of sequentially selected game indicia.

3. A method in accordance with claim 1, wherein the progressive jackpot wager amount is equal to a predetermined fixed wager amount or to a predetermined percentage of the wager on the primary game.

4. A method in accordance with claim 1, further comprising displaying graphics corresponding to an outcome of the secondary game at the gaming unit when the player inputs the progressive jackpot wager amount.

5. A method in accordance with claim 1, further comprising disabling the receipt of the progressive jackpot wager amount at the gaming unit at a location prohibiting the progressive jackpot.

6. A method comprising:
    providing an input device for receiving a first input for a wager from a player on an occurrence of a primary game at a gaming unit;
    configuring the gaming unit controller of the gaming unit to subtract the amount of the wager on the occurrence of the primary game from credit available to the player at the gaming unit in response to receiving the first input;
    configuring the input device to receive a second input for a progressive jackpot wager amount from the player for an occurrence of a secondary game at the gaming unit, wherein the secondary game is associated with a progressive jackpot, wherein the occurrences of the primary and secondary games are parts of an occurrence of a wagering game;
    configuring the gaming unit controller to subtract the progressive jackpot wager amount from the available credit in response to receiving the second input; and
    configuring the gaming unit controller to add the progressive jackpot wager amount to a progressive jackpot pool for the progressive jackpot when the progressive jackpot wager amount is subtracted from the available credit, wherein the wagering game is a multi-player game, wherein the player has a unique game array of game indicia for the occurrence of the wagering game and individual game indicia are sequentially selected from a range of game indicia, wherein the player wins the occurrence of the primary game by matching a predetermined game winning pattern of game indicia on the unique game array with the sequentially selected game indicia, and wherein an outcome of the occurrence of the secondary game is a predetermined progressive jackpot winning outcome when a pattern on the unique game array formed by game indicia on the unique game array matches a predetermined progressive jackpot winning pattern.

7. A method in accordance with claim 6, further comprising configuring the gaming unit to generate an outcome of the occurrence of the wagering game, wherein the outcome is a predetermined progressive jackpot winning outcome when the player matches the predetermined progressive jackpot winning outcome within a predetermined maximum number of sequentially selected game indicia.

8. A method in accordance with claim 6, wherein the progressive jackpot wager amount is equal to a predetermined fixed wager amount or a predetermined percentage of the wager on the primary game.

9. A method in accordance with claim 6, further comprising disabling the receipt of the progressive jackpot wager amount at the gaming unit at a location prohibiting the progressive jackpot.

10. A gaming unit comprising:
an input device configured to receive a plurality of input selections;
a currency-accepting mechanism configured to allow a player to deposit a medium of currency;
an output device;
a value-dispensing mechanism configured to dispense value to the player;
a gaming unit controller operatively coupled to the input device, the currency-accepting mechanism, the output device, and the value-dispensing mechanism,
the gaming unit controller being programmed to allow the currency-accepting mechanism to accept the deposit,
the gaming unit controller being programmed to allow the input device to receive a first input for a wager from the player on an occurrence of a primary game,
the gaming unit controller being programmed to subtract the amount of the wager on the occurrence of the wagering game from credit available to the player at the gaming unit in response to receiving the first input,
the gaming unit controller being programmed to allow the input device to receive a second input for a progressive jackpot wager amount from the player for an occurrence of a secondary game, wherein the occurrences of the primary and secondary games are parts of an occurrence of a wagering game, wherein the secondary game is associated with a progressive jackpot,
the gaming unit controller being programmed to subtract the amount of the progressive jackpot wager amount from the available credit in response to receiving the second input for the progressive jackpot wager amount,
the gaming unit controller being programmed to cause the output device to transmit a message to a network computer to add the progressive jackpot wager amount to a progressive jackpot pool for the progressive jackpot, wherein the wagering game is a multi-player game, wherein the player has a unique game array of game indicia for the occurrence of the wagering game and individual game indicia are sequentially selected from a range of game indicia, wherein the player wins the occurrence of the primary game by matching a predetermined game winning pattern of game indicia on the unique game array with the sequentially selected game indicia, and wherein an outcome of the occurrence of the secondary game is a predetermined progressive jackpot winning outcome when a pattern on the unique game array formed by game indicia on the unique game array matches a predetermined progressive jackpot winning pattern.

11. A gaming unit in accordance with claim 10, wherein the gaming unit controller being programmed to generate an outcome of the occurrence of the wagering game, wherein the outcome is a predetermined progressive jackpot winning outcome when the player matches the predetermined progressive jackpot winning outcome within a predetermined number of sequentially selected game indicia.

12. A gaming unit in accordance with claim 10, wherein the progressive jackpot wager amount is equal to a predetermined fixed wager amount or a predetermined percentage of the wager on the primary game.

13. A gaming unit in accordance with claim 10, further comprising a display device operatively coupled to the gaming unit controller, the gaming unit controller being programmed to cause the display device to display graphics corresponding to an outcome of the secondary game at the gaming unit in response to receiving the second input.

* * * * *